United States Patent
Sato

(10) Patent No.: US 9,625,631 B2
(45) Date of Patent: Apr. 18, 2017

(54) OPTICAL COMPENSATION FILM, POLARIZING PLATE, AND LIQUID CRYSTAL DISPLAY DEVICE

(71) Applicant: Konica Minolta, Inc., Tokyo (JP)

(72) Inventor: Hideyuki Sato, Kobe (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/432,382

(22) PCT Filed: Sep. 19, 2013

(86) PCT No.: PCT/JP2013/075333
§ 371 (c)(1),
(2) Date: Mar. 30, 2015

(87) PCT Pub. No.: WO2014/057784
PCT Pub. Date: Apr. 17, 2014

(65) Prior Publication Data
US 2015/0219815 A1   Aug. 6, 2015

(30) Foreign Application Priority Data

Oct. 11, 2012  (JP) ................................ 2012-225780

(51) Int. Cl.
*G02B 5/30*     (2006.01)
*C08J 5/18*     (2006.01)
(Continued)

(52) U.S. Cl.
CPC ............ *G02B 5/3083* (2013.01); *B29C 41/32* (2013.01); *B29C 55/023* (2013.01); *B29C 55/08* (2013.01);
(Continued)

(58) Field of Classification Search
CPC ...... G02B 5/3083; G02B 5/3091; G02B 5/32; G02B 5/3033; G02B 1/04; B29C 41/32;
(Continued)

(56) References Cited

U.S. PATENT DOCUMENTS

2011/0076423 A1* 3/2011 Nagura .................. C09K 19/54
                                                                  428/1.3
2011/0242460 A1* 10/2011 Yasuda ..................... C08L 1/12
                                                                   349/96
(Continued)

FOREIGN PATENT DOCUMENTS

JP      2008077070 A    4/2008
JP      2009211057 A    9/2009
(Continued)

OTHER PUBLICATIONS

The International Preliminary Report on Patentability dated Apr. 14, 2015 from the corresponding International Patent Application No. PCT/JP2013/075333.
(Continued)

*Primary Examiner* — Frank Font
(74) *Attorney, Agent, or Firm* — Lucas & Mercanti, LLP

(57) ABSTRACT

The present invention addresses the problem of providing an optical compensation thin film which contains a cellulose acylate and an additive and which when laminated on a polarizer with a photocurable adhesive, exhibits high adhesiveness to the polarizer and can reduce the occurrence of curling and the deterioration of polarization degree. An optical compensation film which contains a cellulose acylate having an acylation degree of 2.0 to 2.5 and an additive and which has a film thickness of 15 to 40 μm, characterized in that when 50 pl of hydroxyethyl acrylate droplets are
(Continued)

dropped on the film at 23 C and 55% RH, at least one surface of the film exhibits a permeability of 10 to 25 pl/15 sec to the droplets.

6 Claims, 1 Drawing Sheet

(51) Int. Cl.
| | | |
|---|---|---|
| *C08L 1/10* | (2006.01) | |
| *B29C 41/32* | (2006.01) | |
| *B29C 55/02* | (2006.01) | |
| *B29C 55/08* | (2006.01) | |
| *C08L 1/12* | (2006.01) | |
| *G02B 1/04* | (2006.01) | |

(52) U.S. Cl.
CPC . *C08J 5/18* (2013.01); *C08L 1/10* (2013.01); *C08L 1/12* (2013.01); *G02B 5/3033* (2013.01); *B29K 2201/08* (2013.01); *C08J 2301/10* (2013.01); *G02B 1/04* (2013.01)

(58) Field of Classification Search
CPC ... B29C 55/023; B29C 55/08; B29K 2201/08; C08J 5/18; C08J 2301/10; C08L 1/10; C08L 1/12
USPC .......... 359/489.07, 489.02; 349/117
See application file for complete search history.

(56) References Cited

U.S. PATENT DOCUMENTS

| | | | | |
|---|---|---|---|---|
| 2011/0273646 | A1* | 11/2011 | Fukagawa | ............ C08J 5/18 349/96 |
| 2012/0076955 | A1* | 3/2012 | Nakayama | ............ G02B 1/04 428/1.3 |
| 2012/0088041 | A1* | 4/2012 | Fukagawa | ............ C09K 19/54 428/1.33 |
| 2012/0177848 | A1* | 7/2012 | Kamohara | ............ C08J 5/18 428/1.31 |
| 2012/0186489 | A1* | 7/2012 | Fukagawa | ............ C08J 5/18 106/162.9 |
| 2015/0116827 | A1* | 4/2015 | Wang | ............ C08L 83/06 359/489.07 |

FOREIGN PATENT DOCUMENTS

| | | |
|---|---|---|
| JP | 2009244860 A | 10/2009 |
| JP | 2009251017 A | 10/2009 |
| JP | 2011094114 A | 5/2011 |
| JP | 2012144690 A | 8/2012 |
| TW | 201227004 A | 7/2012 |
| WO | 2012043385 A1 | 4/2012 |

OTHER PUBLICATIONS

English translation of the International Preliminary Report on Patentability dated Apr. 14, 2015 from the corresponding International Patent Application No. PCT/JP2013/075333.

Taiwanese Office Action dated Dec. 16, 2014 for corresponding application No. 102135839 and English translation thereof.

Office Action dated Jul. 14, 2016 from the corresponding Korean Application; Application No. 10-2015-7008912; Applicant: Konica Minolta, Inc.; itle of the Invention-Creation: Optical Compensation Film, Polarizing Plate, and Liquid Crystal Display Device; English translation of Office Action; Total of 8 pages.

Office Action dated Jun. 12, 2016 from the corresponding Chinese Application; Application No. 201380053102.3; Applicant: Konica Minolta, Inc.; Title of the Invention-Creation: Optical Compensation Film, Polarizing Plate, and Liquid Crystal Display Device; English translation of Office Action; Total of 13 pages.

* cited by examiner

OPTICAL COMPENSATION FILM, POLARIZING PLATE, AND LIQUID CRYSTAL DISPLAY DEVICE

CROSS REFERENCE TO RELATED APPLICATION

This Application is a 371 of PCT/JP2013/075333 filed on Sep. 19, 2013 which, in turn, claimed the priority of Japanese Patent Application No. JP2012-225780 filed on Oct. 11, 2012 both applications are incorporated herein by reference.

TECHNICAL FIELD

The present invention relates to optical compensation films, polarizing plates, and liquid crystal display devices. The present invention more specifically relates to a thin optical compensation film that comprises cellulose acylate and an additive, has high adhesiveness to polarizers, and does not causes a reduction in polarization of polarizer plates in bonding of the film to the polarizers with a photocurable adhesive.

BACKGROUND ART

Cellulose acylate films having low degrees of acylation such as diacetyl cellulose (DAC) films having a low degree of acetylation readily exhibit retardation, and can act as optical compensation films without addition of a retardation enhancer.

Poly(vinyl alcohol) adhesives have been typically used in bonding of polarizers to optical compensation films comprising cellulose acylate. In this method, the surfaces of the cellulose acylate films should be preliminarily hydrophilicized with saponifying solutions or the like. Unfortunately, the cellulose acylate films having low degrees of acylation are partially dissolved into the saponifying solutions, causing process contamination, during a saponifying step. Accordingly, an adhesive which requires no saponification has been desired.

Photocurable adhesives have received attention as adhesives used in bonding of polarizers to protective films for a polarizing plate (for example, see Patent Documents 1 and 2). These photocurable adhesives can bond the polarizers to the films while the films undergo no saponification, and can be expected to be used in bonding of the cellulose acylate films having low degrees of acylation.

Unfortunately, the photocurable adhesives have raised new problems.

In general, it is known that an adhesive permeates into an object such as films to some extent to form a mixed layer having an enhanced adhesive force. On the other hand, it has been found that if more than a predetermined permeation rate of the adhesive permeates into the object, the amount of the adhesive present at the interface will reduce, causing poor adhesion conversely.

While a thick coating of a photocurable adhesive can avoid this poor adhesion, this method increases the cost of the adhesive. In particular, this method applied to thin films (40 μm or less) causes ready curling of bonded films due to contraction of the permeated photocurable adhesive and a reduction in polarization of the bonded films due to a deviation in orientation angle in the films caused by the heat generated during photocuring of the permeated adhesive. To avoid these problems, a thin coating (for example, a thickness of 1 μm or less) of the photocurable adhesive is required. Unfortunately, such a thin coating of the adhesive readily causes poor adhesion. Accordingly, it is essential to control the permeation rate of the photocurable adhesive for bonding of the thin films in particular. This requirement forces, for example, blend of a photocurable adhesive less permeable into films so that the selection of adhesives is narrowed.

An enhancement in the adhesiveness has been attempted by control of the difference in the solubility parameter (SP) value between a photocurable adhesive and a film (for example, see Patent Document 3). Unfortunately, this method cannot attain sufficient adhesiveness of thin films, resulting in a ready reduction in polarization due to a deviation in the orientation angle from the optical axis of in the film.

Consequently, prevention of poor adhesion, curling of polarizing plates, and a reduction in polarization of the polarizing plates caused by bonding of thin optical compensation films with photocurable adhesives have been waited.

PRIOR ART DOCUMENT

Patent Document

Patent Document 1: Japanese Patent Application Laid-Open No. 2009-244860
Patent Document 2: Japanese Patent Application Laid-Open No. 2009-211057
Patent Document 3: Japanese Patent Application Laid-Open No. 2012-144690

SUMMARY OF THE INVENTION

Problems to be Solved by the Invention

The present invention has been attained in consideration of the problems and circumstances described above. An object of the present invention is to provide a thin optical compensation film comprising cellulose acylate and an additive, the optical compensation film having high adhesiveness to polarizers and not causing the curling of the polarizers and a reduction in polarization of the polarizing plates in bonding of the film to the polarizers with a photocurable adhesive. Another object of the present invention is to provide a polarizing plate having high curling resistance in bonding of the optical compensation film to a polarizer with a photocurable adhesive, and a liquid crystal display device including the polarizing plate.

Means for Solving the Problem

The present inventor, who has reviewed the causes of the problems, has found that if a thin optical compensation film comprising a cellulose acylate having a low degree of acylation and an additive has a permeation rate controlled within a specific range of hydroxyethyl acrylate, the optical compensation film can attain high adhesiveness to a polarizer and does not cause the curling of a polarizing plate and a reduction in the polarization of the polarizing plate when the film is bonded to the polarizer with a photocurable adhesive, and has achieved the present invention.

The problems described above are accordingly solved in the present invention which is characterized as follows.

1. An optical compensation film comprising:
a cellulose acylate having a degree of acylation in a range of 2.0 to 2.5, and an additive, the optical compensation film having a thickness in a range of 15 to 40 µm, wherein at least one surface of the optical compensation film has a permeation rate of hydroxyethyl acrylate in a range of 10 to 25 pl/15 sec when 50 pl of hydroxyethyl acrylate is dropwise placed onto the film at 23° C. and 55% RH.

2. The optical compensation film according to claim 1, wherein the cellulose acylate has a weight average molecular weight Mw in a range of 120000 to 200000.

3. The optical compensation film according to claim 1 or 2, wherein the cellulose acylate has a Ca content in a range of 10 to 60 ppm.

4. The optical compensation film according to any one of claims 1 to 3, wherein the additive has an SP value in a range of 10.0 to 11.5 $(cal/cm^3)^{1/2}$ determined at 25° C. by Fedors method.

5. The optical compensation film according to any one of claims 1 to 4, wherein the film has an r value in a range of 1.1 to 1.5 where the r value is represented by Expression (1):

$$r=d_1/d_2 \qquad \text{Expression (1)}$$

where d1 represents an additive content on one surface of the optical compensation film, and d2 is an additive content on the other surface of the optical compensation film.

6. A polarizing plate comprising:
the optical compensation film according to claim 1; and
a polarizer,
wherein a surface of the optical compensation film is bonded to one surface of the polarizer with a photocurable adhesive, the surface of the optical compensation film satisfying a permeation rate of hydroxyethyl acrylate within the range specified in claim 1.

7. A liquid crystal display device, comprising the polarizing plate according to claim 6.

Effects of Invention

The present invention can provide a thin optical compensation film that comprises cellulose acylate and an additive, has high adhesiveness to a polarizer and does not cause the curling of a polarizing plate and a reduction in polarization of the polarizing plate in bonding of the film to the polarizer with a photocurable adhesive. The present invention can also provide a polarizing plate comprising the optical compensation film and a polarizer bonded to the optical compensation film with a photocurable adhesive and having high curling resistance, and a liquid crystal display device including the polarizing plate.

Although the mechanism to demonstrate the advantageous effects of the present invention has not been clarified, the present inventor presumes the following mechanism.

At least one surface of the optical compensation film according to the present invention has a permeation rate of hydroxyethyl acrylate (hereinafter abbreviated to HEA) within a range of 10 to 25 pl/15 sec when 50 pl of HEA is dropwise placed onto the film at 23° C. and 55% RH. HEA is used as an index indicating the permeation rate of the photocurable adhesive because HEA has the highest permeability to films comprising cellulose esters among typical monomers used in the photocurable adhesives. In comparison with the permeation rate of HEA, an adhesive comprising another monomer having a lower permeating rate shall attain the intended effects of the present invention, i.e., prevention of reductions in adhesiveness, curling resistance, and polarization when the adhesive is applied to the optical compensation film according to the present invention. HEA has an SP value of 12.5 $(cal/cm^3)^{1/2}$ and diacetyl cellulose has an SP value of 12 to 13 $(cal/cm^3)^{1/2}$, which support the high permeability of HEA to the cellulose ester films.

The optical compensation film according to the present invention can be controlled to have an optimal permeability of the photocurable adhesive. Such an optical compensation film prevents poor adhesion even with any traditional photocurable adhesives, and can prevent the curling of a polarizing plate and a reduction in polarization thereof because a large amount of the adhesive is unnecessary. The optical compensation film according to the present invention gives wider ranges of selection on the type and composition of adhesives.

The present inventor, who has conducted extensive research, has found that the permeation rate of HEA is effectively controlled by adjusting the weight average molecular weight Mw of cellulose acylate within a specific range, and that the optical compensation film can prevent permeation of HEA therein, under an increased Ca content, a controlled SP value of the additive within a specific range, a controlled distribution of the additive across the thickness such that a larger content of additive is present on the surface, in contact with the surface of the adhesive, of the optical compensation film, and an appropriate combination thereof.

DESCRIPTION OF EMBODIMENTS

Figure 1A:
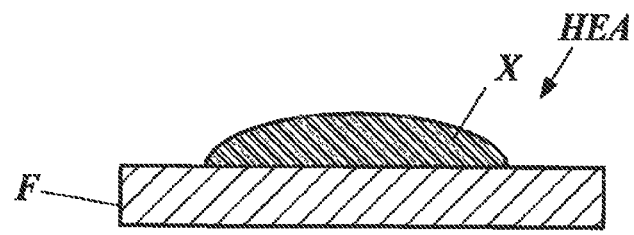
FIG. 1A is a schematic view illustrating droplets during determination of the volume of HEA permeated into a film.

The optical compensation film according to the present invention is a thin optical compensation film comprising cellulose acylate having a low degree of acylation and an additive, wherein at least one surface of the optical compensation film has a permeation rate of hydroxyethyl acrylate (HEA) within a specific value. These technical characteristics are common to claims 1 to 7 of the present invention.

In an aspect according to the present invention, the cellulose acylate having a weight average molecular weight Mw ranging from 120000 to 200000 is effective in control of the permeation rate of HEA to attain the advantageous effects of the present invention. The cellulose acylate preferably contains 10 to 60 ppm of Ca. It is presumed that Ca ions serve as crosslinking points between cellulose acylate molecules to increase the apparent molecular weight of cellulose acylate.

The additive according to the present invention preferably has an SP value in a range of 10.0 to 11.5 $(cal/cm^3)_{1/2}$ determined at 25° C. by a Fedors method. The additive preferably has an SP value appropriately remote from the SP value of HEA to control the permeation rate of HEA. An SP value of the additive within this range is preferred because such an SP value is not significantly remote from the SP value of diacetyl cellulose and can maintain the transparency of the film.

Preferably, the additive is unevenly distributed in the optical compensation film such that the amount of the additive on one surface of the film is larger than that on the other surface thereof. Such uneven distribution can more readily control the permeation rate of HEA.

The permeation rate of HEA is preferably controlled by an appropriate combination of an additive having an SP value within the preferred range and control of the distribution of the additive in the film.

Furthermore, the surface of the optical compensation film according to the present invention having a permeation rate of HEA within the specified range is bonded to one surface of a polarizer with a photocurable adhesive to prepare a polarizing plate, so that the optical compensation film attains high adhesiveness to the polarizer, and can prevent the curling of the polarizing plate and a reduction in polarization thereof.

The polarizing plate can be suitably incorporated in liquid crystal display devices.

The present invention, the components thereof, and embodiments and aspects for implementing the present invention will now be described in detail. Through the specification, the term "to" between two numerical values indicates that the numeric values before and after the term are inclusive as the lower limit value and the upper limit value, respectively.

<Optical Compensation Film>

The optical compensation film according to the present invention comprises a cellulose acylate having a degree of acylation ranging from 2.0 to 2.5 and an additive, and has a thickness of 15 to 40 μm, wherein at least one surface of the optical compensation film has a permeation rate of hydroxyethyl acrylate within the range of 10 to 25 pl/15 sec when 50 pl of hydroxyethyl acrylate is dropwise placed onto the film at 23° C. and 55% RH. Such a configuration can attain high adhesiveness to a polarizer and prevent the curling of the polarizing plate and a reduction in polarization thereof when the optical compensation film is bonded to the polarizer with a photocurable adhesive.

The permeation rate of hydroxyethyl acrylate can be determined with a micro contact angle meter. For example, the permeation rate of hydroxyethyl acrylate can be determined with a micro contact angle meter (MCA-3) available from Kyowa Interface Science Co., Ltd. by the following procedure.

(1) HEA (50 pl) is dropwise placed from a glass tube having an inner diameter of 5 μm onto a film at 23° C. and 55% RH.

(2) Immediately after the dropping, an image of droplets is taken in, and the volume of the droplets is calculated with software attached to the micro contact angle meter. The volume of the droplets is defined as X (FIG. 1A).

Figure 1B:
FIG. 1B is a schematic view illustrating droplets during determination of the volume of HEA permeated into a film.

(3) An image is taken in every one second immediately after the dropping, and the volume of the droplets is calculated from the photograph taken after 15 seconds from the dropping. The calculated volume is defined as Y (FIG. 1B).

(4) From the difference X−Y, the volume of HEA permeated onto the film for 15 seconds can be determined.

The "optical compensation film comprising cellulose acylate" according to the present invention, which is hereinafter referred to as a "cellulose acylate film", will now be described.

<Cellulose Acylate>

The cellulose acylate film according to the present invention comprises a cellulose acylate having a degree of acylation in the range of 2.0 to 2.5. Such a cellulose acylate having a low degree of acylation can attain high retardation, and can prepare a thin optical compensation film having high retardation. High retardation can be given at a low draw ratio to avoid failures such as breakage of the film. Unlike cellulose acylate having a degree of acylation of more than 2.5, a large amount of a retardation enhancer is unnecessary, advantageously avoiding an increase in haze and bleeding out.

The cellulose molecule is composed of a large number of glucose units linked to each other, and each of the glucose units has three hydroxy groups. The number of acyl groups introduced into the three hydroxy groups is referred to as the degree of acylation. For example, acetyl groups in diacetyl cellulose (DAC) are linked to 2 to 2.5 hydroxy groups per glucose unit on average.

Examples of the cellulose acylate according to the present invention include carboxylic acid esters having about 2 to 22 carbon atoms. Esters of aromatic carboxylic acids can be used, and lower fatty acid esters of cellulose are particularly preferred. The lower fatty acid in the lower fatty acid esters of cellulose indicates a fatty acid having six or less carbon atoms. The acyl group linked to the hydroxy group may be linear or branched, or may form a ring. The acyl group may have a substituent. The acyl group is preferably selected from those having 2 to 6 carbon atoms. Acyl groups having 2 to 4 carbon atoms are preferred, and those having 2 to 3 carbon atoms are more preferred.

Examples of the preferred cellulose acylate include cellulose acetate, cellulose propionate, cellulose butyrate, and mixed fatty acid esters, such as cellulose acetate propionate, cellulose acetate butyrate, and cellulose acetate phthalate described in Japanese Patent Application Laid-Open Nos. H10-45804 and H8-231761, and U.S. Pat. No. 2,319,052. Among these compounds, diacetyl cellulose is particularly preferred in the invention.

The degree of acylation of cellulose acylate can be determined in accordance with ASTM D-817-91. A preferred degree of acylation is 2.18 to 2.45.

A cellulose acylate having a degree of acylation of less than 2.0 causes high moisture absorbance and moisture permeation of the film, resulting in insufficient protection of the polarizer.

To control the permeation rate of HEA, the weight average molecular weight Mw of the cellulose acylate is within the range of preferably 100000 to 200000, more preferably 120000 to 200000.

In general, polymers having higher molecular weights are less soluble in solvents. In the present invention, the weight average molecular weight Mw of the cellulose acylate is controlled within this range to increase the density of the cellulose chain and reduce the mobility of cellulose molecules. Such control can reduce the solubility of the cellulose in a solvent and thus can reduce the permeation rate of HEA. A weight average molecular weight Mw within this range is preferred for effective control of the permeation rate of HEA, prevention of a significant increase in the viscosity of a dope used in solution casting, and thus prevention of a poor appearance, such as traces of a die used in casting.

A cellulose acylate having a weight average molecular weight Mw in the range of 100000 to 120000 will exhibit high permeability of HEA. In this case, the permeation rate of HEA can be controlled by adjusting the amount of Ca ions in the resin or adding an additive described later to the resin. A cellulose acylate having a weight average molecular weight Mw of less than 100000 exhibits a significantly large permeation rate of HEA, and is not suitable in the present invention.

A weight average molecular weight Mw within the specified range leads to a controlled permeation rate of HEA and high physical properties, such as mechanical strength, of the optical compensation film.

The number average molecular weight (Mn) of the cellulose acylate is preferably in the range of 30000 to 150000 because the resulting cellulose acylate film has high mechanical strength. A cellulose acylate having a number average molecular weight of 40000 to 100000 is more preferably used.

The ratio (Mw/Mn) of the weight average molecular weight (Mw) of the cellulose acylate to the number average molecular weight (Mn) thereof is preferably 1.4 to 3.0.

The number average molecular weight (Mn) and the weight average molecular weight (Mw) of the cellulose acylate are determined by gel permeation chromatography (GPC).

The measuring conditions are listed below.
Solvent: methylene chloride
Columns: Shodex K806, K805, and K803G (available from Showa Denko K.K., the three columns are connected)
Column temperature: 25° C.
Concentration of sample: 0.1 mass %
Detector: RI Model 504 (available from GL Sciences Inc.)
Pump: L6000 (available from Hitachi, Ltd.)
Flow rate: 1.0 ml/min
Calibration curves: calibration curves derived from thirteen samples of standard polystyrenes STK (available from Tosoh Corporation, Mw: 1000000 to 500) are used. The thirteen samples are eluted at substantially equal intervals.

The cellulose acylate according to the present invention can be prepared by a known method. Specifically, the cellulose acylate can be prepared with reference to the method described in Japanese Patent Application Laid-Open No. H10-45804.

Examples of cellulose or a raw material for cellulose acylate include, but should not be limited to, cotton linters, wood pulp (derived from softwood and hardwood), and kenaf. The cellulose acylates derived from these raw materials may be mixed in any proportion for use.

Commercially available products of cellulose acylate may also be used. Examples of the commercial products of cellulose acylate include L20, L30, L40, and L50 available from Daicel Corporation, and Ca398-3, Ca398-6, Ca398-10, Ca398-30, and Ca394-60S available from Eastman Chemical Company.

In the present invention, the calcium (Ca) content in the cellulose acetate is preferably within the range of 10 to 60 ppm. At a content within this range, luminous spot foreign substances and the haze of the film are not increased and a reduction in polarization of the polarizing plate can be prevented.

The calcium (Ca) content can be determined by a known method. For example, the following method can be used. After dry cellulose acylate is completely burned, the ash is dissolved in hydrochloric acid (pre-treatment), and the Ca content is measured by atomic absorption. The observed value is expressed as a calcium content (ppm) in 1 g of dry cellulose acylate.

In general, Ca ions cause an increase in the haze of the film or the viscosity of the dope, and use of a smaller amount of Ca is preferred in traditional optical compensation films. The present inventor, however, has found that a predetermined amount of Ca ions can control the permeation rate of HEA in a cellulose acylate having a relatively low molecular weight. This is probably because Ca ions serve as cross-linking points between cellulose acylate molecules to increase the apparent molecular weight of the cellulose acylate. Accordingly, Ca ions contained in the cellulose acylate in the range described above is suitable for the inventive object.

A preparative procedure of a preferred cellulose acetate to the present invention will now be described.

Preparation of Cellulose Acetate

Synthetic Example 1

Pulp dissolved by a Kraft process (α-cellulose content: 93%) was disintegrated in water. Water was replaced with acetone, and the pulp was dried. Acetic acid (500 parts by mass) was uniformly sprinkled onto the pulp (100 parts by mass), and was mixed with the pulp at 40° C. for 30 minutes for activation pretreatment of the mixture.

A mixture of acetic anhydride (250 parts by mass) and sulfuric acid (4.0 parts by mass) was added to the activated mixture for esterification by a normal method. The reaction product generated heat by a reaction of water contained in the raw material pulp with acetic anhydride and a reaction of cellulose with acetic anhydride. The reaction temperature was adjusted by external cooling. An organic solvent (125 parts by mass) was then added to the reaction product to perform acetification while the reaction product was kept warm.

After the organic solvent in the reaction solution was thermally removed, an aqueous solution of 20% calcium acetate (35 parts by mass) was mixed with the reaction solution to completely neutralize sulfuric acid in the system. Excess calcium acetate (1.09 times equivalents relative to sulfuric acid) was added.

The completely neutralized reaction mixture was kept at 150° C. for 50 minutes, and the reaction mixture was placed under atmospheric pressure at 100° C. A diluted aqueous acetic acid solution was added to the reaction mixture under stirring. Cellulose acetate flakes were separated, were sufficiently washed with water, were extracted, and were dried. The cellulose acetate flakes had a degree of acetylation of 2.4, a number average molecular weight of 47500, and a weight average molecular weight of 166000.

Synthetic Example 2

The 20% calcium acetate aqueous solution (35 parts by mass) used in Synthetic Example 1 was replaced with a 20% magnesium acetate aqueous solution (29 parts by mass, 1.00 time equivalents relative to sulfuric acid).

Synthetic Example 3

The amount of the 20% calcium acetate aqueous solution added in Synthetic Example 1 was changed to 39 parts by mass (1.21 times equivalents relative to sulfuric acid).

Synthetic Example 4

The amount of the 20% magnesium acetate aqueous solution in Synthetic Example 2 was changed to 37 parts by mass (1.28 times equivalents relative to sulfuric acid).

Synthetic Example 5

The amount of the 20% calcium acetate aqueous solution added in Synthetic Example 1 was changed to 28 parts by mass (0.98 times equivalents relative to sulfuric acid).

In the optical compensation film according to the present invention, any other cellulose acylate and the following thermoplastic resins can also be used in combination within a range exhibiting the advantageous effects of the present invention.

Examples of the thermoplastic resins usable in the present invention include general-purpose resins, such as polyethylene (PE), high density polyethylene, middle density polyethylene, low density polyethylene, polypropylene (PP), poly(vinyl chloride) (PVC), poly(vinylidene chloride), polystyrene (PS), poly(vinyl acetate) (PVAc), Teflon (registered trademark) (polytetrafluoroethylene, PTFE), ABS resins (acrylonitrile butadiene styrene resins), AS resins, and acrylic resins, e.g., PMMA.

For use requiring mechanical strength or resistance against breakage, for example, the following resins can be used: polyamides (PA) or nylon, polyacetals (POM), polycarbonates (PC), modified poly(phenylene ethers) (m-PPE, modified PPE, PPO), poly(butylene terephthalate) (PBT), poly(ethylene terephthalate) (PET), glass-reinforced poly (ethylene terephthalate) (GF-PET), and cyclic polyolefins (COP).

For use requiring a high thermal deformation temperature and durability to long-term usage, for example, the following resins can be used: poly(phenylene sulfide) (PPS), polytetrafluoroethylene (PTFE), polysulfones, polyethersulfones, noncrystalline polyarylates, liquid crystal polymers, polyether ether ketones, thermoplastic polyimides (PI), and polyamide-imides (PAI).

The type and molecular weight of the resin can be combined according to the applications of the present invention.

<Additive>

The cellulose acylate film according to the present invention further comprises an additive. The additive plays an important role in control of the permeation rate of the photocurable adhesive.

It is believed that the permeation rate of HEA into the film greatly depends on the properties of cellulose acylate. However, the permeation rate of HEA can also be adjusted by an additive.

To effectively control the permeation rate of HEA with the additive, the additive has an SP value appropriately different from the SP value of HEA (12.5 $(cal/cm^3)^{1/2}$. The difference between these two SP values is preferably 1.0 $(cal/cm^3)^{1/2}$ or more, more preferably 1.5 $(cal/cm^3)^{1/2}$ or more. Namely, an additive having an SP value in the range of 10.0 to 11.5 $(cal/cm^3)^{1/2}$ should preferably be selected.

<Determination of SP Value>

Throughout the specification, the term "solubility parameter (SP value)" indicates a value expressed with a square root of the cohesive energy of molecules, and is described in Chapter IV, Solubility Parameter Values, Polymer Handbook (Second Edition). The SP values in the specification are quoted from this book. In the specification, the SP value indicates a value at 25° C. expressed in $(cal/cm^3)^{1/2}$.

The SP values not found in this book can be calculated by a method described in R. F. Fedors, Polymer Engineering Science, 14, p. 147 (1974). Namely, the SP value can be calculated by the following expression:

SP value=$(\Delta E/V)^{1/2}$ where $\Delta E$ represents a cohesive energy density; V represents a molecular volume.

For example, the SP values of the cellulose acylate, the additive, HEA, and other adhesive compositions according to the present invention can be calculated with Scigress Explorer Ver. 2.4 (available form FUJITSU LIMITED) based on the idea of R. F. Fedors above.

The content of such an additive is preferably at least 5 mass % or more, more preferably 10 mass % or more relative to the cellulose acylate. The content is preferably 20 mass % or less relative to the cellulose acylate to avoid bleeding out of the additive. Some additives contained in an amount of 10 mass % or more may cause bleeding out or reduce the physical properties of the film, such as mechanical properties.

A preferred process in such a case is as follows: while the additive content over the entire film is restricted, a higher amount of additive is concentrated on the surface of the film in contact with the surface of the polarizer to be bonded. A higher level of additive at or near the interface with the adhesive can effectively reduce the permeation rate of HEA. Such a preferred process can reduce the permeability of the adhesive while maintaining the physical properties of the film in bulk.

The method of locally concentrating the additive on one surface of the film will be described later. In a preferred method, the residual solvent content at the detachment of the film is reduced to accelerate the drying of the film on a casting metal support (also referred to as a metal support, a casting support, or a belt), so that the additive can be eccentrically disposed on the surface of the film in contact with the surface of the metal support.

Alternatively, a skin layer containing a larger amount of additive is concentrated on a core layer through a co-casting process described later so that the additive can eccentrically reside on one surface, in contact with the surface of the metal support, of the film, for example.

Preferred examples of the additive include polyesters represented by Formula (I).

<Compound Represented by Formula (I)>

Formula (I): X—O—B—{O—C(=O)-A-C(=O)—O—B}$_n$—O—X wherein B represents a linear or branched alkylene group having 2 to 6 carbon atoms or a linear or branched cycloalkylene group; A represents an aromatic ring having 6 to 14 carbon atoms, a linear or branched alkylene group having 2 to 6 carbon atoms, or a linear or branched cycloalkylene group having 2 to 6 carbon atoms; X represents a hydrogen atom or a monocarboxylic residue containing an aromatic ring having 6 to 14 carbon atoms; n represents an integer of 1 or more.

The polyester represented by Formula (I) is an alternating copolymer prepared by alternating copolymerization of a dicarboxylic acid having an aromatic ring (6 to 14 carbon atoms), a linear or branched alkylene group, or a cycloalkylene group (each having 2 to 6 carbon atoms) with a linear or branched alkylenediol having 2 to 6 carbon atoms or a cycloalkylenediol.

Aromatic dicarboxylic acids and dicarboxylic acids having a linear or branched alkylene group or a cycloalkylene group may be used alone or in the form of a mixture. At least 10% or more of aromatic dicarboxylic acid is preferably contained for high miscibility with the cellulose acylate. Both terminals of the polyester may be capped with a monocarboxylic acid having an aromatic ring (6 to 14 carbon atoms).

Examples of the dicarboxylic acid having an aromatic ring (6 to 14 carbon atoms) or the aromatic dicarboxylic acid having 6 to 16 carbon atoms include phthalic acid, isophthalic acid, terephthalic acid, 1,5-naphthalenedicarboxylic acid, 1,4-naphthalenedicarboxylic acid, 1,8-naphthalenedicarboxylic acid, 2,3-naphthalenedicarboxylic acid, 2,6-naphthalenedicarboxylic acid, 2,8-naphthalenedicarboxylic acid, 2,2'-biphenyldicarboxylic acid, and 4,4'-biphenyldicarboxylic acid. Among these acids, preferred are terephthalic acid, 2,6-naphthalenedicarboxylic acid, and 4,4'-biphenyldicarboxylic acid.

Examples of the dicarboxylic acid having a linear or branched alkylene group or a cycloalkylene group (2 to 6 carbon atoms) include malonic acid, succinic acid, glutaric acid, adipic acid, pimelic acid, suberic acid, 1,2-cyclohexanedicarboxylic acid, and 1,4-cyclohexanedicarboxylic acid. Among these acids, preferred are succinic acid, adipic acid, and 1,4-cyclohexanedicarboxylic acid.

Examples of the linear or branched alkylenediol or the cycloalkylenediol having 2 to 6 carbon atoms include ethanediol (ethylene glycol), 1,2-propanediol, 1,3-propanediol, 1,2-butanediol, 1,3-butanediol, 2-methyl-1,3-propanediol, 1,4-butanediol, 1,5-pentanediol, 3-methyl-1,5-pentanediol, 1,6-hexanediol, 1,4-cyclohexanediol, and 1,4-cyclohexanedimethanol. Among these diols, preferred are ethanediol (ethylene glycol), 1,2-propanediol, 1,3-propanediol, and 1,3-butanediol.

Among these compounds, A is preferably a benzene, naphthalene, or biphenyl ring having an optional substituent because such a ring can significantly reduce Tg of the polymer. The substituent which can be introduced into the benzene, naphthalene, or biphenyl ring includes an alkyl group having 1 to 6 carbon atoms, an alkenyl group having 2 to 6 carbon atoms, or an alkoxy group having 1 to 6 carbon atoms.

Examples of the monocarboxylic acid having an aromatic ring (6 to 14 carbon atoms) and capping both terminals of the polyester include benzoic acid, ortho-toluic acid, meta-toluic acid, par-toluic acid, para-tertiary-butylbenzoic acid, dimethylbenzoic acid, and para-methoxybenzoic acid. Among these acids, preferred are benzoic acid, para-toluic acid, and para-tertiary-butylbenzoic acid.

The aromatic polyester can be readily prepared by any one of the polyesterification reaction of dicarboxylic acid with alkylenediol or cycloalkylenediol by a normal method described above, the thermofusion condensation by a transesterification reaction, and the interface condensation of chlorides of these acids with glycols. Furthermore, the aromatic monocarboxylic acid listed above can be added to prepare a polyester end-capped therewith.

Examples of Aromatic polyesters (PES-1) to (PES-14) and (ar-1) to (ar-20) which can be used in the present invention will be shown below:

-continued
[Formula 2]
| Aromatic Polyester Compound | Skelton of Aromatic Dicarboxylic Acid (A) | Skelton of Diol (B) |
|---|---|---|
| (PES-13) | ![structure] | —CH₂—CH₂— (with CH₃ branches) |
| (PES-14) | ![structure] | isobutylene-type diol |
[Formula 3]
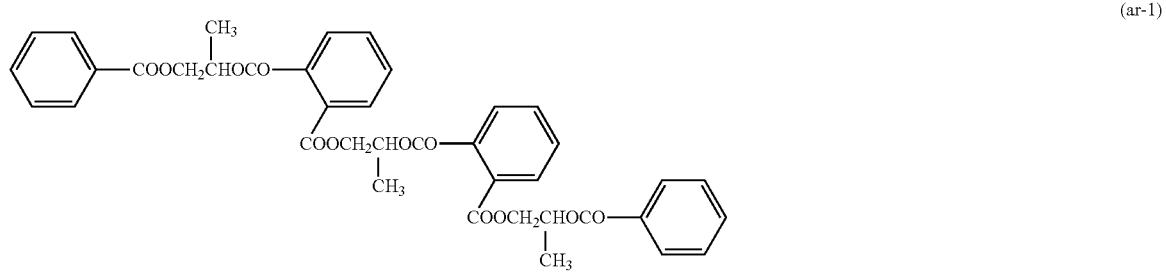
(ar-1) Mw: 696
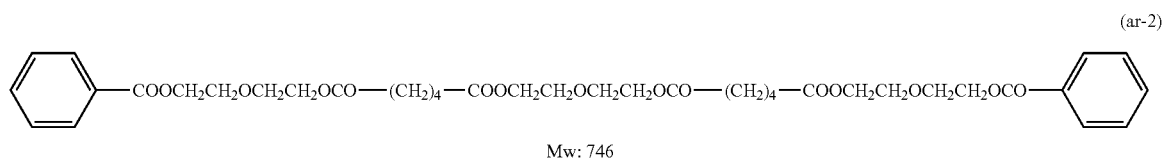
(ar-2) Mw: 746
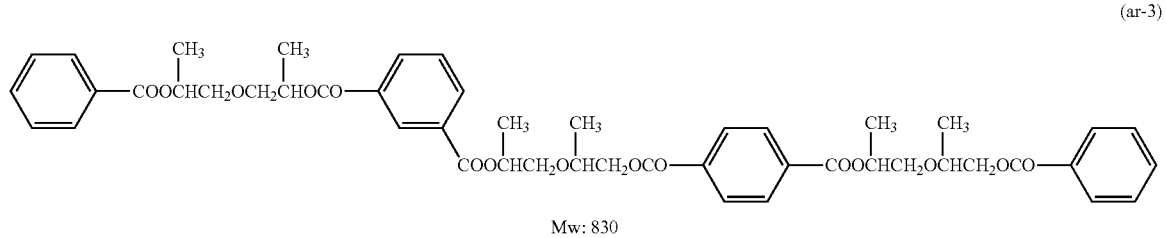
(ar-3) Mw: 830
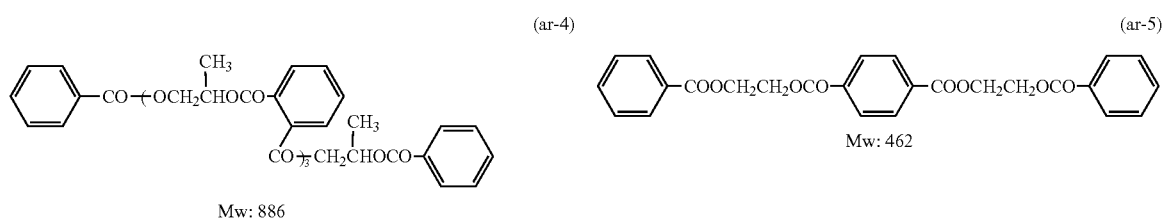
(ar-4) Mw: 886    (ar-5) Mw: 462
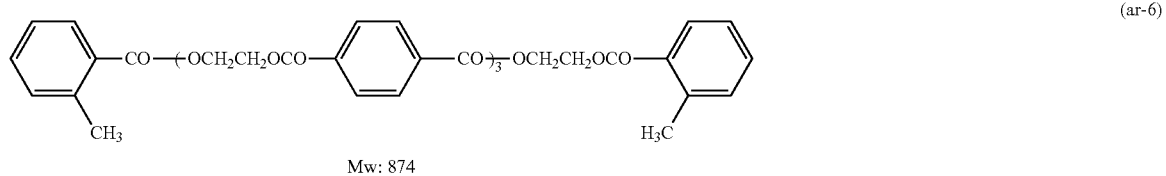
(ar-6) Mw: 874

-continued
[Formula 4]
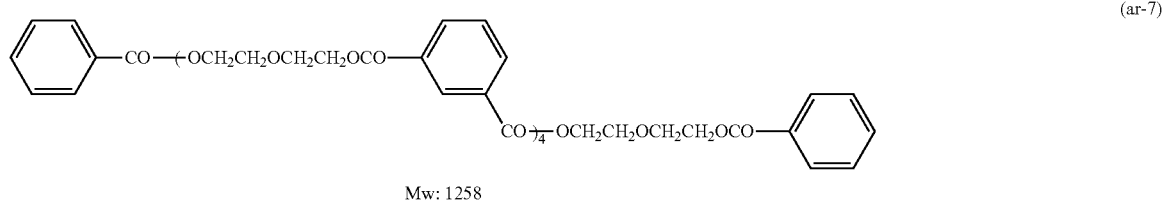
(ar-7)
Mw: 1258
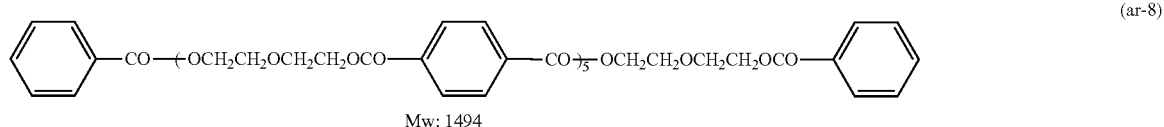
(ar-8)
Mw: 1494
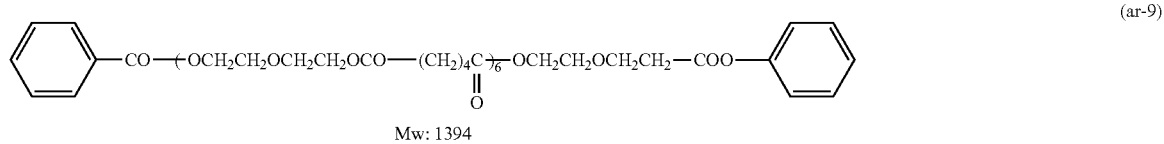
(ar-9)
Mw: 1394
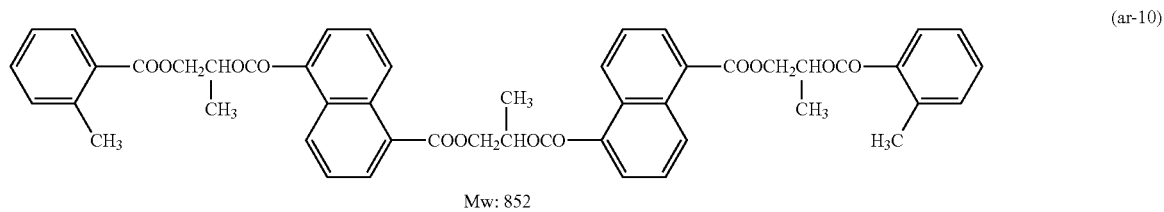
(ar-10)
Mw: 852
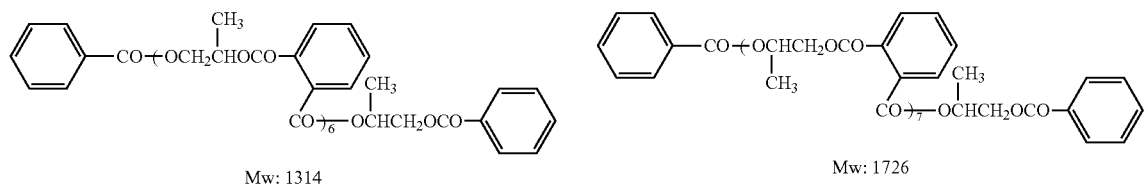
(ar-11)  (ar-12)
Mw: 1314   Mw: 1726
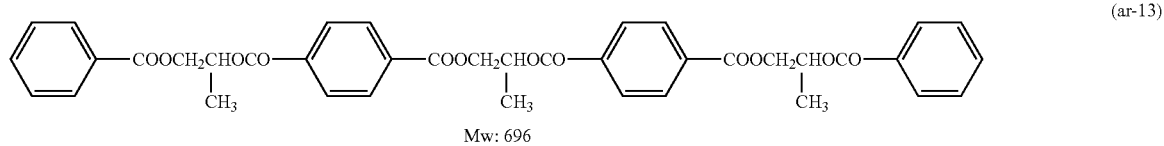
(ar-13)
Mw: 696
[Formula 5]
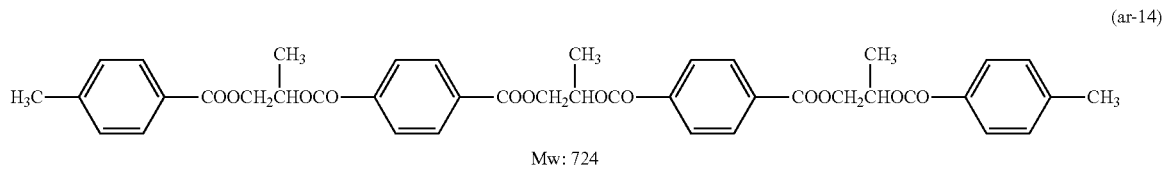
(ar-14)
Mw: 724
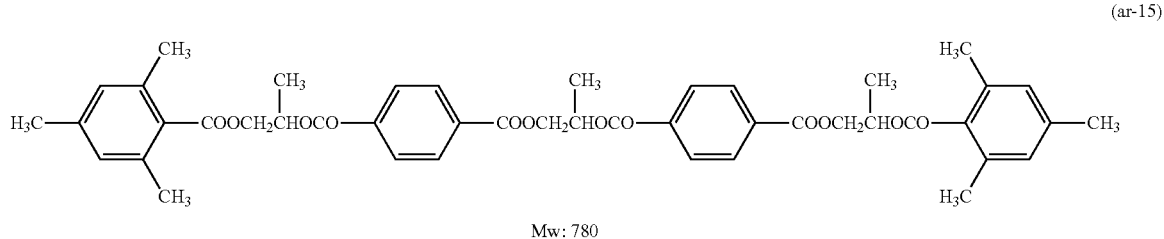
(ar-15)
Mw: 780

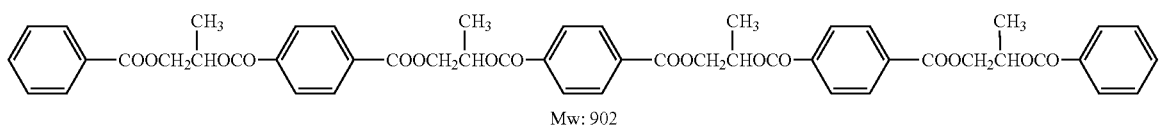
(ar-16) Mw: 902

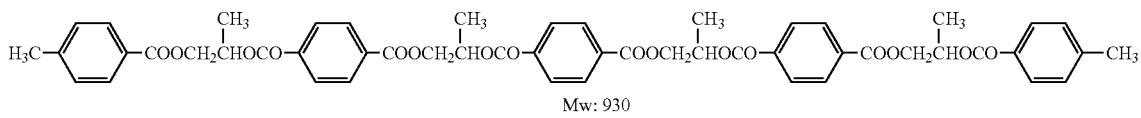
(ar-17) Mw: 930

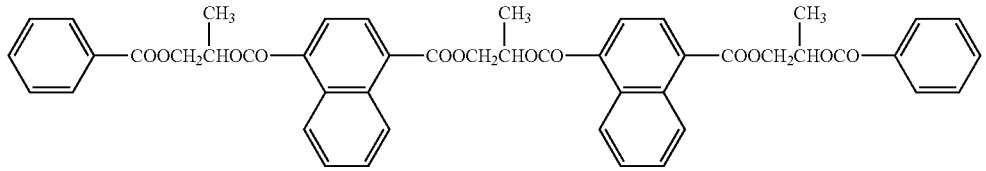
(ar-18) Mw: 796

[Formula 6]

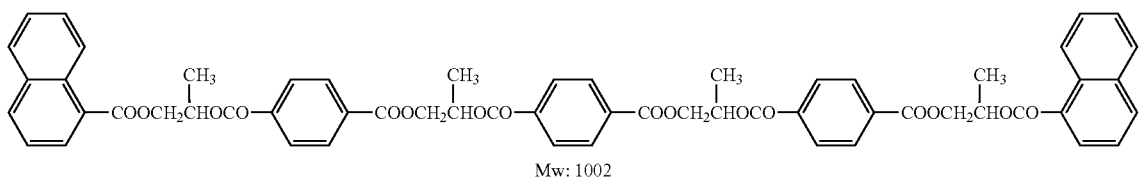
(ar-19) Mw: 1002

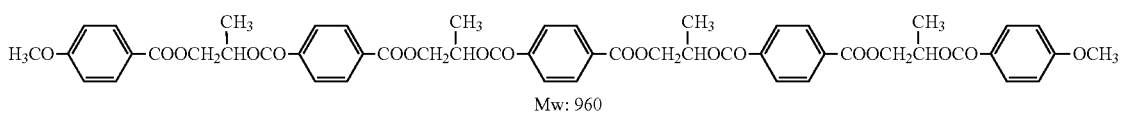
(ar-20) Mw: 960

The SP values of the compounds listed above will be shown in Table 1.

TABLE 1

| | SP value (cal/cm$^3$)$^{1/2}$ |
|---|---|
| ar-1 | 11.4 |
| ar-2 | 10.7 |
| ar-3 | 10.8 |
| ar-4 | 11.5 |
| ar-5 | 11.6 |
| ar-6 | 11.8 |
| ar-7 | 11.5 |
| ar-8 | 11.6 |
| ar-9 | 10.6 |
| ar-10 | 12.2 |
| ar-11 | 11.6 |
| ar-12 | 11.7 |
| ar-13 | 11.4 |
| ar-14 | 11.3 |
| ar-15 | 11.1 |
| ar-16 | 11.5 |
| ar-17 | 11.4 |
| ar-18 | 12.4 |
| ar-19 | 12.3 |
| ar-20 | 10.1 |

In the cellulose acylate film according to the present invention, the additive content on the surface, bonded to the polarizer, of the film is preferably different to some extent from that of the other surface of the film. The content of the additive can be determined by time-of-flight secondary ion mass spectrometry.

The determined additive contents on one surface and the other surface of the cellulose acylate film are defined as d1 and d2, respectively. The r value represented by Expression (1) is preferably within the range of 1.1 to 1.5:

$$r = d1/d2 \quad \text{Expression (1)}$$

An r value of 1.1 or more can control the permeation rate of HEA. The r value may be 1.1 or more, preferably 1.2 or more, more preferably 1.3 or more, still more preferably 1.4 or more. An r value of 1.5 or less prevents the curling of the polarizing plate due to heat generated by permeation of HEA during the preparation of the polarizing plate.

The time-of-flight secondary ion mass spectrometry (TOF-SIMS) can give the chemical information on atoms or molecules in a solid sample in a monolayer level, and a distribution of a specific atom or molecule at a spatial resolution of 100 nm or less. TOF-SIMS, which is one of the secondary ion mass spectrometries (SIMS), analyzes samples by irradiating a solid sample with a primary ion beam, and detecting ions (secondary ions) emitted from the outermost surface of the sample. The name TOF-SIMS is derived from a time-of-flight mass spectrometer (TOF-MS).

TOF-SIMS enables substantially non-destructive measurement of samples by irradiation of the samples with a pulsed ion beam, and has been extensively used in the analysis of organic materials or polymer materials.

<Other Additives>

Examples of other preferred additives include sugar esters represented by Formula (II):

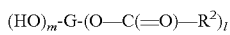  Formula (II)

wherein G represents a monosaccharide or disaccharide residue; $R^2$ represents an aliphatic or aromatic group; m represents the total number of hydroxy groups directly bonded to the monosaccharide or disaccharide residue; l represents the total number of $-(O-C(=O)-R^2)$ groups directly bonded to the monosaccharide or disaccharide residue; $3 \le m+l \le 8$; $l \ne 0$.

The compound having a structure represented by Formula (II) cannot be readily isolated as a single compound having the predetermined total number m of hydroxy groups and the predetermined total number l of $-(O-C(=O)-R^2)$ groups, and thus is prepared as a mixture of compounds containing components having different values m and l. Thus essential are properties of the mixture of compounds having different numbers of hydroxy groups (m) and different numbers of $-(O-C(=O)-R^2)$ groups (l).

The cellulose acylate film according to the present invention preferably comprises a compound having a structure represented by Formula (II) and having a mixing ratio of a component at m=0 to a component at m>0 of 45:55 to 0:100 in view of haze characteristics. Such a compound more preferably has a mixing ratio of a component at m=0 to a component at m>0 of 10:90 to 0.1:99.9 from the viewpoint of performance and cost. The contents of the component at m=0 and the component at m>0 can be measured by high-speed liquid chromatography under normal conditions.

Specific examples of the monosaccharide residue represented by G in Formula (II) include allose, altrose, glucose, mannose, gulose, idose, galactose, talose, ribose, arabinose, xylose, and lyxose.

Non-limiting examples of the structure of the compound represented by Formula (II) having a monosaccharide residue will be listed below:

[Formula 7]

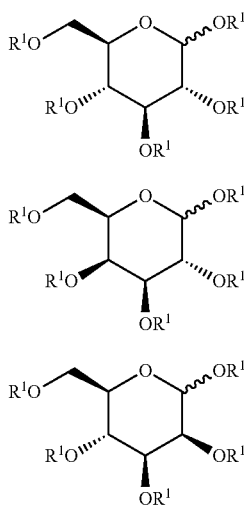

A-1

A-2

A-3

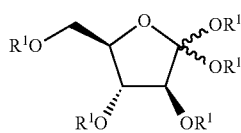

A-4

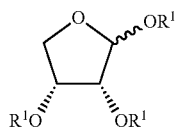

A-5

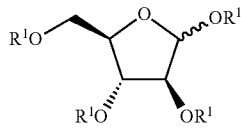

A-6

Specific examples of the disaccharide residue represented by G include trehalose, sucrose, maltose, cellobiose, gentiobiose, lactose, and isotrehalose.

Non-limiting examples of the structure of the compound represented by Formula (II) having a disaccharide residue will be listed below:

[Formula 8]

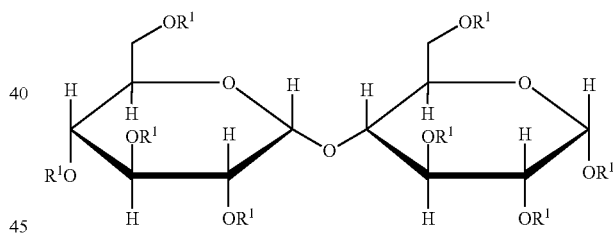

B-1

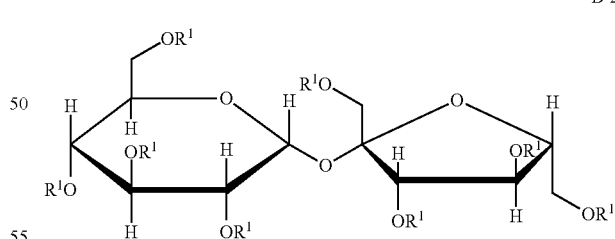

B-2

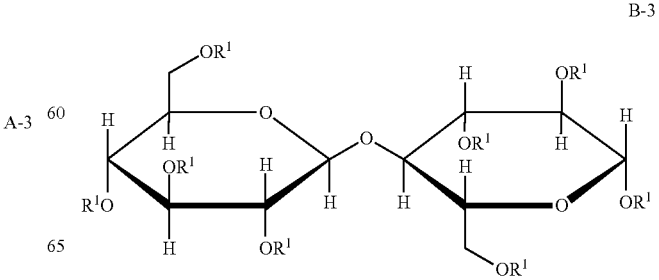

B-3

-continued

B-4

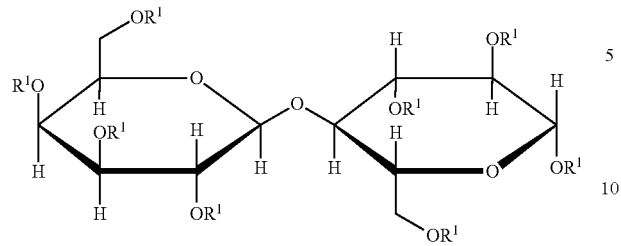

In Formula (II), an aliphatic or aromatic group represented by $R^2$ may be each independently optionally substituted.

In Formula (II), m and l are preferably $3 \leq m+l \leq 8$, more preferably $4 \leq m+l \leq 8$. $l \neq 0$. At 1 of 2 or more, the —(O—C(=O)—$R^2$) groups may be the same or different.

In the definition of $R^2$ in Formula (II), the aliphatic group may be linear, branched, or cyclic. The aliphatic group has preferably 1 to 25 carbon atoms, more preferably 1 to 20 carbon atoms, still more preferably 2 to 15 carbon atoms. Specific examples of the aliphatic group include methyl, ethyl, n-propyl, iso-propyl, cyclopropyl, n-butyl, iso-butyl, tert-butyl, amyl, iso-amyl, tert-amyl, n-hexyl, cyclohexyl, n-heptyl, n-octyl, bicyclooctyl, adamantyl, n-decyl, tert-octyl, dodecyl, hexadecyl, octadecyl, and didecyl.

In the definition of $R^2$ in Formula (II), the aromatic group may be an aromatic hydrocarbon group or an aromatic heterocyclic group, more preferably an aromatic hydrocarbon group. The aromatic hydrocarbon group has preferably 6 to 24 carbon atoms, more preferably 6 to 12 carbon atoms. Specific examples of the aromatic hydrocarbon group include benzene, naphthalene, anthracene, biphenyl, and terphenyl. Particularly preferred aromatic hydrocarbon groups are benzene, naphthalene, and biphenyl. The aromatic heterocyclic group preferably has at least one atom of oxygen, nitrogen, and sulfur atoms. Specific examples of heterocyclic groups include groups of furan, pyrrole, thiophene, imidazole, pyrazole, pyridine, pyrazine, pyridazin, triazole, triazine, indole, indazole, purine, thiazoline, thiadiazole, oxazoline, oxazole, oxadiazole, quinoline, isoquinoline, phthalazine, naphthyridine, quinoxaline, quinazoline, cinnoline, pteridin, acridine, phenanthroline, phenazine, tetrazole, benzimidazole, benzoxazole, benzothiazole, benzotriazole, and tetrazaindene. Particularly preferred aromatic heterocyclic groups are groups of pyridine, triazine, and quinoline.

Non-limiting, preferred examples of the compounds represented by Formula (II) will be listed below:

[Formula 9]

| Compound Name | Sugar Residue | Substituent 1 (OR¹ group) R¹ structure | *1 (n) | Substituent 2 (OR¹ group) R¹ structure | *1 (m) |
|---|---|---|---|---|---|
| a 1 | B-2 | —C(=O)—C₆H₅ | 8 | —H | 0 |
| a 2 | | | 7 | | 1 |
| a 3 | | | 6 | | 2 |
| a 4 | | | 5 | | 3 |
| b 1 | A-1 | —C(=O)—CH₃ | 5 | —H | 0 |
| b 2 | | | 4 | | 1 |
| b 3 | | | 3 | | 2 |
| b 4 | | | 2 | | 3 |
| c 1 | B-1 | —C(=O)—C₆H₄—CH₃ | 8 | —H | 0 |
| c 2 | | | 7 | | 1 |
| c 3 | | | 6 | | 2 |
| c 4 | | | 5 | | 3 |
| d 1 | A-5 | —C(=O)—C₆H₂(OCH₃)₃ | 3 | —H | 0 |
| d 2 | | | 2 | | 1 |
| d 3 | | | 1 | | 2 |
| e 1 | A-1 | —C(=O)—CH₂—C₆H₅ | 5 | —H | 0 |
| e 2 | | | 4 | | 1 |
| e 3 | | | 3 | | 2 |
| e 4 | | | 2 | | 3 |

*1: Substitution Degree

[Formula 9]

| Compound Name | Sugar Residue | Substituent 1 (OR¹ group) R¹ structure | *1 (n) | Substituent 2 (OR¹ group) R¹ structure | *1 (m) |
|---|---|---|---|---|---|
| f 1 | B-2 | —C(=O)—CH₃ | 8 | —H | 0 |
| f 2 | | | 7 | | 1 |
| f 3 | | | 6 | | 2 |
| f 4 | | | 5 | | 3 |
| g 1 | B-2 | —C(=O)—Pr(i) | 8 | —C(=O)—CH₃ | 0 |
| g 2 | | | 7 | | 1 |
| g 3 | | | 6 | | 2 |
| g 4 | | | 5 | | 3 |

*1: Substitution Degree

Synthetic Example of the compound represented by Formula (II) will now be described.

Sucrose (34.2 g, 0.1 mol), benzoic anhydride (180.8 g, 0.8 mol), and pyridine (399.7 g, 4.8 mol) were placed in a four-headed flask equipped with a stirrer, a reflux cooler, a thermometer, and a nitrogen inlet tube. While nitrogen gas was being bubbled from the nitrogen inlet tube, these materials were heated under stirring for an esterification reaction at 70° C. for 5 hours. The pressure in the flask was reduced to $4 \times 10^2$ Pa or less to distill off excess pyridine at 60° C. The pressure in the flask was then reduced to $1.3 \times 10$ Pa or less, and the flask was heated to 120° C. to distill off most of benzoic anhydride and generated benzoic acid. Toluene (1 L) and an aqueous solution of 0.5 mass % sodium carbonate (300 g) were added, and were stirred at 50° C. for 30 minutes. The reaction solution was left to stand until the toluene layer was separated. Finally, water (100 g) was added to the separated toluene layer to wash the toluene layer at normal temperature for 30 minutes. The toluene layer was then separated. Toluene was distilled off under reduced pressure ($4 \times 10^2$ Pa or less) at 60° C. to prepare a mixture of Compounds (C-1), (C-2), (C-3), (C-4), and (C-5). The analyses of the mixture by HPLC and LC-MASS show that Compound (C-1) was 7 mass %, Compound (C-2) 58 mass %, Compound (C-3) 23 mass %, Compound (C-4) 9 mass %, and Compound (C-5) 3 mass %. Part of the mixture was refined by silica gel column chromatography to prepare Compounds (C-1), (C-2), (C-3), (C-4), and (C-5) each having a purity of 100%.

The additional plasticizer may be any known plasticizer, and is preferably selected from the group consisting of polyvalent carboxylic acid ester plasticizers, glycolate plasticizers, phthalic acid ester plasticizers, fatty acid ester plasticizers, polyhydric alcohol ester plasticizers, ester plasticizers, and acrylic plasticizers. When two or more of these plasticizers are used, at least one of them is preferably a polyhydric alcohol ester plasticizer.

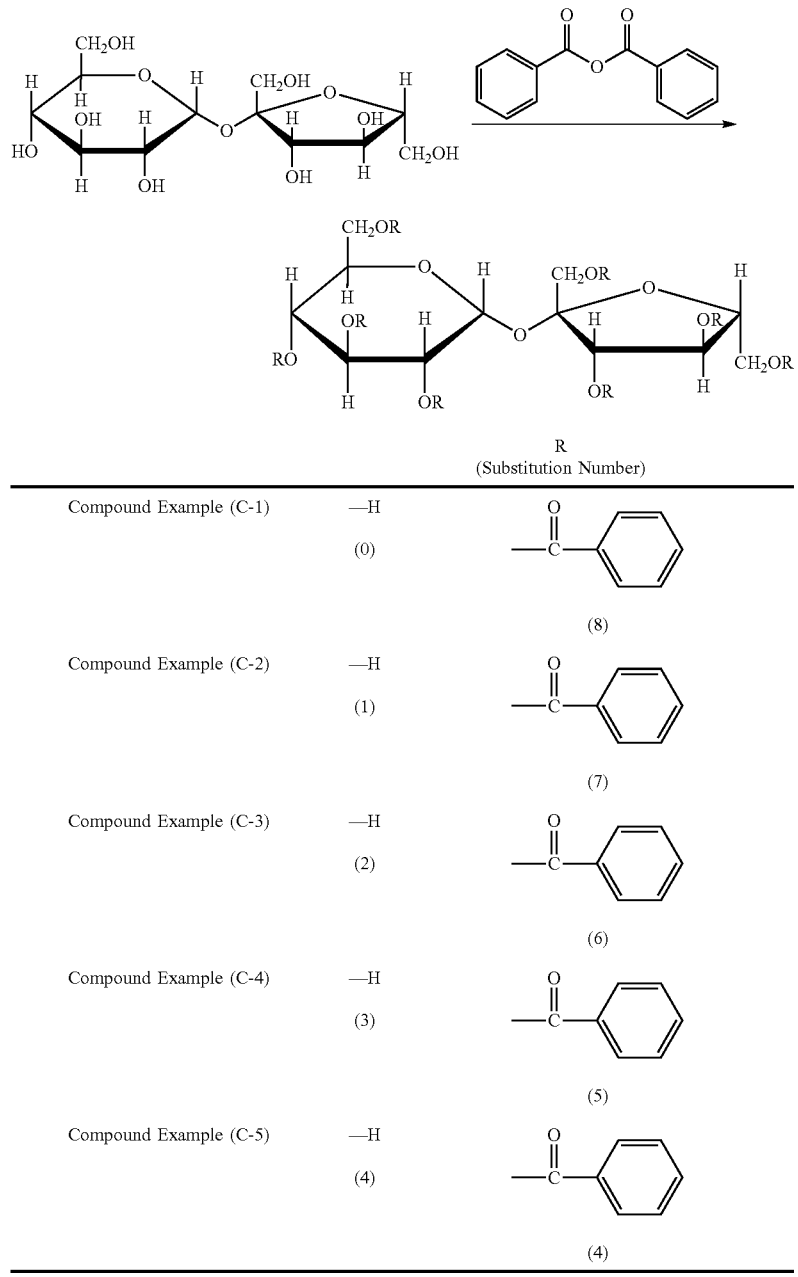

The cellulose acylate film according to the present invention preferably contains the compound represented by Formula (II) in a content of 5 to 15 mass %.

The cellulose acylate film according to the present invention may optionally contain a known plasticizer to attain the advantageous effects of the present invention. The compound represented by Formula (I) and the compound represented by Formula (II) may also be used as plasticizers. Any additional plasticizer can also be contained.

The polyhydric alcohol ester plasticizer comprises an ester of an aliphatic di- or higher-hydric alcohol and monocarboxylic acid. This plasticizer preferably has an aromatic or cycloalkyl ring in the molecule. Preferred are aliphatic di- to eicosa-hydric alcohol esters.

The polyhydric alcohol preferably used in the present invention is represented by Formula (III):

$$R_{11}\text{—(OH)}_n \qquad \text{Formula (III):}$$

wherein $R_{11}$ represents an organic group having a valence of n; n represents an integer of 2 or more; an OH group represents an alcoholic or phenolic hydroxy group.

Examples of preferred polyhydric alcohols include adonitol, arabitol, ethylene glycol, di(ethylene glycol), tri(ethylene glycol), tetra(ethylene glycol), 1,2-propanediol, 1,3-propanediol, di(propylene glycol), tri(propylene glycol), 1,2-butanediol, 3,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane, and xylitol. Particularly preferred are tri(ethylene glycol), tetra(ethylene glycol), di(propylene glycol), tri(propylene glycol), sorbitol, trimethylolpropane, and xylitol.

Any known monocarboxylic acid, such as aliphatic monocarboxylic acid, alicyclic monocarboxylic acid, and aromatic monocarboxylic acid, can be used in the polyhydric alcohol ester. Alicyclic monocarboxylic acid or aromatic monocarboxylic acid is preferred because the cellulose acylate film attains enhanced moisture permeability and retention.

Examples of preferred monocarboxylic acid include, but should not be limited to, the followings.

Preferably usable aliphatic monocarboxylic acids are linear or branched fatty acids having 1 to 32 carbon atoms. Those having 1 to 20 carbon atoms are more preferred, and those having 1 to 10 carbon atoms are most preferred. Acetic acid is preferably contained to enhance the miscibility with the cellulose acylate. A combination of acetic acid and another monocarboxylic acid is also preferred.

Examples of preferred aliphatic monocarboxylic acids include saturated fatty acids, such as acetic acid, propionic acid, butyric acid, valeric acid, caproic acid, enanthic acid, caprylic acid, pelargonic acid, capric acid, 2-ethyl-hexanoic acid, undecyl acid, lauric acid, tridecylic acid, myristic acid, pentadecylic acid, palmitic acid, heptadecyl acid, stearic acid, nonadecanoic acid, arachic acid, behenic acid, lignoceric acid, cerotic acid, heptacosanoic acid, montanic acid, melissic acid, and lacceric acid; and unsaturated fatty acids, such as undecylenic acid, oleic acid, sorbic acid, linoleic acid, linolenic acid, and arachadonic acid.

Examples of preferred alicyclic monocarboxylic acids include cyclopentanecarboxylic acid, cyclohexanecarboxylic acid, cyclooctanecarboxylic acid, or derivatives thereof.

Examples of preferred aromatic monocarboxylic acids include benzoic acid; substituted benzoic acids in which 1 to 3 alkyl groups or alkoxy groups, such as a methoxy group or an ethoxy group, are introduced into a benzene ring, such as toluic acid; aromatic monocarboxylic acids having two or more benzene rings, such as biphenyl carboxylic acid, naphthalenecarboxylic acid, tetralin carboxylic acid; and derivatives thereof. Particularly preferred is benzoic acid.

The polyhydric alcohol ester can have any molecular weight. The molecular weight is preferably 300 to 1500, more preferably 350 to 750. Polyhydric alcohol esters having higher molecular weights are less volatile while those having lower molecular weights attain enhanced moisture permeability and miscibility with the cellulose acylate.

These carboxylic acids may be used alone or in the form of a mixture to prepare polyhydric alcohol ester. OH groups in polyhydric alcohol may be completely or partially esterified.

Specific examples of the polyhydric alcohol esters will be listed as Compounds (ae-1) to (ae-34):

[Formula 12]

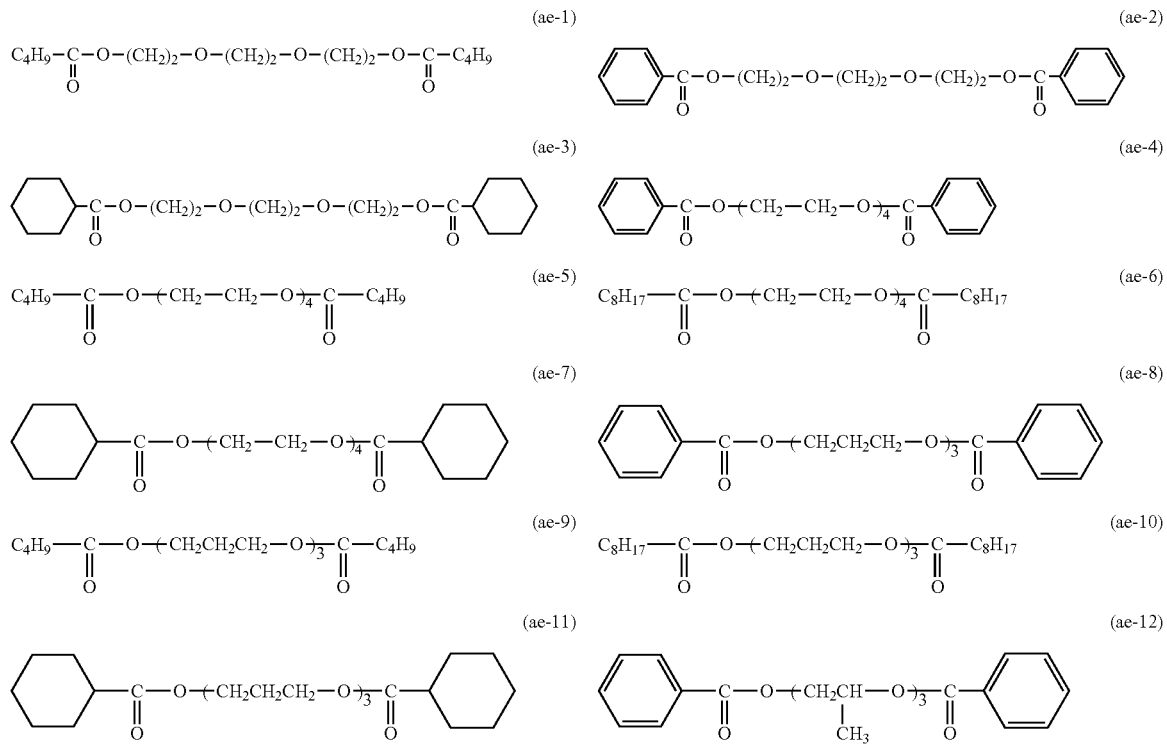

-continued
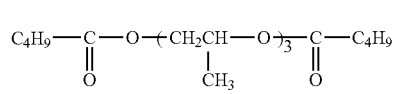 (ae-13)
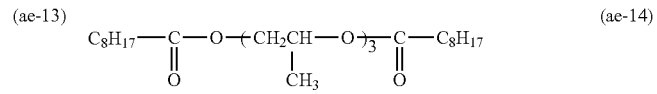 (ae-14)
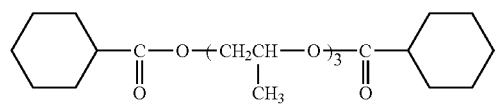 (ae-15)
[Formula 13]
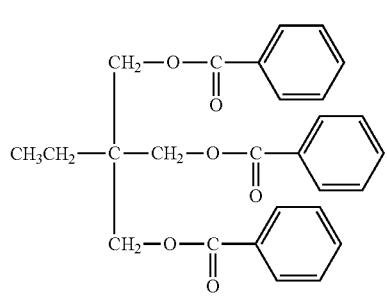 (ae-16)
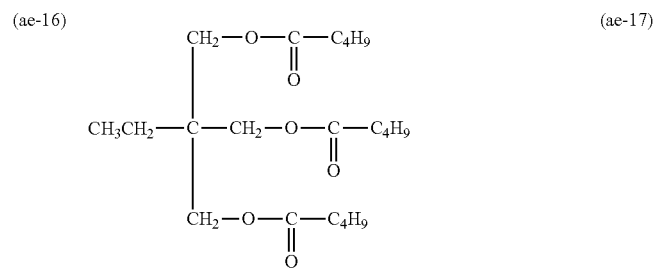 (ae-17)
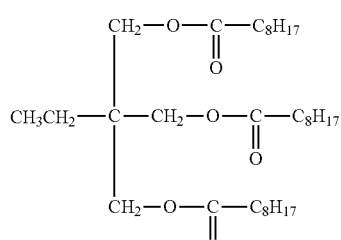 (ae-18)
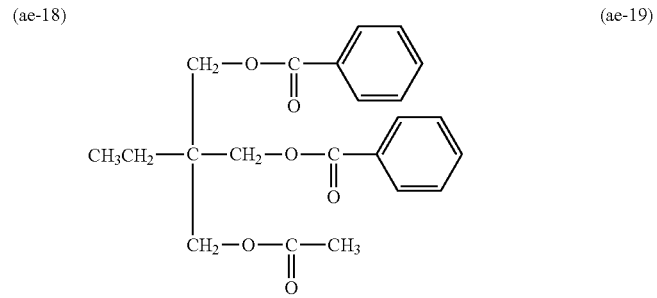 (ae-19)
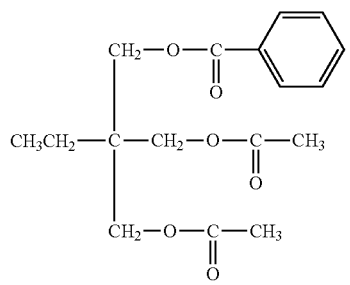 (ae-20)
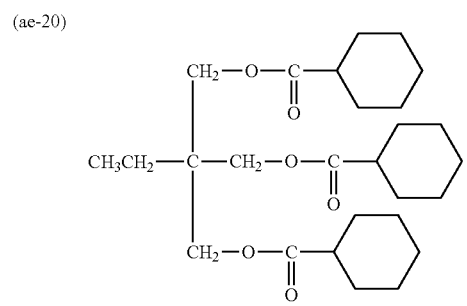 (ae-21)
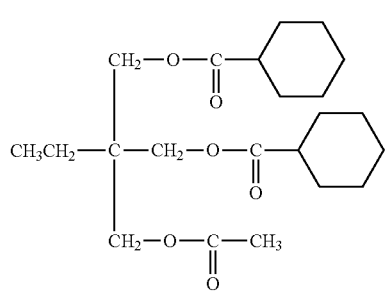 (ae-22)
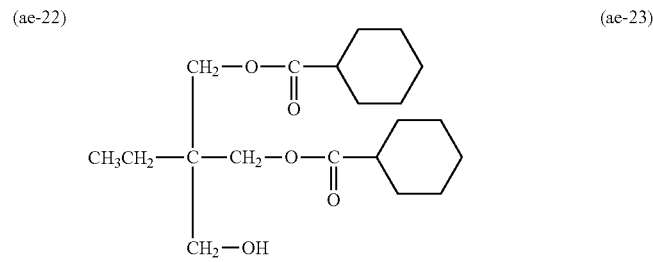 (ae-23)

[Formula 14]
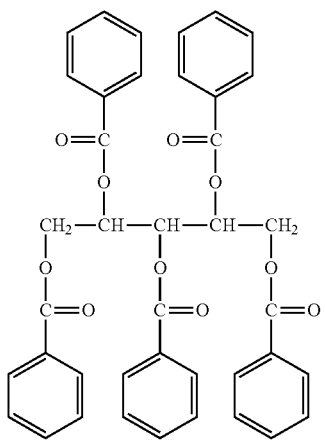 (ae-24)
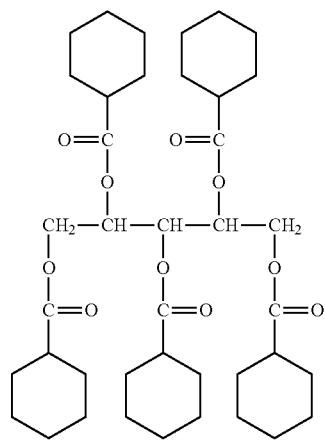 (ae-25)
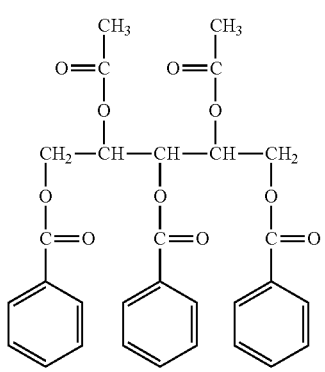 (ae-26)
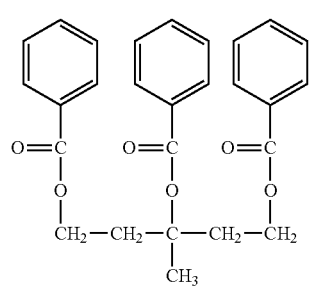 (ae-27)
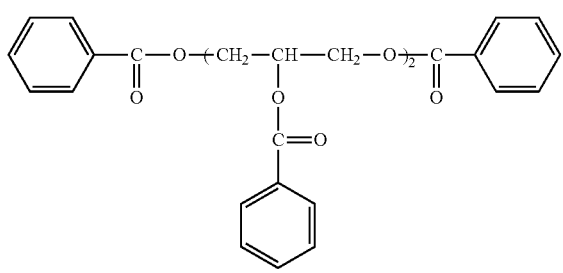 (ae-28)
[Formula 15]
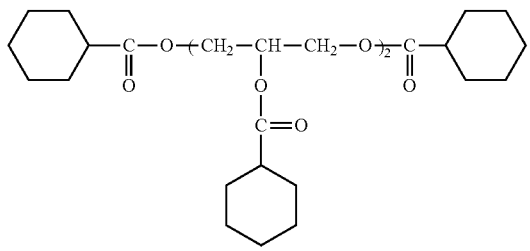 (ae-29)
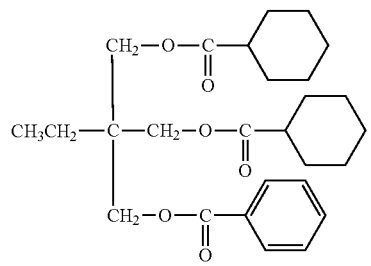 (ae-30)

-continued

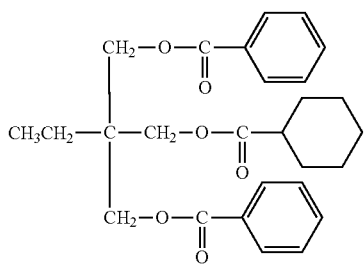
(ae-31)

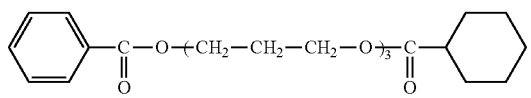
(ae-32)

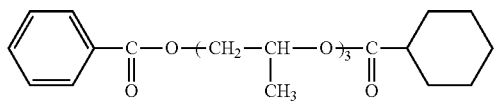
(ae-33)

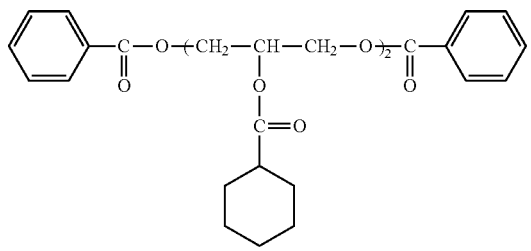
(ae-34)

The SP values of these polyhydric alcohol ester compounds will be listed in Table 2:

TABLE 2

| | SP value (cal/cm$^3$)$^{1/2}$ |
|---|---|
| ae-1 | 9.4 |
| ae-2 | 10.7 |
| ae-3 | 9.9 |
| ae-4 | 10.6 |
| ae-5 | 9.4 |
| ae-6 | 9.2 |
| ae-7 | 9.7 |
| ae-8 | 10.4 |
| ae-9 | 9.3 |
| ae-10 | 9.1 |
| ae-11 | 9.6 |
| ae-12 | 10.2 |
| ae-13 | 9.1 |
| ae-14 | 8.9 |
| ae-15 | 9.4 |
| ae-16 | 11.0 |
| ae-17 | 9.4 |
| ae-18 | 9.1 |
| ae-19 | 10.7 |
| ae-20 | 10.3 |
| ae-21 | 9.8 |
| ae-22 | 9.8 |
| ae-23 | 10.7 |
| ae-24 | 11.6 |
| ae-25 | 10.1 |
| ae-26 | 11.3 |
| ae-27 | 11.0 |
| ae-28 | 11.4 |
| ae-29 | 10.0 |
| ae-30 | 10.2 |
| ae-31 | 10.6 |
| ae-32 | 10.0 |
| ae-33 | 9.8 |
| ae-34 | 10.7 |

The polyhydric alcohol ester compound is preferably contained in an amount of 5 to 20 mass % in the cellulose acylate.

Any glycolate plasticizer can be used, and alkyl phthalyl alkyl glycolate can be preferably used.

Examples of alkyl phthalyl alkyl glycolate include methyl phthalyl methyl glycolate, ethyl phthalyl ethyl glycolate, propyl phthalyl propyl glycolate, butyl phthalyl butyl glycolate, octyl phthalyl octyl glycolate, methyl phthalyl ethyl glycolate, ethyl phthalyl methyl glycolate, ethyl phthalyl propyl glycolate, methyl phthalyl butyl glycolate, ethyl phthalyl butyl glycolate, butyl phthalyl methyl glycolate, butyl phthalyl ethyl glycolate, propyl phthalyl butyl glycolate, butyl phthalyl propyl glycolate, methyl phthalyl octyl glycolate, ethyl phthalyl octyl glycolate, octyl phthalyl methyl glycolate, and octyl phthalyl ethyl glycolate.

Examples of phthalic acid ester plasticizers include diethyl phthalate, dimethoxyethyl phthalate, dimethyl phthalate, dioctyl phthalate, dibutyl phthalate, di-2-ethylhexyl phthalate, dioctyl phthalate, dicyclohexyl phthalate, and dicyclohexyl terephthalate.

Examples of citric acid ester plasticizers include acetyltrimethyl citrate, acetyltriethyl citrate, and acetyltributyl citrate.

Examples of fatty acid ester plasticizers include butyl oleate, methylacetyl ricinoleate, and dibutyl sebacate.

Examples of phosphoric acid ester plasticizers include triphenyl phosphate, tricresyl phosphate, cresyl diphenyl phosphate, octyl diphenyl phosphate, diphenyl biphenyl phosphate, trioctyl phosphate, and tributyl phosphate.

Polyvalent carboxylic acid ester comprises an ester of a polyvalent carboxylic acid having a valence of 2 or more, preferably 2 to 20 and alcohol. Aliphatic polyvalent carboxylic acid preferably has a valence of 2 to 20. Aromatic polyvalent carboxylic acid and alicyclic polyvalent carboxylic acid preferably have a valence of 3 to 20.

Polyvalent carboxylic acid is represented by the following formula.

$$R_{12}(COOH)_{m1}(OH)_{n1} \qquad \text{Formula (IV):}$$

wherein $R_{12}$ represents an organic group having a valence (m1+n1); m1 represents an integer of 2 or more; n1 represents an integer of 0 or more; a COOH group represents a carboxy group; an OH group represents an alcoholic and/or phenolic hydroxy group.

Examples of preferred polyvalent carboxylic acid include, but should not be limited to, the followings.

Such examples include aromatic polyvalent carboxylic acids having a valence of 3 or more, such as trimellitic acid, trimesic acid, and pyromellitic acid, or derivatives thereof; aliphatic polyvalent carboxylic acids, such as succinic acid, adipic acid, azelaic acid, sebacic acid, oxalic acid, fumaric acid, maleic acid, and tetrahydrophthalic acid; and oxypolyvalent carboxylic acids, such as tartaric acid, tartronic acid, malic acid, and citric acid. Particularly preferred is oxypolyvalent carboxylic acid for an enhancement in retention.

Any known alcohol and phenol can be used in the polyvalent carboxylic acid ester used in the present invention.

For example, linear or branched aliphatic saturated alcohol or aliphatic unsaturated alcohols having 1 to 32 carbon atoms can be preferably used. Those having 1 to 20 carbon atoms are more preferable, and those having 1 to 10 carbon atoms are most preferred.

Also preferred are alicyclic alcohols, such as cyclopentanol and cyclohexanol, or derivatives thereof; and aromatic alcohols, such as benzyl alcohol and cinnamyl alcohol, or derivatives thereof.

When oxypolyvalent carboxylic acid is used as the polyvalent carboxylic acid, alcoholic or phenolic hydroxy groups in the oxypolyvalent carboxylic acid may be esterified with monocarboxylic acid.

The polyvalent carboxylic acid ester can have any molecular weight. The molecular weight is in the range of preferably 300 to 1000, more preferably 350 to 750. A higher molecular weight is preferred in view of an enhancement in retention while a lower molecular weight is preferred in view of moisture permeability and miscibility with the cellulose acylate.

The polyvalent carboxylic acid ester usable in the present invention may be prepared with one or more alcohols.

The polyvalent carboxylic acid ester usable in the present invention has an acid value of preferably 1 mgKOH/g or less, more preferably 0.2 mgKOH/g or less. An acid value within this range can reduce a variation in retardation due to environmental factors.

The acid value indicates the amount of potassium hydroxide in milligram needed to neutralize an acid in a sample (1 g) (carboxy groups in the sample). The acid value is determined in accordance with JIS K0070.

Examples of particularly preferred polyvalent carboxylic acid esters include, but should not be limited to, the followings.

Such examples include triethyl citrate, tributyl citrate, acetyltriethyl citrate (ATEC), acetyltributyl citrate (ATBC), benzoyltributyl citrate, acetyltriphenyl citrate, acetyltribenzyl citrate, dibutyl tartrate, diacetyldibutyl tartrate, tributyl trimellitate, and tetrabutyl pyromellitate.

(Ultraviolet Absorber)

The cellulose acylate film according to the present invention can contain any ultraviolet absorber. Ultraviolet absorbers absorb ultraviolet light of 400 nm or less to enhance the durability of the cellulose acylate film. The cellulose acylate film has a transmittance at a wavelength of 370 nm of preferably 10% or less, more preferably 5% or less, still more preferably 2% or less.

Any ultraviolet absorber can be used in the present invention. Examples thereof include oxybenzophenone compounds, benzotriazole compounds, salicylic acid eater compounds, benzophenone compounds, cyanoacrylate compounds, triazine compounds, nickel complex salt compounds, and powdered inorganic compounds.

Specific examples of such compounds include 5-chloro-2-(3,5-di-sec-butyl-2-hydroxylphenyl)-2H-benzotriazole, (2-2H-benzotriazol-2-yl)-6-(linear and branched dodecyl)-4-methylphenols, 2-hydroxy-4-benzyloxybenzophenone, and 2,4-benzyloxybenzophenone. The following commercially available TINUVIN products can also be preferably used: TINUVIN 109, TINUVIN 171, TINUVIN 234, TINUVIN 326, TINUVIN 327, and TINUVIN 328, which are available from BASF SE Japan Ltd.

Examples of the ultraviolet absorbers preferably used in the present invention include benzotriazole, benzophenone, and triazine compounds, particularly preferably benzotriazole and benzophenone compounds.

Discotic compounds each having a 1,3,5-triazine ring are also used as preferred ultraviolet absorbers.

The preferred ultraviolet absorbers may be of polymer ultraviolet absorbers described in Japanese Patent Application Laid-Open No. 6-148430.

The ultraviolet absorber can be added to the dope by the following methods: the ultraviolet absorber is dissolved in alcohol, for example, methanol, ethanol, or butanol; an organic solvent, for example, methylene chloride, methyl acetate, acetone, or dioxolane, or a mixture thereof, and then the mixture is added to the dope. Alternatively, the ultraviolet absorber is directly added to a dope composition.

Ultraviolet absorbers insoluble in an organic solvent, such as inorganic powder, are added to the dope in the form of dispersion in an organic solvent and cellulose acylate prepared with a dissolver or a sand mill.

The amount of the ultraviolet absorber to be added depends on the types of ultraviolet absorbers and conditions in use. In the cellulose acylate film having a dry thickness of 15 to 40 μm, the amount is preferably 0.5 to 10 mass %, more preferably 0.6 to 4 mass % relative to the total mass of the film.

(Antioxidant)

The antioxidant is also referred to as antidegradant. The cellulose acylate film may be degraded while liquid crystal image display devices including the cellulose acylate film are placed under high humidity and high temperature.

The antioxidant delays or prevents decomposition of the cellulose acylate film caused by halogen in the residual solvent or phosphoric acid in the phosphoric acid plasticizer contained in the cellulose acylate film, and is preferably contained in the cellulose acylate film.

Preferred antioxidants are hindered phenols. Examples thereof include 2,6-di-t-butyl-p-cresol, pentaerythrityl-tetrakis[3-(3,5-di-t-butyl-4-hydroxyphenyl)propionate], triethylene glycol-bis[3-(3-t-butyl-5-methyl-4-hxydroxyphenyl) propionate], 1,6-hexanediol-bis[3-(3,5-di-t-butyl-4-hydroxyphenyl)propionate], 2,4-bis-(n-octylthio)-6-(4-hydroxy-3,5-di-t-butylanilino)-1,3,5-triazine, 2,2-thiodiethylenebis[3-(3,5-di-t-butyl-4-hydroxyphenyl) propionate], octadecyl-3-(3,5-di-t-butyl-4-hydroxyphenyl) propionate, N,N'-hexamethylenebis(3,5-di-t-butyl-4-hydroxy-hydrocinnamamide), 1,3,5-trimethyl-2,4,6-tris(3, 5-di-t-butyl-4-hydroxybenzyl)benzene, and tris-(3,5-di-t-butyl-4-hydroxybenzyl)isocyanurate.

Particularly preferred are 2,6-di-t-butyl-p-cresol, pentaerythrityl-tetrakis[3-(3,5-di-t-butyl-4-hydroxyphenyl)propionate], and triethylene glycol-bis[(3-(3-t-butyl-5-methyl-4-hydroxyphenyl)propionate]. A hydrazine metal deactivator, such as N,N'-bis[3-(3,5-di-t-butyl-4-hydroxyphenyl)propionyl]hydrazine, or a phosphorus process stabilizer, such as tris(2,4-di-t-butylphenyl)phosphate, can be used in combination.

These compounds are added to the cellulose acylate film in a mass proportion of preferably 1 to 5000 ppm, more preferably 10 to 1000 ppm.

(Acid Capturing Agent)

The cellulose acylate is also decomposed by an acid at high temperature. To prevent such decomposition, the cellulose acylate film according to the present invention preferably contains an acid capturing agent.

Any compound which can react with an acid to inactivate the acid can be useful as the acid capturing agent. Among these compounds, preferred are compounds having epoxy groups described in U.S. Pat. No. 4,137,201.

Such epoxy compounds as acid capturing agents are known in the art; for example, diglycidyl ethers of various polyglycols, particularly diglycidyl ethers of polyglycol derived from condensation of about 8 to 40 mol of ethylene oxide per mol of polyglycol or glycerol. Other examples include metal epoxy compounds, epoxyfied ether condensation products, diglycidyl ether of bisphenol A (or 4,4'-dihydroxydiphenyldimethylmethane), and epoxyfied unsaturated fatty acid esters traditionally used in or with vinyl chloride polymer compositions. Particularly preferred epoxyfied unsaturated fatty acid esters are esters of fatty acids having 2 to 22 carbon atoms and alcohols having 2 to 4 carbon atoms. Examples thereof include butyl epoxy stearate. Other examples include epoxyfied vegetable oils having a variety of epoxyfied long-chain fatty acid triglyceride compositions, such as epoxyfied soybean oil, and other unsaturated natural oils. These oils are also referred to as epoxyfied natural glyceride or unsaturated fatty acid, and the fatty acids of these oils typically have 12 to 22 carbon atoms. A commercially available epoxy group-containing epoxide resin compound EPON 815C can also be preferably used.

The following acid capturing agents can also be used: oxetane compounds, oxazoline compounds, organic acid salts of alkaline earth metals, acetylacetonate complexes, and compounds described in paragraphs 0068 to 0105 in Japanese Patent Application Laid-Open No. 5-194788.

The acid capturing agent may also be referred to as acid scavenger, acid trapper, or acid catcher. These names can be used in the present invention with no discrimination.

(Fine Particles)

To enhance processability, the cellulose acylate film according to the present invention preferably contains inorganic fine particles, such as silicon dioxide, titanium dioxide, aluminum oxide, zirconium oxide, calcium carbonate, kaolin, talc, calcined calcium silicate, calcium silicate hydrate, aluminum silicate, magnesium silicate, and calcium phosphate; or a matting agent, such as crosslinked polymer. Among these compounds, preferred is silicon dioxide, which can reduce the haze of the cellulose acylate film.

The average primary particle size of the fine particles is preferably 20 run or less, more preferably 5 to 16 nm, most preferably 5 to 12 nm.

These fine particles are contained in the cellulose acylate film in the form of secondary particles having an average particle size of preferably 0.1 to 5 μm, more preferably average particle size of 0.1 to 2 μm, most preferably 0.2 to 0.6 μm. These fine particles can form an irregularity having a height of about 0.1 to 1.0 μm on the surface of the cellulose acylate film, and the irregularity can give proper slippage to the surface of the film.

The average primary particle size of the fine particles used in the present invention is determined as follows: the diameters of 100 particles are determined with a transmission electron microscope (magnification: 50000× to 2000000×), and the average of these particle diameters is defined as the average primary particle size.

The fine particles are contained in an amount of preferably 0.5 to 5 mass %, more preferably 0.6 to 4 mass % relative to the total mass of the film.

<Preparative Procedure of Cellulose Acylate Film>

The preparative procedure of a cellulose acylate film according to the present invention involves steps of casting a dope onto a support to prepare a cellulose acylate film, and then drying, detaching, and stretching the film. The dope is composed essentially of a cellulose acylate having a degree of acylation in the range of 2.0 to 2.5 and an additive. These steps are preferably carried out such that a higher content of additive resides on one surface of the cellulose acylate film relative to the other surface.

The preparative procedure of the cellulose acylate film may be solution casting or melt casting. Preferred is solution casting.

A non-limiting preparative procedure of the cellulose acylate film by solution casting as an example will now be described.

The preparation of the cellulose acylate film by solution casting, for example, involves a step of dissolving a cellulose acylate having a degree of acylation in the range of 2.0 to 2.5, an additive, and other optional additives in a solvent to prepare a dope, a step of casting the dope onto an endless metal belt support, a step of drying the cast dope into a web, a step of detaching the web from the metal support, a step of stretching the web or keeping the width of the web, a step of further drying the web, and a step of winding the finished film.

The step of preparing the dope will be described.

A higher concentration of the cellulose acylate in the dope is preferred for low drying load on the dope cast onto the metal support while a significantly high concentration of the cellulose acylate leads to increased load during filtration and thus low filtration precision. For compatibility between low drying load and high filtration precision, the concentration is preferably 10 to 35 mass %, more preferably 15 to 25 mass %. A predetermined amount of additive is preferably placed in batch to a reaction container.

Solvents may be used alone or in combination in the preparation of the dope. A combination of a good solvent and a poor solvent to the cellulose acylate is preferred in view of production efficiency. A higher content of good solvent is preferred for the solubility of the cellulose acylate.

A preferred mixed solvent contains 70 to 98 mass % of good solvent and 2 to 30 mass % of poor solvent. The good solvent is defined as a solvent that can dissolve the cellulose acylate. The poor solvent is defined as a solvent that cannot swell or dissolve the cellulose acylate. The ratio of good solvent to the poor solvent is thus varied according to the degree of acylation of the cellulose acylate.

Examples of the good solvent used in the present invention include, but should not be limited to, organic halogen compounds, such as methylene chloride, dioxolanes, acetone, methyl acetate, and acetomethyl acetate. Particularly preferred is methylene chloride or methyl acetate.

Examples of the poor solvent preferably used in the present invention, but should not be limited to, methanol, ethanol, n-butanol, cyclohexane, and cyclohexanone. The dope preferably contains 0.01 to 2 mass % of water.

The mixed solvent used to dissolve the cellulose acylate can be reused. The solvents removed from the film in the film forming step can be recovered for reuse.

The recovered solvent may contain slight amounts of additives, such as a plasticizer, an ultraviolet absorber, a polymer, and a monomer component, which were dissolved from the cellulose acylate. Such recovered solvent can also be preferably reused, or can be purified for reuse, if necessary.

In the preparation of the dope, the cellulose acylate can be dissolved in an ordinary manner. Heating under pressure can heat the solvent to a temperature higher than the boiling point at normal pressure of the solvent.

The cellulose acylate solution is heated with stirring under high pressure at a temperature higher than the boiling point of the solvent under normal pressure and lower than the boiling point of the solvent under the high pressure. Such a process can preferably prevent generation of undissolved massive products, such as gel and huge agglomerate.

External heating is preferred. For example, a heating jacket is preferred, which can readily control the temperature.

After addition of the solvent, a heating temperature is preferably raised to enhance the solubility of the cellulose acylate whereas a significantly high heating temperature requires a significantly high pressure, resulting in low productivity.

A preferred heating temperature ranges from 45 to 120° C., more preferably from 60 to 11° C., most preferably from 70 to 105° C.

Pressurization may be carried out by injection of an inert gas, such as nitrogen gas, into the reaction container or increasing the vapor pressure of the solvent by heating. The pressure is adjusted such that the solvent does not boil at a predetermined temperature.

The cellulose acylate is preferably dissolved as follows: The cellulose acylate is mixed with a poor solvent to be wetted or swollen, and a good solvent is added to dissolve the cellulose acylate.

The cellulose acylate can also preferably be dissolved while being cooled in a solvent, such as methyl acetate.

In the next stage, the cellulose acylate solution is passed through an appropriate filter, such as filter paper. A filter having a lower absolute filtration precision is preferred to remove insoluble substances while a significantly low absolute filtration precision readily causes clogging of the filter. For this reason, the absolute filtration precision of the filter is preferably 0.008 mm or less, more preferably 0.001 to 0.008 mm, most preferably 0.003 to 0.006 mm.

The filter can be composed of any material. Preferred are plastic filters composed of polypropylene and Teflon (registered trademark) and metallic filters composed of stainless steel because these filters do not cause detachment of fibers.

The raw material cellulose acylate is preferably filtered to remove or decrease impurities, particularly luminous spot foreign substances contained in the raw material.

The luminous spot foreign substances indicate spots (foreign substances) emitting leaked light from one of two polarizing plates disposed in a cross-Nicol state with an optical film interposed therebetween when the other of the polarizing plates is illuminated.

The number of luminous spot foreign substances having a diameter of 0.01 mm or more is preferably 200/cm² or less, more preferably 100/cm² or less, still more preferably 50/cm² or less, most preferably 0 to 10/cm² or less. It is preferred that the number of luminous spot foreign substances having a diameter of 0.01 mm or less be as small as possible.

The dope can be filtered by a normal method. Preferably, the dope is filtered while being heated under pressure at a temperature higher than the boiling point at normal pressure of the solvent, because the filtration pressure before and after filtration does not significantly vary.

A preferred temperature ranges from 45 to 120° C., more preferably 45 to 70° C., most preferably 45 to 55° C.

A lower filtration pressure is preferred. The filtration pressure is preferably 1.6 MPa or less, more preferably 1.2 MPa or less, most preferably 1.0 MPa or less.

As described above, a series of steps is performed such that a higher content of additive resides on one surface of the cellulose acylate film relative to the other surface. Specifically, these steps are performed such that the r value is 1.1 or more, where the r value is determined from the observed additive contents d1 and d2 on both surfaces of the prepared cellulose acylate film.

An r value of 1.1 or more can be attained by any technique. Three, non-limiting, typical embodiments (First to Third Embodiments) on such a technique will now be described.

First Embodiment

According to the first embodiment, the object can be achieved by the selection of materials used in the preparation of the dope. Specifically, materials for three essential components of the dope, i.e., cellulose acylate, an additive, and a solvent are selected such that the Hansen solubility parameter values of these three components have a predetermined relationship. The inventor has discovered that such selection can attain eccentric distribution of the additive across the thickness of the resulting cellulose acylate film. More specifically, the materials for these three components may be selected such that $HSP_C$, $HSP_G$, and $HSP_S$, which represent the Hansen solubility parameter values of the cellulose acylate, the additive, and the solvent, respectively, has the relationship represented by Expression (2):

$$|HSP_G - HSP_C| > |HSP_G - HSP_S| \qquad \text{Expression (2)}$$

Hansen solubility parameter (HSP) is developed by Charles M. Hansen to indicate the solubilities of substances. The Hansen solubility parameter values $HSP_C$, $HSP_G$, and $HSP_S$ are determined by the method described in Hansen, Charles (2007). Hansen Solubility Parameters: A User's Handbook, Second Edition. If the cellulose acylate, the additive, and the solvent are each a mixture of two or more materials, the SP value determined as the mixture is defined as $HSP_C$, $HSP_G$, and $HSP_S$.

Technically, in Expression (2), $|HSP_G - HSP_C|$ indicates the absolute value of the difference between the solubility parameter (SP) value $HSP_G$ of the additive and the SP value $HSP_C$ of the cellulose acylate. $|HSP_G - HSP_C|$ represents the absolute value of the difference between the SP value $HSP_G$ of the additive and the SP value HSPs of the solvent. If the relationship represented by Expression (2) holds, the absolute value $|HSP_G - HSP_C|$ is greater than the absolute value $|HSP_G - HSP_S|$ that is, the SP value HSPs of the additive is closer to the SP value $HSP_S$ of the solvent than to the SP value $HSP_C$ of the cellulose acylate.

The materials selected so as to satisfy the relationship represented by Expression (2) attains eccentric distribution of the additive across the thickness of the cellulose acylate film. Such a mechanism, although not fully clarified yet, is presumed as follows, considering that substances having closer solubility parameters have higher solubility (affinity). The solvent gradually volatilizes from the surface not in contact with the metal support (interface with air) during drying of the cellulose acylate film on the metal support, causing a gradient concentration of the solvent across the thickness of the film. At this time, if the affinity of the additive with the solvent is higher than that with the cellulose acylate, the additive will be concentrated near the metal support where a higher content of the solvent is present.

When the SP values $HSP_C$, $HSP_G$, and $HSP_S$ satisfy the relationship represented by Expression (2), the absolute value $|HSP_G-HSP_C|$ is preferably 1.1 times or more, more preferably 1.2 times or more, most preferably, 1.5 times or more the absolute value $|HSP_G-HSP_S|$. At a difference between these two absolute values in such a range, the cellulose acylate film can successfully have an eccentric distribution of the additive across the thickness.

Casting of the dope will now be described.

In the casting step, a metal support having a mirror-finished surface can be preferably used. Such a preferred metal support includes a stainless steel belt or a cast drum having a plated surface.

The width of the cast dope can be in the range of 1 to 4 m. The surface temperature of the metal support used in the casting step ranges from −50° C. to a temperature less than the boiling point of the solvent. A higher temperature can preferably accelerate the drying of the web. A significantly higher temperature may foam the web or reduce the flatness of the web.

The support temperature is in the range of preferably 0 to 55° C., more preferably 25 to 50° C.

It is also preferred that the web be cooled for gelation, and such a web containing a large amount of a residual solvent be detached from the drum.

The temperature of the metal support can be controlled by any method. Such a method includes a method of blowing hot or cold air to the metal support or a method of bringing hot water into contact with the rear side of the metal support. Use of hot water conducts heat more effectively to shorten the time until the metal support reaches a predetermined temperature. The method with hot air may use air having a temperature higher than the target temperature.

The cellulose acylate film prepared by the casting is then dried, and is detached from the metal support.

According to the second embodiment, the additive is eccentrically distributed across the thickness of the cellulose acylate film by a method of controlling process conditions after the dope is cast onto the support.

Specifically, the residual solvent content in the film is reduced when the cellulose acylate film is detached from the support. Namely, it turned out that if the cellulose acylate film is dried under a severer condition, the additive is eccentrically distributed across the thickness of the cellulose acylate film.

More specifically, it is preferred that the process conditions be controlled such that the residual solvent is 90% or less in the cellulose acylate film detached from the support. The residual solvent content in the film detached from the support is preferably 85% or less, more preferably 80% or less. The control according to the second embodiment may be performed in combination with the first embodiment (selection of the materials used in the preparation of the dope). The cellulose acylate film having an eccentric distribution of the additive can also be attained by only one of these methods.

The residual solvent content is defined by Expression (3):

Residual solvent content (mass %)={$(M-N)/N$}×100  Expression (3):

where M represents the mass of a sample taken at any point of time during or after the preparation of the web or the cellulose acylate film, and N represents the mass of the sample after heated at 115° C. for one hour.

The process conditions to control the residual solvent content within a predetermined amount include drying conditions before the film is detached from the support. The film undetached from the support can be dried under any drying condition. Persons skilled in the art could determine the drying conditions without any difficulty to control the residual solvent content in the film within the predetermined amount in the film detached from the support. For example, the drying conditions are as follows: the drying temperature is in the range of preferably about 25 to 50° C., more preferably 35 to 45° C. The drying time is preferably about 15 to 150 seconds, more preferably 25 to 120 seconds. Any other drying condition out of these ranges may also be selected such that the residual solvent content in the film detached from the support can be controlled within the predetermined amount.

The drying step can be based on any known means with reference to appropriate knowledge. Specific examples of the drying means include hot air, infrared radiation, heating rollers, and microwaves. Preferred is hot air for convenience.

The cellulose acylate film (web) detached from the support is then stretched. At this time, particularly preferred is a tenter process which stretches the cellulose acylate film (web) in the transverse direction (direction perpendicular to the machine direction in the plane of the cellulose acylate film) while both ends of the film are held with clips. The peeling tension in removal of the film from the support is preferably 300 N/m or less.

The thickness and the retardation of the cellulose acylate film can be controlled by adjusting the stretching conditions.

For example, the retardation can be varied by increasing or decreasing the tension applied in the longitudinal direction. The retardation can be varied by successive or simultaneous biaxial stretching or successive monoaxial stretching of the cellulose acylate film in the longitudinal direction (also referred to as a machine direction or a casting direction) of the film and in the transverse direction.

The final draw ratios in the two orthogonal axial directions are preferably in the ranges of 0.8 to 1.5 times in the longitudinal direction and 1.1 to 2.0 times in the transverse direction, more preferably in the ranges of 0.8 to 1.1 times in the longitudinal direction and 1.3 to 1.7 times in the transverse direction, most preferably in the range of 1.3 to 1.5 times in the transverse direction.

The cellulose acylate film according to the present invention, which is readily stretched and readily given retardation, has high resistance against breakage during the stretching.

The temperature during the stretching is in the range of preferably 120° C. to 200° C., more preferably 130° C. to 170° C., most preferably more than 140° C. and 150° C. or less. The residual solvent content in the cellulose acylate film during the stretching is in the range of preferably 0 to 20%, more preferably 0 to 15%. More specifically, the stretching is preferably performed, for example, at 155° C. and 11% of residual solvent or at 155° C. and 2% of residual solvent. Alternatively, the stretching is preferably performed at 160° C. and 11% of residual solvent or at 160° C. and less than 1% of residual solvent.

The web can be stretched in any manner. Examples of such a manner include longitudinal stretching of a web with rollers having different circumferential speeds; longitudinal stretching of a web both ends of which are fixed with clips or pins and spreading the intervals between the clips or the pins in the traveling direction; transverse stretching of a web both ends of which are fixed with clips or pins and spreading the intervals between the clips or the pins in the transverse direction; or longitudinal and transverse stretching of a web by spreading the intervals between the clips or the pins in both directions at the same time. These manners can be used in combination.

In a tenter process, the clips are preferably driven with a linear drive system. Such a drive system enables smooth stretching to reduce risks, such as breakage.

In the film forming step, the maintenance of the width of the film or the stretching of the film in the transverse direction is preferably performed with a tenter, which may be a pin tenter or a clip tenter.

After the stretching, the film is further dried to reduce the residual solvent content to preferably 1 mass % or less, more preferably 0.1 mass % or less, most preferably 0 to 0.01 mass % or less.

The drying temperature of the stretched film is preferably 125° C. or more, more preferably 140° C. or more. A drying temperature of more than 150° C. is close to the glass transition temperature Tg of the cellulose acylate film, and may reduce the retardation or cause deviation of the orientation angle.

The solution casting process has been described by way of an example while the film may be prepared by melt casting in view of production cost. In this case, a desired cellulose acylate film can be prepared under the control according to the second embodiment.

The molding process by melt casting, which involves melting of a resin by heat without any solvent (such as methylene chloride) used in the solution casting, can be classified into melt extrusion molding, press molding, inflation molding, injection molding, blow molding, and stretch molding. Among these processes, melt extrusion is suitable to attain a cellulose acylate film having high mechanical strength and surface accuracy. A cellulose acylate web can be prepared by any specific procedure to implement the melt casting with reference to appropriate knowledge.

In addition to solution casting and melt casting, a co-casting process can prepare a cellulose acylate film having eccentric distribution of the additive across the thickness.

The third embodiment will now be described, which relates to a method of preparing a cellulose acylate film having eccentric distribution of an additive across the thickness of the cellulose acylate film by co-casting. Specifically, the procedure according to the third embodiment involves a step of co-casting individual dopes containing an additive in different contents onto a support, and a step of drying, detaching, and stretching the cast film.

Third Embodiment

Individual dopes containing cellulose acylate, an additive, and other additives are prepared. In the co-casting of two dopes, Dope A having a lower additive content and Dope B having a higher additive content are prepared. Dope A and Dope B may be co-cast onto a metal support such that Dope A resides on the surface layer of the film and Dope B resides in the film in contact with the metal support, or vise versa. Three or more dopes containing the additive in different contents are preferably co-cast while individual dopes are arranged such that the additive content increases from the surface layer of the film to the metal support. In the third embodiment, the dope can contain the additive in any content. The content may be appropriately adjusted according to the permeation rate of HEA of the whole cellulose acylate film.

Figure 2:
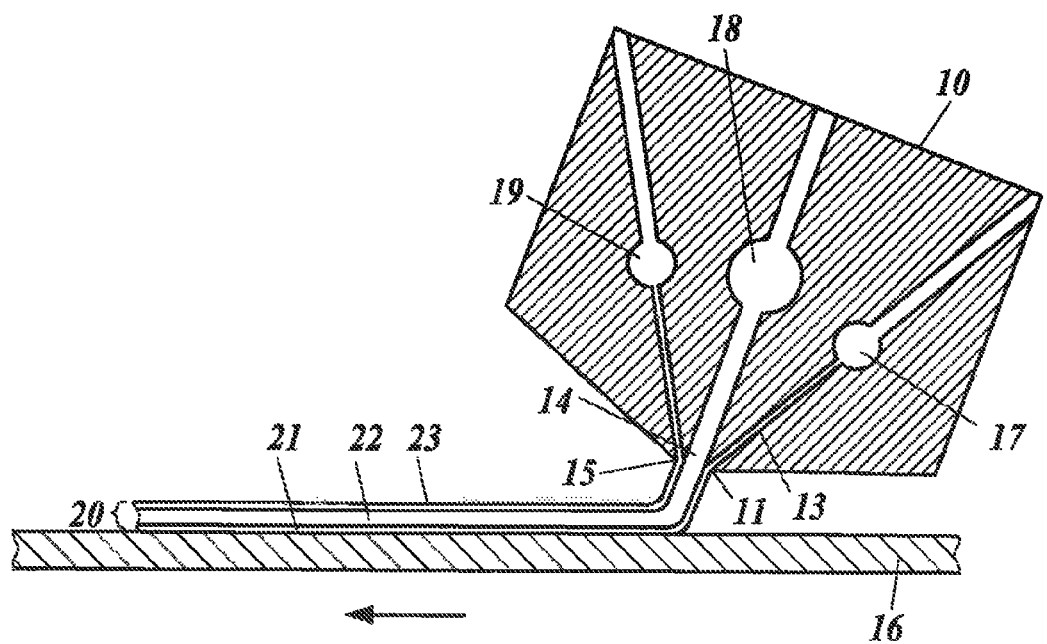
FIG. 2 is a schematic view illustrating a co-casting die and formation of a multi-layer web by casting.

FIG. 2 is a schematic view illustrating a co-casting die and formation of a multi-layer web (web immediately after casting is also referred to as a dope film). As illustrated in FIG. 2, a co-casting die 10 includes several (three in FIG. 2) slits 13 and 15 for a skin layer and a slit 14 for a core layer in a die lip 11. The respective slits simultaneously cast a dope 17 for a skin layer, a dope 18 for a core layer, and a dope 19 for a skin layer onto a metal support 16 to form a multi-layer web 20 having a structure of skin layer 21/core layer 22/skin layer 23.

The cellulose acylate film according to the present invention can be prepared by a known co-casting process. For example, a film may be formed while a solution containing cellulose acetate is cast from several outlets spaced in the machine direction of a metal support to form multi-layer solutions. For example, the methods described in Japanese Patent Application Laid-Open Nos. S61-158414, HI-122419, and H11-198285 can be used. Alternatively, a film may be formed by casting cellulose acetate solutions from two outlets, for example, by the methods described in Japanese Examined Patent Application Publication No. S60-27562, and Japanese Patent Application Laid-Open Nos. S61-94724, S61-947245, 861-104813, S61-158413, and H6-134933. Moreover, a cellulose ester film can be cast by a method according to Japanese Patent Application Laid-Open No. S56-162617, in which a flow of a high viscous cellulose ester solution is enclosed in a low viscous cellulose ester solution, and these two cellulose ester solutions are simultaneously extruded. It is also preferred that an outer solution contain a larger amount of an alcohol component as a poor solvent compared to an inner solution, as described in Japanese Patent Application Laid-Open No. S61-94724 and S61-94725.

<Physical Properties of Cellulose Acylate Film>

The cellulose acylate film according to the present invention preferably has a low thickness ranging from 15 to 40 µm. The thickness more preferably ranges from 1.5 to 35 µm to reduce the weight of the polarizing plate and attain curling resistance.

The cellulose acylate film according to the present invention has a width ranging from 1 to 4 m. In particular, the width ranges from preferably 1.4 to 4 m, more preferably 1.6 to 3 m. A width of more than 4 m may preclude transportation of the film.

In the cellulose acylate film according to the present invention, the retardation value Ro in the in-plane direction and the retardation value Rth across the thickness are determined by Expressions (4) and (5), respectively:

$$Ro=(n_x-n_y)\times d \text{ [nm]} \qquad \text{Expression (4):}$$

$$Rth=\{(n_x+n_y)/2|n_z\}\times d \text{ [nm]} \qquad \text{Expression (5):}$$

wherein $n_x$ represents a refractive index in the in-plane slow axis direction of the cellulose acylate film; $n_y$ represents a refractive index in the in-plane fast axis direction of the cellulose acylate film; $n_z$ represents a refractive index across the thickness of the cellulose acylate film; the refractive index is measured at 23° C., 55% RH, and a wavelength of 590 nm; d represents the thickness (nm) of the cellulose acylate film.

The retardation values Ro and Rth can be determined as follows: A cut sample (35 mm×35 mm) is prepared from the cellulose acylate film, and the humidity is adjusted at 23° C. and 55% RH for two hours. The sample is measured with an automatic birefringence analyzer (KOBRA-21ADH available from Oji Scientific Instruments Co., Ltd., or Axoscan available from Axometrics Inc.) at 590 nm from the vertical direction. The sample is also measured in the same manner while the surface of the cellulose acylate film is being inclined. The retardation values Ro and Rth can be calculated by extrapolation of the resulting retardation values.

While the desired retardation varies according to the optical compensation effect required, the cellulose acylate film according to the present invention preferably has retardation values Ro and Rth in the following ranges to exhibit its high retardation:

10≤Ro (nm)≤100

70≤Rth (nm)≤300

The retardation value Ro is in the range of preferably 30 to 70 (nm), more preferably 40 to 60 (nm), most preferably 45 to 55 (nm).

The retardation value Rth is in the range of preferably 90 to 230 (nm), more preferably 100 to 170 (nm), most preferably 110 to 160 (nm).

If the slow axis or the fast axis of the cellulose acylate film present in the plane of the cellulose acylate film and the machine direction defines an angle θ1, the angle θ1 is preferably −1° or more and +1° or less, more preferably −0.5° or more and +0.5° or less.

The angle θ1 can be defined as an orientation angle. The angle θ1 can be measured with an automatic birefringence analyzer KOBRA-21ADH (Oji Scientific Instruments Co., Ltd.). An angle θ1 within this range can contribute to high luminance of displayed images, no or slight leakage of light, and accurate color reproduction in color liquid crystal display devices.

The cellulose acylate film has a moisture permeability at 40° C. and 90% RH of preferably 300 to 1800 g/m²·24 h, more preferably 400 to 1500 g/m²·24 h, most preferably 40 to 1300 g/m²·24 h. The moisture permeability can be determined in accordance with a method described in JIS Z0208.

The elongation at break of the cellulose acylate film is preferably 10 to 80%, more preferably 20 to 50%.

The visible light transmittance of the cellulose acylate film is preferably 90% or more, more preferably 93% or more.

The haze of the cellulose acylate film is preferably less than 1%, more preferably 0 to 0.1%.

<Photocurable Adhesive>

Preferred examples of the photocurable adhesive to bond a polarizer to a cellulose acylate film include a photocurable adhesive composition having the following components (α) to (δ):

(α) A cationic polymerizable compound
(β) A photocationic polymerization initiator
(γ) A photosensitizer having a maximum absorption to light having a wavelength longer than 380 nm
(δ) A naphthalene photosensitizing aid
(Cationic Polymerizable Compound (A))

The cationic polymzerizable compound (α) is the main component of the photocurable adhesive composition which exhibits an adhesive force through polymerization and curing. The compound (α) can be any compound which cures by cationic polymerization. In particular, the photocurable adhesive composition preferably comprises an epoxy compound having at least two epoxy groups in the molecule. Examples of such an epoxy compound include aromatic epoxy compounds having an aromatic ring in the molecule; alicyclic epoxy compounds having at least two epoxy groups in the molecule at least one of which is bonded to an alicyclic ring; and aliphatic epoxy compounds having no aromatic ring in the molecule, and having a ring (typically an oxirane ring) having an epoxy group and two carbon atoms bonded to the epoxy group in which one of the carbon atoms bonds to a carbon atom in an aliphatic group. The photocurable adhesive composition used in the present invention particularly preferably contains a cationic polymerizable compound (α) containing an epoxy resin having no aromatic ring or an alicyclic epoxy compound as the main component. A cationic polymerizable compound containing an alicyclic epoxy compound as the main component attains a cured product having high storage modulus. Such a cured product (adhesive layer) reduces breakage of the polarizer in the polarizing plate including the cellulose acylate film and the polarizer bonded thereto.

The alicyclic epoxy compound has at least two epoxy groups in the molecule at least one of which bonds to an alicyclic ring, as described above. The epoxy group bonded to the alicyclic ring indicates that the two direct links of an epoxy group (—O—) directly bond to two carbon atoms (typically vicinal carbon atoms) which form an alicyclic ring, respectively, as represented by Formula (ep). In Formula (ep), m represents an integer of 2 to 5.

[Formula 16]

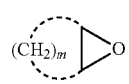

General Formula (ep)

A compound of a group, from which one or more hydrogen atoms of (CH₂)ₘ in Formula (ep) are removed, bonding to another chemical structure can be an alicyclic epoxy compound. Hydrogen in the alicyclic ring may be appropriately replaced with a linear alkyl group, such as a methyl group or an ethyl group. Among these compounds, preferred is a compound having an epoxy cyclopentane ring (m=3 in Formula (ep)) or an epoxy cyclohexane ring (m=4 in Formula (ep)).

Among these alicyclic epoxy compounds, preferred are Compound (ep-1) to (ep-11), which are readily available and significantly enhance the storage modulus of the cured product:

[Formula 17]

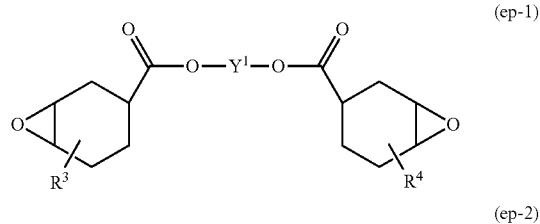
(ep-1)

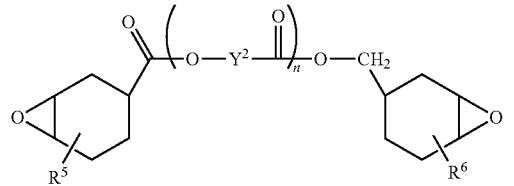
(ep-2)

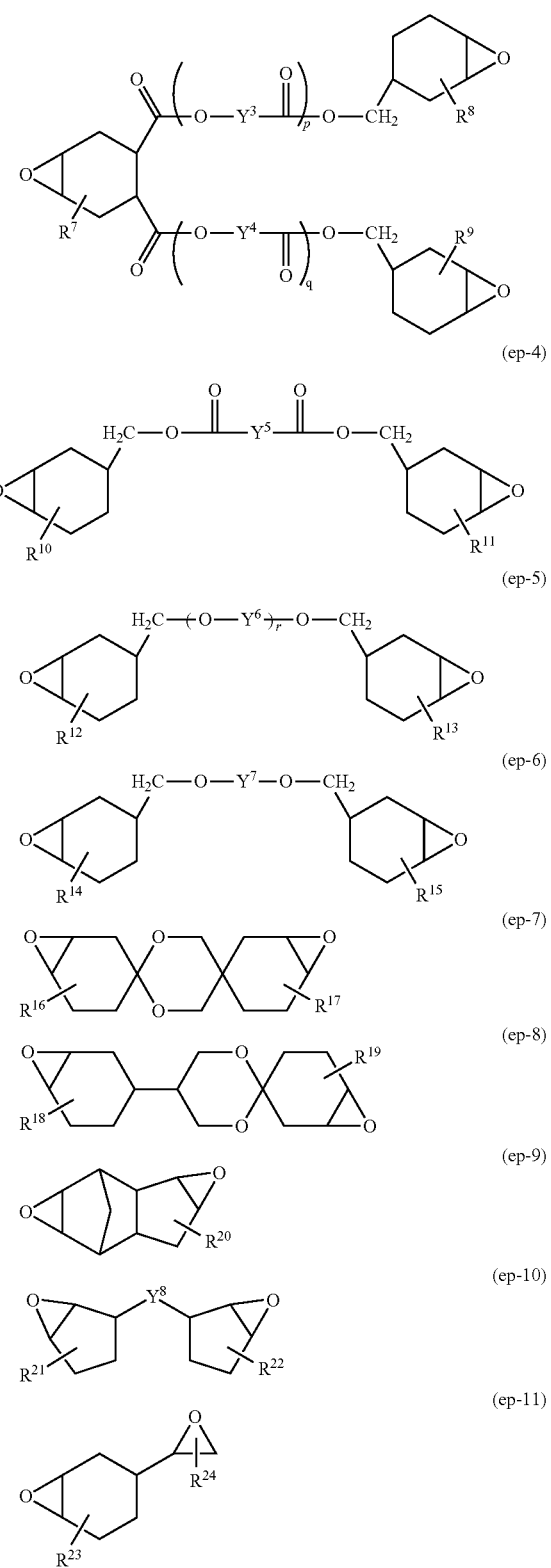

(ep-3)
(ep-4)
(ep-5)
(ep-6)
(ep-7)
(ep-8)
(ep-9)
(ep-10)
(ep-11)

wherein $R^1$ to $R^{24}$ each independently represent a hydrogen atom or an alkyl group having 1 to 6 carbon atoms; if any of $R^1$ to $R^{24}$ is an alkyl group, the alkyl group may be bonded to any of 1- to 6-positions of the alicyclic ring bond; the alkyl group having 1 to 6 carbon atoms may be linear or branched, or may have an alicyclic ring; $Y^8$ represents an alkanediyl group having an oxygen atom or a group having 1 to 20 carbon atoms; $Y^1$ to $Y^7$ each independently represent a alkanediyl group having 1 to 20 carbon atoms, which may be linear or branched, or may have an alicyclic ring; n, p, q, and r each independently represent an integer of 0 to 20.

Among the compounds represented by Formulae (ep-1) to (ep-11), preferred is an alicyclic diepoxy compound represented by Formula (ep-2), which is commercially available. The alicyclic diepoxy compound represented by Formula (ep-2) is an ester of 3,4-epoxycyclohexylmethanol (the cyclohexane ring thereof may have an alkyl group having 1 to 6 carbon atoms bonded thereto) and 3,4-epoxycyclohexanecarboxylic acid (the cyclohexane ring thereof may have an alkyl group having 1 to 6 carbon atoms bonded thereto). Specific examples of such an ester include 3,4-epoxycyclohexylmethyl 3,4-epoxycyclohexanecarboxylate (compound $R^5$=$R^6$=H and n=0 in Formula (ep-2)) and 3,4-epoxy-6-methylcyclohexylmethyl 3,4-epoxy-6-methylcyclohexanecarboxylate (compound at $R^5$=6-methyl, $R^6$=6-methyl, and n=0 in Formula (ep-2)).

The alicyclic epoxy compound is effectively used in combination with an epoxy resin having substantially no alicyclic epoxy group. A cationic polymerizable compound comprising the alicyclic epoxy compound as the main component and an epoxy resin having substantially no alicyclic epoxy group can enhance the adhesiveness between the polarizer and the cellulose acylate film while keeping a high storage modulus of the cured product. The epoxy resin having substantially no alicyclic epoxy group indicates a compound having an epoxy group and a ring (typically oxirane ring) having two carbon atoms bonded to the epoxy group in the molecule in which one of the carbon atoms bonds to a carbon atom in an aliphatic group. Examples thereof include polyglycidyl ether of polyhydric alcohol (phenol). Among these compounds, preferred is a diglycidylether compound represented by Formula (ge), which is readily available and significantly enhances the adhesiveness between the polarizer and the cellulose acylate film:

[Formula 18]

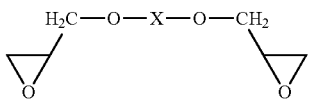

General Formula (ge)

wherein X represents a direct bond, a methylene group, an alkenylidene group having 1 to 4 carbon atoms, an alicyclic hydrocarbon group, O, S, $SO_2$, SS, SO, CO, OCO, or a substituent selected from the group consisting of three substituents represented by Formulae (ge-1) to (ge-3); the alkenylidene group may be substituted by a halogen atom:

[Formula 19]

(ge-1)

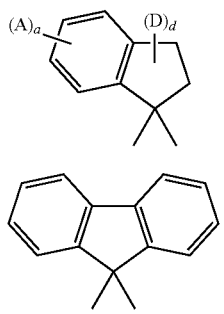

(ge-2)

(ge-3)

In Formula (ge-1), $R^{25}$ and $R^{26}$ each independently represent a hydrogen atom, an alkyl group having 1 to 3 carbon atoms, a phenyl group optionally having an alkyl or alkoxy group having 1 to 10 carbon atoms, or a cycloalkyl group having 3 to 10 carbon atoms optionally having a alkyl or alkoxy group having 1 to 10 carbon atoms; $R^{25}$ and $R^{26}$ may bond to each other to form a ring.

In Formula (ge-2), A and D each independently represent an alkyl group having 1 to 10 carbon atoms optionally having a halogen atom, an aryl group having 6 to 20 carbon atoms and optionally having a halogen atom, an arylalkyl group having 7 to 20 carbon atoms and optionally having a halogen atom, a heterocyclic group having 2 to 20 carbon atoms and optionally having a halogen atom, or a halogen atom; a methylene group in the alkyl, aryl, or arylalkyl group may be interrupted by an unsaturated bond, —O—, or —S—; a represents an integer of 0 to 4; d represents an integer of 0 to 4.

Examples of a diglycidyl ether compound represented by Formula (ge) include bisphenol epoxy resins, such as diglycidyl ether of bisphenol A, diglycidyl ether of bisphenol F, and diglycidyl ether of bisphenol S; glycidyl ether of tetrahydroxyphenylmethane; glycidyl ether of tetrahydroxybenzophenone; polyfunctional epoxy resins, such as epoxyfied polyvinylphenol; polyglycidyl ether of aliphatic polyhydric alcohol; polyglycidyl ether of alkylene oxide adduct of aliphatic polyhydric alcohol; and diglycidyl ether of alkylene glycol. Among these compounds, preferred is polyglycidyl ether of aliphatic polyhydric alcohol, which is commercially available.

Aliphatic polyhydric alcohol has 2 to 20 carbon atoms, for example. Specific examples thereof include aliphatic diols, such as ethylene glycol, 1,2-propanediol, 1,3-propanediol, 2-methyl-1,3-propanediol, 2-butyl-2-ethyl-1,3-propanediol, 1,4-butanediol, neopentyl glycol, 3-methyl-2,4-pentanediol, 2,4-pentanediol, 1,5-pentanediol, 3-methyl-1,5-pentanediol, 2-methyl-2,4-pentanediol, 2,4-diethyl-1,5-pentanediol, 1,6-hexanediol, 1,7-heptanediol, 3,5-heptanediol, 1,8-octanediol, 2-methyl-1,8-octanediol, 1,9-nonanediol, and 1,10-decanediol; alicyclic diols, such as cyclohexane dimethanol, cyclohexanediol, hydrogenated bisphenol A, and hydrogenated bisphenol F; and tri- or higher-hydric polyols, such as trimethylolethane, trimethylolpropane, hexitols, pentitols, glycerol, polyglycerol, pentaerythritol, dipentaerythritol, and tetramethylolpropane.

The alicyclic epoxy compound is used in combination with the epoxy resin having substantially no alicyclic epoxy group preferably in the following proportion: The alicyclic epoxy compound is 50 to 95 mass % and the epoxy resin having substantially no alicyclic epoxy group is 5 mass % or more of the total mass of the cationic polymerizable compound. A cationic polymerizable compound containing 50 mass % or more of alicyclic epoxy compound attains a storage modulus at 80° C. of the cured product of 1000 MPa or more. Such a cured product (adhesive layer) reduces breakage of the polarizer in the polarizing plate including the cellulose acylate film and the polarizer bonded thereto. Moreover, the cationic polymerizable compound containing 5 mass % or more of epoxy resin having substantially no alicyclic epoxy group enhances the adhesiveness between the polarizer and the cellulose acylate film. In the cationic polymerizable compound comprising the alicyclic epoxy compound and the epoxy resin having substantially no alicyclic epoxy group, the content of such an epoxy resin can be up to 50 mass % of the entire cationic polymerizable compound. A significantly large amount of the epoxy resin reduces the storage modulus of the cured product so that the polarizer readily breaks. The amount is preferably 45 mass % or less of the cationic polymerizable compound.

The cationic polymerizable compound (α) in the photocurable adhesive composition comprises the alicyclic epoxy compound and the epoxy resin having substantially no alicyclic epoxy group described above, and may further comprise an additional cationic polymerizable compound in the range such that the contents of these compounds are within the ranges described above. Examples of an additional cationic polymerizable compound include epoxy compounds other than those represented by Formulae (ep-1) to (ep-11) and Formula (ge), and oxetane compounds.

Examples of epoxy compounds other than those represented by Formulae (ep-1) to (ep-11) and Formula (ge) include alicyclic epoxy compounds having an epoxy group bonded to at least one alicyclic ring in the molecule other than those represented by Formulae (ep-1) to (ep-11), aliphatic epoxy compounds having an oxirane ring bonded to a carbon atom in an aliphatic group other than that represented by Formula (ge), aromatic epoxy compounds having an aromatic ring and an epoxy group in the molecule, and hydrogenated epoxy compounds prepared by hydrogenation of aromatic rings of aromatic epoxy compounds.

Examples of alicyclic epoxy compounds having an epoxy group bonded to at least one alicyclic ring in the molecule other than those represented by Formulae (ep-1) to (ep-11) include vinylcyclohexenes, such as 4-vinylcyclohexene diepoxide and 1,2:8,9-diepoxylimonene.

Examples of aliphatic epoxy compounds having an oxirane ring bonded to a carbon atom in an aliphatic group other than that represented by Formula (ge) include triglycidyl ether of glycerol, triglycidyl ether of trimethylolpropane, and diglycidyl ether of polyethylene glycol.

The aromatic epoxy compounds having an aromatic ring and an epoxy group in the molecule can be glycidyl ether of an aromatic polyhydroxy compound having at least two phenolic hydroxy groups in the molecule. Specific examples thereof include diglycidyl ether of bisphenol A, diglycidyl ether of bisphenol F, diglycidyl ether of bisphenol S, and glycidyl ether of phenol novolak resin.

The hydrogenated epoxy compounds, which are aromatic epoxy compounds having hydrogenated aromatic rings, can be prepared by selective hydrogenation of an aromatic polyhydroxy compound having at least two phenolic groups in the molecule as a raw material for the aromatic epoxy compound in the presence of a catalyst under pressure, and converting the hydrogenated polyhydroxy compound into glycidyl ether. Specific examples thereof include diglycidyl ether of hydrogenated bisphenol A, diglycidyl ether of hydrogenated bisphenol F, and diglycidyl ether of hydrogenated bisphenol S.

Among these epoxy compounds other than those represented by Formulae (ep-1) to (ep-11) and Formula (ge), a compound having an epoxy group bonded to an alicyclic ring and classified into the alicyclic epoxy compound defined above is compounded within the range such that the total amount of such a compound and an alicyclic epoxy compound represented by one of Formulae (ep-1) to (ep-11) is less than 95 mass % of the total amount of the cationic polymerizable compound.

An oxetane compound which can be formed into any cationic polymerizable compound has 4-membered ring ether (oxetanyl group) in the molecule. Specific examples thereof include 3-ethyl-3-hydroxymethyloxetane, 1,4-bis[(3-ethyl-3-oxetanyl)methoxymethyl]benzene, 3-ethyl-3-(phenoxymethyl)oxetane, di[(3-ethyl-3-oxetanyl)methyl] ether, 3-ethyl-3-(2-ethylhexyloxymethyl)oxetane, 3-ethyl-3-(cyclohexyloxymethyl)oxetane, phenol novolak oxetane, 1,3-bis[(3-ethyloxetan-3-yl)methoxy]benzene, oxetanylsilsesquioxane, and oxetanyl silicate.

It may be expected that such an oxetane compound contained in a proportion of 30 mass % or less of the total amount of the cationic polymerizable compound enhances curing characteristics more significantly than a cationic polymerizable compound composed of only an epoxy compound.

(Photocationic Polymerization Initiator (β))

In the present invention, such a cationic polymerizable compound is cationically polymerized by irradiation with active energy beams to be cured into an adhesive layer, and thus the photocurable adhesive composition preferably comprises a photocationic polymerization initiator (β).

The photocationic polymerization initiator generates a cationic species or a Lewis acid by irradiation with active energy beams, such as visible light, ultraviolet light, X-rays, or electron beams, to initiate the polymerization reaction of the cationic polymerizable compound (α). The photocationic polymerization initiator acts as a photocatalyst, and exhibits high storage stability and workability even in the form of a mixture with a cationic polymerizable compound (α). Examples of the compound which generates a cationic species or a Lewis acid by irradiation with active energy beams include aromatic diazonium salts; onium salts, such as aromatic iodonium salts and aromatic sulfonium salts; and iron-allene complexes.

Examples of aromatic diazonium salts include benzenediazonium hexafluoroantimonate, benzenediazonium hexafluorophosphate, and benzenediazonium hexafluoroborate.

Examples of aromatic iodonium salts include diphenyliodonium tetrakis(pentafluorophenyl)borate, diphenyliodonium hexafluorophosphate, diphenyliodonium hexafluoroantimonate, and di(4-nonylphenyl) iodonium hexafluorophosphate.

Examples of aromatic sulfonium salts include triphenylsulfonium hexafluorophosphate, triphenylsulfonium hexafluoroantimonate, triphenylsulfonium tetrakis(pentafluorophenyl)borate, 4,4'-bis[diphenylsulfonio]diphenylsulfide bishexafluorophosphate, 4,4'-bis[di(β-hydroxyethoxy)phenylsulfonio]diphenylsulfide bishexafluoroantimonate, 4,4'-bis[di(β-hydroxyethoxy)phenylsulfonio]diphenylsulfide bishexafluorophosphate, 7-[di(p-tolyl)sulfonio]-2-isopropylthioxanthone hexafluoroantimonate, 7-[di(p-tolyl)sulfonio]-2-isopropylthioxanthone tetrakis(pentafluorophenyl)borate, 4-phenylcarbonyl-4'-diphenylsulfonio-diphenylsulfide hexafluorophosphate, 4-(p-tert-butylphenylcarbonyl)-4'-diphenylsulfonio-diphenyl sulfide hexafluoroantimonate, and 4-(p-tert-butylphenylcarbonyl)-4'-di(p-tolyl)sulfonio-diphenylsulfide tetrakis(pentafluorophenyl)borate.

Examples of iron-allene complexes include xylene-cyclopentadienyliron(II) hexafluoroantimonate, cumene-cyclopentadienyliron(II) hexafluorophosphate, and xylene-cyclopentadienyliron(II) tris(trifluoromethylsulfonyl) methanide.

These photocationic polymerization initiators can be used alone or in the form of a mixture. Among these compounds, aromatic sulfonium salts are preferred because these salts absorb ultraviolet light even in the wavelength region around 300 nm and thus can attain a cured product having high curing characteristics, high mechanical strength, and high adhesive strength.

The photocationic polymerization initiator (β) is compounded in an amount of 1 to 10 parts by mass relative to 100 parts by mass of cationic polymerizable compound (α) in total. When the photocationic polymerization initiator is compounded in an amount of 1 part by mass or more relative to 100 parts by mass of cationic polymerizable compound (α). The cationic polymerizable compound (α) can be sufficiently cured to attain a polarizing plate having high mechanical strength and high adhesive strength. In contrast, a significantly large amount of the photocationic polymerization initiator may increase ionic substances in the cured product to enhance the moisture absorbability of the cured product, leading to a reduction in the durability of the polarizing plate. The amount of photocationic polymerization initiator (β) thus ranges from 10 parts by mass or less relative to 100 parts by mass of cationic polymerizable compound (α).

Preferably, the amount of compounded photocationic polymerization initiator (β) is preferably 2 parts by mass or more, more preferably 6 parts by mass or less relative to 100 parts by mass of cationic polymerizable compound (α).

(Photosensitizer (Γ))

The photocurable adhesive composition usable in the present invention comprises a cationic polymerizable compound (α) containing an epoxy compound and a photocationic polymerization initiator (β) described above, and further comprises a photosensitizer (γ) having a maximum absorption to light having a wavelength longer than 380 nm. The photocationic polymerization initiator (β) has a maximum absorption to a wavelength around or less than 300 nm, and generates a cationic species or a Lewis acid in response to the light around the wavelength to initiate the cationic polymerization of the cationic polymerizable compound (α). A photosensitizer (γ) having a maximum absorption to light having a wavelength longer than 380 nm is compounded so as to react to such light.

Useful photosensitizers (γ) are anthracene compounds represented by Formula (at):

[Formula 20]

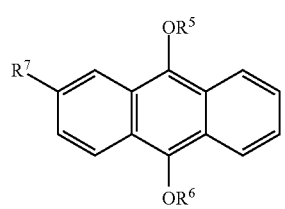

General Formula (at)

wherein $R^5$ and $R^6$ each independently represent an alkyl group having 1 to 6 carbon atoms or an alkoxyalkyl group having 2 to 12 carbon atoms; $R^7$ represents a hydrogen atom or an alkyl group having 1 to 6 carbon atoms.

Specific examples of the anthracene compound represented by Formula (at) include 9,10-dimethoxyanthoxyanthracene, 9,10-diethoxyanthracene, 9,10-dipropoxyanthracene, 9,10-diisopropoxyanthracene, 9,10-dibutoxyanthracene, 9,10-dipentyloxyanthracene, 9,10-dihexyloxyanthracene, 9,10-bis(2-methoxyethoxy)anthracene, 9,10-bis(2-ethoxyethoxy)anthracene, 9,10-bis(2-butoxyethoxy)anthracene, 9,10-bis(3-butoxypropoxy)anthracene, 2-methyl- or 2-ethyl-9,10-dimethoxyanthracene, 2-methyl- or 2-ethyl-9,10-diethoxyanthracene, 2-methyl- or 2-ethyl-9,10-dipropoxyanthracene, 2-methyl- or 2-ethyl-9,10-diisopropoxyanthracene, 2-methyl- or 2-ethyl-9,10-dibutoxyanthracene, 2-methyl- or 2-ethyl-9,10-dipentyloxyanthracene, and 2-methyl- or 2-ethyl-9,10-dihexyloxyanthracene.

A photocurable adhesive composition containing a photosensitizer (γ) described above significantly enhances curing characteristics compared to a composition containing no photosensitizer (γ). The enhanced curing characteristics of the photocurable adhesive composition is achieved when the amount of compounded photosensitizer (γ) is 0.1 parts by mass or more relative to 100 parts by mass of cationic polymerizable compound (α) contained in the photocurable adhesive composition. Since a significantly large amount of photosensitizer (γ) precipitates during storage of the photocurable adhesive composition at low temperature, the amount of photosensitizer (γ) is 2 parts by mass or less relative to 100 parts by mass of cationic polymerizable compound (α). To keep the polarizing plate neutral gray, the amount of photosensitizer (γ) is decreased within a range to maintain appropriate adhesiveness between the polarizer and the cellulose acylate film. For example, a preferred amount of photosensitizer (γ) is in the range of 0.1 to 0.5 parts by mass, preferably 0.1 to 0.3 parts by mass relative to 100 parts by mass of cationic polymerizable compound (α).

(Photosensitizing Aid (Δ))

The photocurable adhesive composition usable in the present invention comprises a cationic polymerizable compound (α) containing an epoxy compound, a photocationic polymerization initiator (β), and a photosensitizer (γ), which are described above, and further comprises a naphthalene photosensitizing aid (δ) represented by Formula (nf):

[Formula 21]

General Formula (nf)

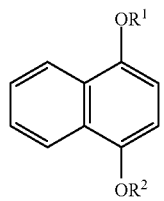

wherein $R^1$ and $R^2$ each represent an alkyl group having 1 to 6 carbon atoms.

Specific examples of the naphthalene photosensitizing aid (6) include 1,4-dimethoxynaphthalene, 1-ethoxy-4-methoxynaphthalene, 1,4-diethoxynaphthalene, 1,4-dipropoxynaphthalene, and 1,4-dibutoxynaphthalene.

A photocurable adhesive composition containing a naphthalene photosensitizing aid (δ) exhibits significantly enhanced curing characteristics compared to a photocurable adhesive composition containing no naphthalene photosensitizing aid (δ). The enhanced curing characteristics of the photocurable adhesive composition is achieved when the amount of compounded naphthalene photosensitizing aid (δ) is 0.1 parts by mass or more relative to 100 parts by mass of cationic polymerizable compound (α) contained in the photocurable adhesive composition. Since a significantly large amount of naphthalene photosensitizing aid (δ) precipitates during storage of the photocurable adhesive composition at low temperature, the amount of naphthalene photosensitizing aid (δ) is 10 parts by mass or less relative to 100 parts by mass of cationic polymerizable compound (α). Preferably, the amount of naphthalene photosensitizing aid (δ) is 5 parts by mass or less relative to 100 parts by mass of cationic polymerizable compound (α).

The photocurable adhesive composition usable in the present invention can further contain any other optional additive within a range that can keep the advantageous effects of the present invention. Examples of the additives other than the photocationic polymerization initiator (β) and the photosensitizer (γ) described above include photosensitizers other than the photosensitizer (γ), thermal cationic polymerization initiators, polyols, ion trapping agents, antioxidants, light stabilizers, chain transfer agents, tackifiers, thermoplastic resins, fillers, flow control agents, plasticizers, antifoaming agents, leveling agents, dyes, and organic solvents.

These additives are compounded in amounts of preferably 1000 parts by mass or less relative to 100 parts by mass of cationic polymerizable compound (α). At an amount of 1000 parts by mass or less, a combination of a cationic polymerizable compound (α), a photocationic polymerization initiator (β), a photosensitizer (γ), and a photosensitizing aid (δ), which are essential components of the photocurable adhesive composition usable in the present invention, can achieve advantageous effects, such as enhanced storage stability, prevention of coloring, accelerated curing rate, and high adhesiveness.

Other preferred examples of the adhesive to bond a polarizer to a cellulose acylate film include a photocurable adhesive composition comprising the following three essential components (α1), (α2), and (β1).

(α1) An epoxy compound having at least two epoxy groups in the molecule (α2) An oxetane compound having at least one oxetanyl group in the molecule (β1) A photocationic polymerization initiator These components are merely referred to as an epoxy compound (α1), an oxetane compound (α2), and a photocationic polymerization initiator (β1), respectively.

The mass ratio of the epoxy compound (α1) to the oxetane compound (α2) (epoxy compound (α1):oxetane compound (α2)) is preferably ranges from about 90:10 to about 10:90. The photocationic polymerization initiator (β1) is preferably compounded in a proportion of about 0.5 to 20 mass % in the composition.

The photocurable adhesive can optionally contain an unsaturated compound having at least one ethylenically unsaturated bond in the molecule as a component (ε). If such an unsaturated compound, i.e., the component (ε) is contained, a photoradical polymerization initiator as a component (ζ) is preferably contained. The photocurable adhesive can further contain an additional non-polymerizable component as a component (η).

The unsaturated compound as a component (ε), the photoradical polymerization initiator as a component (ζ), the additional non-polymerizable component as a component (η) are merely referred to as an unsaturated compound (ε), a photoradical polymerization initiator (ζ), and a non-polymerizable component (η), respectively.

(Epoxy Compound (A1))

In the photocurable adhesive composition usable in the present invention, the epoxy compound (α1) can be any compound having at least two epoxy groups in the molecule, and a variety of known curable epoxy compounds can be used. Preferred examples of the epoxy compound (α1) include compounds each having at least two epoxy groups and at least one aromatic ring in the molecule (hereinafter referred to as an aromatic epoxy compound) and compounds each having at least two epoxy groups in the molecule where at least one of the epoxy groups is formed on two vicinal carbon atoms in an alicyclic ring (hereinafter referred to as an alicyclic epoxy compound).

Any aromatic epoxy compound which does not impair the advantageous effects of the present invention can be used. Examples thereof include bisphenol epoxy resins, such as diglycidyl ether of bisphenol A, diglycidyl ether of bisphenol F, and diglycidyl ether of brominated bisphenol A; novolak epoxy resins, such as phenol novolak epoxy resins, and cresol novolak epoxy resins; and other epoxy resins, such as biphenyl epoxy resins, hydroquinone diglycidyl ether, resorcin diglycidyl ether, diglycidyl terephthalate ester, diglycidyl phthalate ester, epoxyfied products of styrene-butadiene copolymers, epoxyfied products of styrene-isoprene copolymers, and addition products of carboxyl-terminated polybutadiene with bisphenol A epoxy resin.

Throughout the specification, the epoxy resin indicates a compound or polymer which has two or more epoxy groups on average in the molecule, and cures by reaction. According to the conventional usage of this term in the art, the epoxy resin may include even a monomer having two or more curable epoxy groups in the molecule.

Any alicyclic epoxy compound which does not impair the advantageous effects of the present invention can be used. Examples thereof include compounds having at least one epoxyfied cyclohexyl group, such as dicyclopentadiene dioxide, limonene dioxide, 4-vinylcyclohexene dioxide, 3,4-epoxycyclohexylmethyl-3,4-epoxycyclohexane carboxylate, and bis(3,4-epoxycyclohexylmethyl) adipate.

The following compounds can also be used as epoxy compounds (α1): aliphatic epoxy compounds, such as 1,6-hexanediol diglycidyl ether, trimethylolpropane triglycidyl ether, pentaerythritol tetraglycidyl ether, and polytetramethylene glycol diglycidyl ether; epoxy compounds having hydrogenated aromatic rings, such as diglycidyl ether of hydrogenated bisphenol A; and polymer epoxy compounds, such as hydroxy-terminated polybutadiene both terminals of which are replaced with glycidyl ether, polybutadiene having an epoxyfied unit, styrene-butadiene copolymers having partially epoxyfied double bonds (such as Epofriend available from DAICEL CORPORATION), and block copolymers of ethylene-butylene copolymer and polyisoprene having partially epoxyfied isoprene units (such as L-207 available from Kraton Performance Polymers, Inc.).

Among these compounds, preferred are aromatic epoxy compounds, which attain high durability of the polarizing plate and high adhesiveness between the polarizer and the cellulose acylate film in particular. Preferred examples of the aromatic epoxy compounds further include glycidyl ethers of aromatic compounds or glycidyl esters of aromatic compounds. Specific examples of preferred glycidyl ethers of aromatic compounds include bisphenol epoxy resins, such as diglycidyl ether of bisphenol A, diglycidyl ether of bisphenol F, and diglycidyl ether of brominated bisphenol A; novolak epoxy resins, such as phenol novolak epoxy resins and cresol novolak epoxy resins; biphenyl epoxy resins; hydroquinone diglycidyl ether; and resorcin diglycidyl ether. Specific examples of preferred glycidyl esters of aromatic compounds include diglycidyl terephthalate ester and diglycidyl phthalate ester.

Among these compounds, particularly preferred are glycidyl ethers of aromatic compounds, which attain high adhesiveness between the polarizer and the cellulose acylate film and high durability of the polarizing plate. Among these glycidyl ethers of aromatic compounds, particularly preferred compounds are diglycidyl ether of bisphenol A, diglycidyl ether of bisphenol F, and phenol novolak epoxy resins.

These epoxy compounds (α1) can be used alone or in the form of a mixture. For examples, two or more of these aromatic epoxy compounds can be mixed, or one of these aromatic epoxy compounds can be used as the main component, and be mixed with an alicyclic epoxy compound.

(Oxetane Compound (A2))

In the photocurable adhesive used in the present invention, the oxetane compound (α2) has at least one oxetanyl group in the molecule. A variety of compounds having oxetanyl groups can be used. Preferred examples of the oxetane compound (α2) include compounds having one oxetanyl group in the molecule (hereinafter referred to as monofunctional oxetane), and compounds having two or more oxetanyl groups in the molecule (hereinafter referred to as polyfunctional oxetane).

Preferred examples of the monofunctional oxetane include monofunctional oxetanes containing alkoxyalkyl groups, such as 3-ethyl-3-(2-ethylhexyloxymethyl)oxetane; monofunctional oxetanes containing aryl groups, such as 3-ethyl-3-phenoxymethyloxetane; and monofunctional oxetanes containing hydroxy groups, such as 3-ethyl-3-hydroxymethyl oxetane.

Examples of the polyfunctional oxetane include 3-ethyl-3-[(3-ethyloxetan-3-yl)methoxymethyl]oxetane, 1,4-bis[(3-ethyloxetan-3-yl)methoxymethyl]benzene, 1,4-bis[(3-ethyloxetan-3-yl)methoxy]benzene, 1,3-bis[(3-ethyloxetan-3-yl)methoxy]benzene, 1,2-bis[(3-ethyloxetan-3-yl)methoxy]benzene, 4,4'-bis[(3-ethyloxetan-3-yl)methoxy]biphenyl, 2,2'-bis[(3-ethyloxetan-3-yl)methoxy]biphenyl, 3,3',5,5'-tetramethyl-4,4'-bis[(3-ethyloxetan-3-yl)methoxy]biphenyl, 2,7-bis[(3-ethyloxetan-3-yl)methoxy]naphthalene, bis[4-{(3-ethyloxetan-3-yl)methoxy}phenyl]methane, bis[2-{(3-ethyloxetan-3-yl)methoxy}phenyl]methane, 2,2-bis[4-{(3-ethyloxetan-3-yl)methoxy}phenyl]propane, etherified modified products of novolak phenol-formaldehyde resin with 3-chloromethyl-3-ethyloxetane, 3(4),8(9)-bis[(3-ethyloxetan-3-yl)methoxy methyl]-tricyclo[5.2.1.02.6]decane, 2,3-bis[(3-ethyloxetan-3-yl)methoxymethyl]norbornane, 1,1,1-tris[(3-ethyloxetan-3-yl)methoxymethyl]propane, 1-butoxy-2,2-bis[(3-ethyloxetan-3-yl)methoxymethyl]butane, 1,2-bis[{2-(3-ethyloxetan-3-yl)methoxy}ethylthio]ethane, bis[{4-(3-ethyloxetan-3-yl)methylthio}phenyl]sulfide, 1,6-bis[(3-ethyloxetan-3-yl)methoxy]-2,2,3,3,4,4,5,5-octafluorohexane, hydrolyzed condensates of 3-[(3-ethyloxetan-3-yl)methoxy]propyltriethoxysilane, and condensates of tetrakis[(3-ethyloxetan-3-yl)methyl]silicate.

The oxetane compound (α2) preferably has a molecular weight of 500 or less and is liquid at room temperature in view of the coating characteristics of the adhesive composition and the adhesiveness to the cellulose acylate film during the preparation of the polarizing plate. More preferred is monofunctional oxetane having an aromatic ring in the molecule or polyfunctional oxetane to attain a polarizing plate having high durability. Examples of such preferred oxetane compounds include 3-ethyl-3-phenoxymethyloxetane, 3-ethyl-3-[(3-ethyloxetan-3-yl)methoxymethyl]oxetane, and 1,4-bis[(3-ethyloxetan-3-yl)methoxymethyl]benzene.

These oxetane compounds (α2) can be used alone or in the form of a mixture.

The mass ratio of Epoxy compound (α1) to the oxetane compound (α2) (epoxy compound (α1):oxetane compound (α2)) is 90:10 to 10:90. A mass ratio outside of this range does not sufficiently attain a short curing time, which is one of the important characteristics required for the photocurable adhesive composition usable in the present invention. The mass ratio ranges preferably from about 70:30 to 20:80, more preferably from about 60:40 to 25:75. A mass ratio within this range can attain a photocurable adhesive composition having low viscosity and thus superior coating characteristics before curing, and having sufficient adhesiveness and flexibility after curing.

(Photocationic Polymerization Initiator (B1))

The photocurable adhesive composition usable in the present invention comprises two curable components, the epoxy compound (α1) and oxetane compound (α2) described above. These compounds are curable by cationic polymerization. The photocationic polymerization initiator (β1) is compounded to initiate the cationic polymerization of these components. The photocationic polymerization initiator (β1) generates a cationic species or a Lewis acid by irradiation with active energy beams, such as visible light, ultraviolet light, X-rays, or electron beams, to initiate the polymerization reaction of the epoxy group or the oxetanyl group.

A photocurable adhesive composition containing a photocationic polymerization initiator (β1) can be cured and thus bond the cellulose acylate film at room temperature, substantially out of consideration of the heat resistance of the polarizer or distortion of the polarizer due to thermal expansion or shrinkage. Moreover, the photocationic polymerization initiator (β1) acts as a catalyst by irradiation of active energy beams, and has high storage stability and workability even in the form of a mixture with the epoxy compound (α1) and the oxetane compound (α2).

Examples of such a photocationic polymerization initiator (β1) which generates a cationic species or a Lewis acid by irradiation with active energy beams include onium salts, such as aromatic diazonium salts, aromatic iodonium salts, and aromatic sulfonium salts, and iron-allene complexes.

Examples of aromatic diazonium salts include benzenediazonium hexafluoroantimonate, benzenediazonium hexafluorophosphate, and benzenediazonium hexafluoroborate.

Examples of aromatic iodonium salts include diphenyliodonium tetrakis(pentafluorophenyl)borate, diphenyliodonium hexafluorophosphate, diphenyl iodonium hexafluoroantimonate, and di(4-nonylphenyl) iodonium hexafluorophosphate.

Examples of aromatic sulfonium salts include triphenylsulfonium hexafluorophosphate, triphenylsulfonium hexafluoroantimonate, triphenylsulfonium tetrakis(pentafluorophenyl)borate, diphenyl[4-(phenylthio)phenyl]sulfonium hexafluorophosphate, diphenyl[4-(phenylthio)phenyl] sulfonium hexafluoroantimonate, 4,4'-bis(diphenylsulfonio) diphenylsulfide bishexafluorophosphate, 4,4'-bis[di(β-hydroxyethoxy)phenylsulfonio]diphenylsulfide bishexafluoroantimonate, 4,4'-bis[di(β-hydroxyethoxy)phenylsulfonio]diphenylsulfide bishexafluorophosphate, 7-[di(p-tolyl)sulfonio]-2-isopropylthioxanthone hexafluoroantimonate, 7-[di(p-tolyl) sulfonio]-2-isopropylthioxanthone tetrakis(pentafluorophenyl)borate, 4-phenylcarbonyl-4'-diphenylsulfonio-diphenylsulfide hexafluorophosphate, 4-(p-tert-butylphenylcarbonyl)-4'-diphenylsulfonio-diphenyl sulfide hexafluoroantimonate, and 4-(p-tert-butylphenylcarbonyl)-4'-di(p-tolyl) sulfonio-diphenylsulfide tetrakis(pentafluorophenyl)borate.

Examples of iron-allene complexes include xylene-cyclopentadienyliron(II) hexafluoroantimonate, cumene-cyclopentadienyliron(II) hexafluorophosphate, and xylene-cyclopentadienyliron(II) tri(trifluoromethylsulfonyl) methanide.

These photocationic polymerization initiators (β1) can be used alone or in the form of a mixture. Among these compounds, particularly preferred are aromatic sulfonium salts, which absorb ultraviolet light even in the wavelength region of 300 nm or more to exhibit high curing characteristics, and can attain a cured product having high mechanical strength and high adhesion strength.

The photocationic polymerization initiator (β1) is readily commercially available. Examples of commercial products include trade names KAYARAD PCI-220 and KAYARAD PCI-620 (available from NIPPON KAYAKU Co., Ltd.), UVI-6992 (available from Dow Chemical Company), ADEKA OPTOMER SP-150 and ADEKA OPTOMER SP-170 (available from Adeka Corporation), CI-5102, CIT-1370, CIT-1682, CIP-1866S, CIP-2048S, and CIP-2064S (available from NIPPON SODA CO., LTD.), DPI-101, DPI-102, DPI-103, DPI-105, MPI-103, MPI-105, BBI-101, BBI-102, BBI-103, BBI-105, TPS-101, TPS-102, TPS-103, TPS-105, MDS-103, MDS-105, DTS-102, and DTS-103 (available from Midori Kagaku Co., Ltd.), PI-2074 (available from Rhodia S.A.), IRGACURE 250, IRGACURE PAG103, IRGACURE PAG108, IRGACURE PAG121, and IRGACURE PAG203 (available from BSF Japan Ltd.), and CPI-100P, CPI-101A, CPI-200 K, and CPI-210S (available from San-Apro Ltd.). Among these products, preferred are UVI-6992, CPI-100P, CPI-101A, CPI-200K, and CPI-210S, which contain diphenyl[4-(phenylthio)phenyl]sulfonium as a cationic component.

The photocationic polymerization initiator (β1) is compounded in an amount of 0.5 to 20 mass % of the entire photocurable adhesive. An amount of less than 0.5 mass % leads to insufficient curing of the photocurable adhesive to reduce mechanical strength and adhesion strength. In contrast, an amount of more than 20 mass % may increase ionic substances in the cured product to enhance the moisture absorption of the cured product, leading to a reduction in durability.

Other preferred examples of the photocurable adhesive to bond a polarizer and a cellulose acylate film include radical photocurable adhesive compositions comprising the following components (ε) and (ƒ).

(ε) An unsaturated compound having at least one ethylenically unsaturated bond in the molecule (ζ) A photoradical polymerization initiator (Unsaturated Compound (ε))

The photocurable adhesive preferably contains an unsaturated compound (ε) having at least one ethylenically unsaturated bond in the molecule, when necessary.

Typical examples of the unsaturated compound (ε) include (meth)acrylic compounds having at least one (meth) acryloyl group in the molecule.

Examples of the (meth)acrylic compound include, but should not be limited to, (meth)acrylates, (meth)acrylamides, (meth)acrylic acid, (meth)acryloylmorpholine, and (meth)acrylic aldehyde.

Examples of (meth)acrylates having one (meth)acryoyl group in the molecule (hereinafter referred to as monofunctional (meth)acrylate) include, but should not be limited to, alkyl (meth)acrylates, such as methyl (meth)acrylate, ethyl (meth)acrylate, propyl (meth)acrylate, isopropyl (meth)acrylate, butyl (meth)acrylate, isobutyl (meth)acrylate, 2-ethylhexyl (meth)acrylate, octyl (meth)acrylate, isooctyl (meth)acrylate, lauryl (meth)acrylate, and stearyl (meth)acrylate; hydroxyalkyl (meth)acrylates, such as 2-hydroxyethyl (meth)acrylate, 2-hydroxypropyl (meth)acrylate, and 4-hydroxybutyl (meth)acrylate; alicyclic monofunctional (meth)acrylates, such as cyclohexyl (meth)acrylate, isobornyl (meth)acrylate, 1,4-cyclohexanedimethylol mono(meth)acrylate, dicyclopentanyl (meth)acrylate, dicyclopentenyl (meth)acrylate, and dicyclopentenyloxyethyl (meth)acrylate; monofunctional (meth)acrylates having an aromatic ring, such as benzyl (meth)acrylate, (meth)acrylate of p-cumylphenolalkylene oxide adduct, (meth)acrylate of o-phenylphenolalkylene oxide adduct, (meth)acrylate of phenolalkylene oxide adduct, and (meth)acrylate of nonylphenolalkylene oxide adduct (where examples of alkylene oxide include ethylene oxide and propylene oxide); alkoxyalkyl (meth)acrylates, such as 2-methoxyethyl (meth)acrylate, ethoxymethyl (meth)acrylate, and (meth)acrylate of alkylene oxide adduct of 2-ethylhexyl alcohol; mono(meth)acrylates of dihydric alcohols, such as ethylene glycol mono(meth)acrylate, propylene glycol mono(meth)acrylate, pentanediol mono(meth)acrylate, and hexanediol mono(meth)acrylate; mono(meth)acrylates of polyalkylene glycol, such as mono(meth)acrylate of diethylene glycol, mono(meth)acrylate of triethylene glycol, mono(meth)acrylate of tetraethylene glycol, mono(meth)acrylate of polyethylene glycol, mono(meth)acrylate of dipropylene glycol, mono(meth)acrylate of tripropylene glycol, and mono(meth)acrylate of polypropylene glycol; glycidyl (meth)acrylate; tetrahydrofurfuryl (meth)acrylate; tetrahydrofurfuryl (meth)acrylates, such as caprolactone-modified tetrahydrofurfuryl (meth)acrylate; 3,4-epoxycyclohexylmethyl (meth)acrylate; N,N-dimethylaminoethyl (meth)acrylate; and 2-(meth)acryloyloxyethyl isocyanate.

Examples of (meth)acrylates having two or more (meth)acryloyl groups in the molecule include, but should not be limited to, the followings:

di(meth)acrylates having an alicyclic ring, such as tricyclodecanedimethylol di(meth)acrylate, 1,4-cyclohexanedimethylol di(meth)acrylate, norbornanedimethylol di(meth)acrylate, and di(meth)acrylate of hydrogenated bisphenol A; di(meth)acrylates having an aromatic ring, such as di(meth)acrylate of bisphenol A ethylene oxide adduct, di(meth)acrylate of bisphenol A alkylene oxide adduct containing di(meth)acrylate of bisphenol A propylene oxide adduct, and di(meth)acrylate of bisphenol A diglycidyl ether; di(meth)acrylates of alkylene glycol, such as ethylene glycol di(meth)acrylate, propylene glycol di(meth)acrylate, pentanediol di(meth)acrylate, and hexanediol di(meth)acrylate; polydi(meth)acrylates of alkylene glycol, such as diethylene glycol di(meth)acrylate, triethylene glycol di(meth)acrylate, tetraethylene glycol di(meth)acrylate, polyethylene glycol di(meth)acrylate, dipropylene glycol di(meth)acrylate, tripropylene glycol di(meth)acrylate, and polypropylene glycol di(meth)acrylate; di- or tri(meth)acrylates of glycerols, such as di- or tri(meth)acrylate of glycerol and di- or tri(meth)acrylate of diglycerol; di- or tri(meth)acrylates of alkylene oxide adducts of glycerols; di(meth)acrylates of bisphenol alkylene oxide adducts, such as di(meth)acrylate of bisphenol A alkylene oxide adduct and di(meth)acrylate of bisphenol F alkylene oxide adduct; polyol poly(meth)acrylates, such as trimethylolpropane tri(meth)acrylate, ditrimethylolpropane tri(meth)acrylate, ditrimethylolpropane tetra(meth)acrylate, pentaerythritol tri(meth)acrylate, pentaerythritol tetra(meth)acrylate, dipentaerythritol penta(meth)acrylate, and dipentaerythritol hexa(meth)acrylate; poly(meth)acrylates of these alkylene oxide adducts of polyol; di- or tri(meth)acrylate of isocyanuric acid alkylene oxide adduct; and 1,3,5-tri(meth)acryloylhexahydro-s-triazine.

Examples of (meth)acrylamides include (meth)acrylamide, N,N-dimethyl(meth)acrylamide, N,N-diethyl(meth)acrylamide, N-methylol(meth)acrylamide, N-(3-N,N-dimethylaminopropyl)(meth)acrylamide, methylenebis(meth)acrylamide, and ethylenebis(meth)acrylamide.

Oligomers, such as urethane (meth)acrylates, polyester (meth)acrylates, and epoxy (meth)acrylates can also be used as the (meth)acrylic compound.

Furthermore, the (meth)acrylic compound may be compounds having (meth)acryloyl groups and other ethylenically unsaturated bonds. Specific examples thereof include allyl (meth)acrylate and N,N-diallyl(meth)acrylamide.

The unsaturated compound (e) is not limited to the (meth)acrylic compounds listed above, and may be selected from the following compounds: vinyl compounds, such as N-vinyl-2-pyrrolidone, divinyl adipate, and divinyl sebacate; allyl compounds, such as triallyl isocyanurate, triallylamine, tetraallyl pyromellitate, N,N,N',N'-tetraallyl-1,4-diaminobutane, tetraallylammonium salts, and allylamines; and unsaturated carboxylic acids, such as maleic acid and itaconic acid.

Among these unsaturated compounds (e), preferred are (meth)acrylic compounds. More preferred (meth)acrylic compounds have at least one alicyclic or aromatic skeleton in the molecule because these compounds enhance the durability, such as heat resistance, of the polarizing plate prepared by bonding the polarizer to the cellulose acylate film with an adhesive containing such a (meth)acrylic compound. Preferred specific examples of the (meth)acrylic compound having at least one alicyclic or aromatic skeleton in the molecule include the alicyclic monofunctional (meth)acrylates, the aromatic monofunctional (meth)acrylates, the alicyclic di(meth)acrylates, and the aromatic di(meth)acrylates, which are listed above. Among these compounds, particularly preferred are di(meth)acrylates having tricyclodecane skeletons. A typical example of such a particularly preferred (meth)acrylic compound is tricyclodecanedimethylol di(meth)acrylate.

The unsaturated compound ($\epsilon$) can be used to control the curing rate, the adhesiveness between the polarizer and the cellulose acylate film, the elastic modulus of the adhesive layer, and the durability of bonded products. These unsaturated compounds ($\epsilon$) can be used alone or in the form of a mixture.

The unsaturated compound ($\epsilon$) is preferably compounded in an amount of 35 mass % or less of the overall composition. An amount in this range attains high adhesiveness between the polarizer and the cellulose acylate film.

An amount of unsaturated compound ($\epsilon$) of 35 mass % or less attains sufficient adhesion strength to the polarizer. The amount of compounded unsaturated compound ($\epsilon$) is more preferably 30 mass % or less, still more preferably about 5 to 25 mass %, most preferably about 10 to 20 mass %.

(Photoradical Polymerization Initiator (Z))

In the photocurable adhesive containing the unsaturated compound ($\epsilon$), the photoradical polymerization initiator ($\zeta$) can be preferably compounded to facilitate the radical polymerization of the monomer and attain a high curing rate.

Specific examples of the photoradical polymerization initiator (ζ) include, but should not be limited to, acetophenone photopolymerization initiators, such as 4'-phenoxy-2,2-dichloroacetophenone, 4'-tert-butyl-2,2-dichloroacetophenone, 2,2-dimethoxy-2-phenylacetophenone, 2-methyl-1-(4-methylthiophenyl)-2-morpholinopropan-1-one, 1-hydroxycyclohexylphenyl ketone, α,α-diethoxyacetophenone, 2-hydroxy-2-methyl-1-phenylpropan-1-one, 1-(4-isopropylphenyl)-2-hydroxy-2-methylpropan-1-one, 1-(4-dodecylphenyl)-2-hydroxy-2-methylpropan-1-one, 1-[4-(2-hydroxyethoxy)phenyl]-2-hydroxy-2-methylpropan-1-one, and 2-benzyl-2-dimethylamino-1-(4-morpholinophenyl)butan-1-one; benzoin ether photopolymerization initiators, such as benzoin, benzoin methyl ether, benzoin ethyl ether, benzoin isopropyl ether, and benzoin isobutyl ether; benzophenone photopolymerization initiators, such as benzophenone, methyl o-benzoylbenzate, 4-phenylbenzophenone, 4-benzoyl-4'-methyldiphenyl sulfide, and 2,4,6-trimethylbenzophenone; thioxanthone photopolymerization initiators, such as 2-isopropylthioxanthone, 2,4-diethylthioxanthone, 2,4-dichlorothioxanthone, and 1-chloro-4-propoxythioxanthone; acylphosphine oxide photopolymerization initiators, such as 2,4,6-trimethylbenzoyldiphenylphosphine oxide, bis(2,6-dimethoxybenzoyl)-2,4,4-trimethylpentylphosphine oxide, and bis(2,4,6-trimethylbenzoyl)phenylphosphine oxide; oxime-ester photopolymerization initiators, such as 1,2-octanedione, 1-[4-(phenylthio)phenyl]-, 2-(O-benzoyloxime); and camphorquinone.

These photoradical polymerization initiators (ζ) can be used alone or in the form of a mixture according to desired performance. The amount of compounded photoradical polymerization initiator (ζ) is preferably 10 mass % or less, more preferably about 0.1 to 3 mass % of the overall composition. A significantly large amount of a photoradical polymerization initiator (ζ) may lead to insufficient strength. A significantly small amount may lead to insufficient curing of the adhesive.

(Additional Component (H))

The photocurable adhesive composition usable in the present invention can further comprise an optional component different from the components (α1) to (η) within a range to keep the advantageous effects of the present invention.

Examples of such an optional component include cationic polymerizable compounds other than the epoxy compound (α1) and the oxetane compound (α2). Specific examples thereof include, but should not be limited to, epoxy compounds having one epoxy group in the molecule. Other examples of the optional component include additional non-polymerizable components (η). The additional non-polymerizable component (η) is preferably compounded in an amount of about 10 mass % or less of the overall composition.

Examples of the additional non-polymerizable component (η) include, but should not be limited to, photosensitizers. A photocurable adhesive composition containing a photosensitizer enhances reactivity, and thus enhances the mechanical strength and the adhesion strength of the cured product. Examples of the photosensitizer include carbonyl compounds, organic sulfur compounds, persulfides, redox compounds, azo and diazo compounds, halogen compounds, and photo-reducible dyes.

Specific examples of the photosensitizer include, but should not be limited to, benzoin derivatives, such as benzoin methyl ether, benzoin isopropyl ether, and α,α-dimethoxy-α-phenylacetophenone; benzophenone derivatives, such as benzophenone, 2,4-dichlorobenzophenone, methyl o-benzoylbenzate, 4,4'-bis(dimethylamino)benzophenone, and 4,4'-bis(diethylamino)benzophenone; thioxanthone derivatives, such as 2-chlorothioxanthone and 2-isopropylthioxanthone; anthraquinone derivatives, such as 2-chloroanthraquinone and 2-methylanthraquinone; acridone derivatives, such as N-methylacridone and N-butylacridone; and other compounds, such as α,α-diethoxyacetophenone, benzyl, fluorenone, xanthone, uranyl compounds, and halogen compounds.

Some of these compounds correspond to the compounds listed as the photoradical polymerization initiator (ζ). The photosensitizer enhances the function of the photocationic polymerization initiator (β1). These photosensitizers can be used alone or in the form of a mixture.

The photosensitizer is preferably contained in an amount of 0.1 to 20 parts by mass relative to 100 parts by mass of the total amount of the cationic polymerizable monomer (comprising the epoxy compound (α1), the oxetane compound (α2), and optionally the additional cationic polymerizable compound) in the photocurable adhesive composition usable in the present invention.

The additional non-polymerizable component (η) may be a thermal cationic polymerization initiator. Examples of the thermal cationic polymerization initiator include benzylsulfonium salts, thiophenium salts, thiolanium salts, benzylammonium salts, pyridinium salts, hydrazinium salts, carboxylic acid esters, sulfonic acid esters, and amineimides. These initiators are readily commercially available. Examples of the commercial products include trade names Adeka OPTON CP77 and Adeka OPTON CP66 (available from Adeka Corporation); CI-2639 and CI-2624 (available from NIPPON SODA CO., LTD.); and Sunaid SI-60L, Sunaid SI-80L, and Sunaid SI-100L (available from Sanshin Chemical Industry Co., Ltd.).

Polyols, which promote cationic polymerization, can also be used as the additional non-polymerizable component (ζ). Polyols having no acidic group other than a phenolic hydroxy group are preferred. Examples of such polyols include polyol compounds having no functional group other than a hydroxy group, polyester polyol compounds, polycaprolactone polyol compounds, polyol compounds having a phenolic hydroxy group, and polycarbonate polyol compounds.

Alternatively, the additional non-polymerizable component (η) may be the followings additives, which can also be used within a range to keep the advantageous effects of the present invention: silane coupling agents, ion trapping agents, antioxidants, light stabilizers, chain transfer agents, sensitizers, tackifiers, thermoplastic resins, fillers, flow control agents, plasticizers, antifoaming agents, leveling agents, dyes, and organic solvents.

A thermoplastic resin as the additional non-polymerizable component (η) is also effectively compounded to enhance the adhesiveness to the cellulose acylate film significantly. Preferred thermoplastic resins have a glass transition temperature of 70° C. or more to enhance the durability of the polarizer. Particularly preferred are methyl methacrylate polymers.

<Polarizer>

The polarizer, which is a main component of the polarizing plate, can transmit only a light component having a polarization plane in a predetermined direction. Typical known polarizers include poly(vinyl alcohol) polarizing films. The poly(vinyl alcohol) polarizing films are classified into poly(vinyl alcohol) films dyed with iodine and those dyed with dichroic dyes.

The polarizer can be prepared by the following procedure: A poly(vinyl alcohol) aqueous solution is formed into a film. The film is monoaxially stretched, and is dyed, or vise versa. The resulting film is preferably treated with a boron compound to give durability. The polarizer has a thickness of preferably 5 to 30 μm, more preferably 10 to 20 μm.

Also preferred is an ethylene modified poly(vinyl alcohol) described in Japanese Patent Application Laid-Open Nos. 2003-248123 and 2003-342322, which contains 1 to 4 mol % of ethylene unit, and has a degree of polymerization of 2000 to 4000, and a degree of saponification of 99.0 to 99.99 mol %. Among these films, preferred are ethylene modified poly(vinyl alcohol) films having a temperature for hot water cutting of 66 to 73° C. A polarizer composed of such an ethylene modified poly(vinyl alcohol) film has high polarization and high durability, and reduced color unevenness. Such a polarizer is particularly preferred in large-sized liquid crystal display devices.

<Preparation of Polarizing Plate>

A polarizing plate can be prepared by bonding one surface of a polarizer to a first surface of the cellulose acylate film according to the present invention with a photocurable adhesive, where the first surface has a specified permeation rate of hydroxyethyl acrylate. For example, of both surfaces of the cellulose acylate film, a surface having a dl value which satisfies an r value of 1.1 or more is preferably bonded to the polarizer with the photocurable adhesive.

The other surface of the polarizer in the polarizing plate may be preferably bonded to the cellulose acylate film according to the present invention or a different optical film. Examples of such an optical film preferably include commercially available cellulose ester films (such as KONICA MINOLTA TAC KC8UX, KC5UX, KC8UCR3, KC8UCR4, KC8UCR5, KC8UY, KC4UY, KC4UE, KC8UE, KC8UY-HA, KC8UX-RHA, KC8UXW-RHA-C, KC8UXW-RHA-NC, and KC4UXW-RHA-NC, which are available from KONICA MINOLTA, INC.).

A method of preparing a polarizing plate with a photocurable adhesive will now be described by way of an example.

A polarizing plate can be prepared by a process comprising a pre-treatment step of treating a surface of a cellulose acylate film to be bonded to a polarizer for ready bonding; an adhesive applying step of applying a photocurable adhesive described below to a polarizer and a surface of the cellulose acylate film having a permeation rate of hydroxyethyl acrylate specified in the present invention; an bonding step of bonding the polarizer to the cellulose acylate film with an adhesive layer; and a curing step of curing the adhesive layer bonding the polarizer with the cellulose acylate film.

(Pre-Treatment Step)

In the pre-treatment step, a surface of a cellulose acylate film to be bonded to a polarizer is treated for ready bonding. If cellulose acylate films are bonded to both surfaces of the polarizer, these cellulose acylate films are subjected to this pre-treatment. In the subsequent adhesive applying step, the pre-treated surface of the cellulose acylate film is used as the surface bonded to the polarizer. For example, of both surfaces of the cellulose acylate film, a surface having a dl which satisfies an r value of 1.1 or more is subjected to the pre-treatment.

(Adhesive Applying Step)

In the adhesive applying step, the photocurable adhesive is applied onto a polarizer and a surface having a specified permeation rate of hydroxyethyl acrylate among both surfaces of the cellulose acylate film. The photocurable adhesive can be directly applied onto the polarizer or the surface of the cellulose acylate film by any application process. Examples of such an application process include doctor blading, wire bar coating, die coating, comma coating, and gravure coating. The photocurable adhesive can also be applied by casting the photocurable adhesive between the polarizer and the cellulose acylate film, and applying pressure onto the workpiece with rolls to uniformly spread the adhesive.

(Bonding Step)

After the photocurable adhesive is applied, the workpiece is fed to the bonding step. In the bonding step, for example, if the photocurable adhesive is applied onto the surface of the polarizer in the previous applying step, the cellulose acylate film is laminated thereon. If the photocurable adhesive is applied onto the surface of the cellulose acylate film in the applying step, the polarizer is laminated thereon. If the photocurable adhesive is cast between the polarizer and the cellulose acylate film, the polarizer and the cellulose acylate film are laminated in this state. If the cellulose acylate films are bonded to both surfaces of the polarizer with the photocurable adhesive, these cellulose acylate films are layered on the surfaces of the polarizer having the photocurable adhesive thereon. In this state, pressure is usually applied to the workpiece through rolls from both surfaces of the workpiece (from the polarizer and the cellulose acylate film if the cellulose acylate film is laminated on one surface of the polarizer, or from the cellulose acylate films if the cellulose acylate films are laminated on both surfaces of the polarizer). Metal or rubber rolls can be used. The rolls disposed on both surfaces of the workpiece may be composed of the same material or different materials.

(Curing Step)

In the curing step, the uncured photocurable adhesive is irradiated with active energy beams to be cured into an adhesive layer containing an epoxy compound and an oxetane compound, and thus bond the polarizer to the cellulose acylate film with the photocurable adhesive. If the cellulose acylate film is bonded to one surface of the polarizer, the polarizer or the cellulose acylate film may be irradiated with active energy beams. If the cellulose acylate films are bonded to both surfaces of the polarizer, preferably these cellulose acylate films are laminated on the surfaces of the polarizer having the photocurable adhesive thereon, and one of the cellulose acylate films is irradiated with active energy beams to cure the photocurable adhesives disposed on both surfaces of the polarizer at the same time. If an ultraviolet absorbing agent is compounded in one of the cellulose acylate films, the other cellulose acylate film not containing the ultraviolet absorbing agent is irradiated with ultraviolet light used as the active energy beams.

The active energy beams used can be visible light, ultraviolet light, X-rays, or electron beams. In general, ultraviolet light is preferably used for it is easy to handle and attains a sufficient curing rate. Any light source for the active energy beam can be used. Examples of the light source include lamps that can emit light with a wavelength distribution of 400 nm or less, such as low pressure mercury lamps, middle pressure mercury lamps, high pressure mercury lamps, ultrahigh pressure mercury lamps, chemical lamps, blacklight lamps, microwave-exciting mercury lamps, metal halide lamps, and LED lamps.

The intensity of the light to illuminate the photocurable adhesive depends on the target composition, and any intensity can be selected. Preferably, the intensity of the light in the wavelength region effective in activation of the polymerization initiator is adjusted to fall within the range of 1 to 3000 mW/cm$^2$ where the light is UV-B (ultraviolet light in the wavelength band of 280 to 320 nm). An intensity of less than 1 mW/cm$^2$ significantly increases the reaction time while an intensity of more than 3000 mW/cm$^2$ may yellow the photocurable adhesive or degrade the polarizer due to heat radiated from the lamp and heat generated during polymerization of the photocurable adhesive.

The time to irradiate the photocurable adhesive with light is controlled according to the composition to be cured, and any time can be selected. Preferably, the irradiation time is set such that the accumulated light amount expressed by the product of the irradiation intensity and the irradiation time is within the range 10 to 5000 mJ/cm$^2$. An accumulated light energy of less than 10 mJ/cm$^2$ may lead to insufficient generation of the active species derived from the polymerization initiator, resulting in insufficient curing of the adhesive layer. In contrast, an accumulated light energy of more than 5000 mJ/cm$^2$ significantly increases the irradiation time, and is not effective in an enhancement in productivity.

The photocurable adhesive is preferably cured by irradiation with the active energy beams under conditions to prevent deterioration of the functions of the polarizing plate, for example, reductions in polarization and transmittance, and the hue of the polarizer and a reduction in transparency of the cellulose acylate film.

The adhesive layer in the polarizing plate prepared in such a manner can have any thickness. The thickness is usually 50 µm or Less, preferably 20 µm or less, more preferably 10 µm or less, most preferably 5 µm or less.

<Liquid Crystal Display Device>

The polarizing plate according to the present invention can be suitably used in liquid crystal display devices. Liquid crystal display devices including the polarizing plate according to the present invention have high visibility because the polarizing plate includes the cellulose acylate film having high optical compensation. Such liquid crystal display devices also have high durability because of high adhesiveness between the polarizer and the cellulose acylate film.

The surface of the cellulose acylate film included in the polarizing plate is bonded to at least one surface of a liquid crystal cell by a known method. This bonding may be performed with an adhesive layer.

The liquid crystal display device can operate in any driving mode. Examples of the driving mode include STN, TN, OCB, HAN, VA (MVA, PVA), IPS and OCB modes. Preferred are liquid crystal display devices in the VA (MVA, PVA) mode. Even if liquid crystal display devices have 30-inch or larger screens, liquid crystal display devices including the polarizing plate according to the present invention barely cause environmental variations, and have high visibility, such as color nuance and front contrast.

EXAMPLES

The present invention will now be described in detail by way of non-limiting Examples. In Examples, "parts" and "%" are on the mass basis, unless otherwise specified.

Example 1

Preparation of Cellulose Acylate Dope 101

(Preparation of Fine Particle Dispersion 1)

| | |
|---|---|
| Fine particles (Aerosil R972V, available from Nippon Aerosil Co., Ltd.) | 11 parts by mass |
| Ethanol | 89 parts by mass |

These materials were mixed with stirring in a dissolver for 50 minutes, and were dispersed in a Manton-Gaulin homogenizer to prepare Fine particle dispersion 1.

(Preparation of Fine Particle Solution 1)

While methylene chloride was being slowly stirred in a dissolution tank, Fine particle dispersion 1 was slowly added. The mass of methylene chloride and that of Fine particle dispersion are listed below. The resulting solution was dispersed with an Attritor so as to control the particle sizes of secondary particles within a predetermined range. The solution was filtered through FINE MET NP available from Nippon Seisen Co., Ltd. to prepare Fine particle solution 1.

| | |
|---|---|
| Methylene chloride | 99 parts by mass |
| Fine particle dispersion 1 | 5 parts by mass |

(Preparation of Main Dope)

A main dope comprising the following composition was prepared.

| | |
|---|---|
| Methylene chloride | 340 parts by mass |
| Ethanol | 64 parts by mass |
| Cellulose acylate (Synthetic Example 1: average degree of acetylation: 2.45, weight average molecular weight Mw: 166000, number average molecular weight Mn; 47500, Ca content: 12 ppm, SP value; 12.1 (cal/cm$^3$)$^{1/2}$) | 100 parts by mass |
| Additive 1 Compound ar-14 represented by Formula (I): SP value: 11.3 (cal/cm$^3$)$^{1/2}$), difference in SP value (|HEA-additive|): 1.2) | 5 parts by mass |
| Fine particle solution 1 | 1 part by mass |

Methylene chloride and ethanol in the composition were placed in a pressurized dissolution tank. The cellulose acylate, the additive, and Fine particle solution 1 were added to the solvent in the pressurized dissolution tank under stirring. The mixture was heated, and was completely dissolved with stirring. The solution was filtered through AZUMI FILTER PAPER No. 244 available from AZUMI FILTER PAPER CO., LTD to prepare a main dope.

<Preparation of Cellulose Acylate Dopes 102 to 115>

Cellulose acylate dopes 102 to 115 were prepared as in the cellulose acylate dope 101 except that the types of cellulose acylate and the types of the additives were varied as shown in Table 3.

In the item of Types of cellulose acylate in Table 3, Commercial product 1 indicates Ca398-6 (available from Eastman Chemical Company) and Commercial product 2 indicates Ca398-10 (available from Eastman Chemical Company).

Table 3 shows the types of cellulose acylate, the average degree of acetylation, the number average molecular weight Mn, the weight average molecular weight Mw, the Ca content, the SP value of cellulose acylate, the types of the additives, the amount of the additive to be added, the SP value of the additive, and the difference in the SP value (|HEA–additive|).

The molecular weights Mn and Mw, the Ca content, and the SP value were determined by the following procedures.

(Determination of Number Average Molecular Weight Mn and Weight Average Molecular Weight Mw)

The number average molecular weight (Mn) and the weight average molecular weight (Mw) of cellulose acylate were determined by gel permeation chromatography (GPC).

The measuring conditions were as follows:

Solvent: methylene chloride

Columns: Shodex K806, K805, and K803G (available from Showa Denko K.K., the three columns are connected)

Column temperature: 25° C.
Concentration of sample: 0.1 mass %
Detector: RI Model 504 (available from GL Sciences Inc.)
Pump: L6000 (available from Hitachi, Ltd.)
Flow rate: 1.0 ml/min
Calibration curves: calibration curves derived from thirteen standard polystyrenes samples STK (available from Tosoh Corporation, Mw: 500 to 1000000) were used. The thirteen samples were eluted at substantially equal intervals.

(Determination of Calcium (Ca) Content)

The calcium (Ca) content was determined as follows: After dry cellulose acylate was completely burned, the ash was dissolved in hydrochloric acid (pre-treatment), and the Ca content was measured by atomic absorption. The observed value is expressed as a calcium content (ppm) in 1 g of absolute dry cellulose acylate.

(Determination of SP Value)

The solubility parameters (SP values) described in Chapter IV, Solubility Parameter Values, Polymer Handbook (Second Edition) were used. In the present invention, the SP value indicates a value at 25° C. expressed in $(cal/cm^3)^{1/2}$.

The SP values not found in the book were calculated by a method described in R. F. Fedors, Polymer Engineering Science, 14, p. 147 (1974). The SP value is basically calculated by the following expression:

$$SP\ value = (\Delta E/V)^{1/2}$$

where $\Delta E$ represents a cohesive energy density; V represents a molecular volume.

For examples, the SP values of the cellulose acylate, the additive, HEA, and other adhesive compositions according to the present invention were calculated with Scigress Explorer Ver. 2.4 (available from FUJITSU LIMITED) based on the idea of R. F. Fedors.

<Preparation of Cellulose Acylate Film 201>

The cellulose acylate dope 102 prepared above was uniformly cast into a width of 1500 mm at 33° C. on a metal support with an endless metal support casting apparatus. The temperature of the metal support was maintained at 30° C.

The solvent was evaporated from the cellulose acylate film cast on the metal support until the residual solvent content reached 89%. The cellulose acylate film was then detached from the metal support at a peeling tension of 130 N/m.

The detached cellulose acylate film was stretched at a draw ratio of 1.15 in the transverse direction by a tenter while being heated at 160° C. The residual solvent content was 10% at the start of the stretching.

The cellulose acylate film was then conveyed on several rollers in a drying zone to completely dry the film. The drying temperature was 130° C., and the conveying tension was 100 N/m.

A cellulose acylate film 201 having a dry thickness of 35 μm and a length of 2000 m was prepared. The cellulose acylate film 201 had a surface B in contact with the metal support during the casting and a surface A remote from the metal support (exposed to air).

<Preparation of Cellulose Acylate Films 202 to 216>

Cellulose acylate films 202 to 216 were prepared as in the cellulose acylate film 201 except that the dope composition and the conditions on preparation were varied as shown in Table 4.

Table 4 shows Dope No. of the dopes used in the cellulose acylate films 201 to 216, the residual solvent content in the detached film, the thickness of the film, the difference in the SP value (|HEA−additive|), the r value determined from the determined additive contents contained on the surface A and surface B, the thickness of the film, and the permeation rates of HEA in the surface A and the surface B.

<Additive Distribution of Surfaces A and B of Cellulose Acylate Film: r Value>

In the cellulose acylate film 201, the additive content of the surface B (surface in contact with the metal support during the casting) and that of the surface A (surface opposite to the surface B) were measured by TOF-SIMS. The additive content on the surface B was higher than that on the surface A, and the r value represented by the following expression was 1.26:

$$r = d1/d2 \qquad \text{Expression (1):}$$

d1: the determined additive content on the surface B (on the metal support) of the film
d2: the determined additive content on the surface A (opposite to the surface B) of the film (Method of Determining r Value)

The contents of the additive ar-14 on both surfaces of the cellulose acylate film 201 were measured by TOF-SIMS under the following conditions. In the cellulose acylate films 202 to 216, the contents of the additive ar-14 on both surfaces of the films were measured in the same manner, and the additive distribution, i.e., the r values were calculated.

Apparatus: 2100 TRIFT2 (available from Physical Electronics Inc.)
Measuring mode: sample cooling mode (temperature range: −95 to −105° C.)
Primary ion: Ga (15 kV)
Target area: 60 μm square
Integration time: 2 minutes
Reference ion m/Z for additive (ar-14): 119

<Permeation Rates of HEA on Surface A and Surface B of Cellulose Acylate Film>

The permeation rate of HEA was determined with a micro contact angle meter (MCA-3) available from Kyowa Interface Science Co., Ltd. by the following procedure.

(1) HEA (50 pl) was dropwise placed from a glass tube having an inner diameter of 5 μm onto a film at 23° C. and 55% RH.
(2) Immediately after the dropping, an image of droplets was taken in, and the volume of the droplets was calculated with software attached to the micro contact angle meter. The volume of the droplets was defined as X (FIG. 1A).
(3) An image was taken in every one second immediately after the dropping, and the volume of the droplets was calculated from the photograph after 15 seconds from the dropping. The obtained volume was defined as Y (FIG. 1B).
(4) From X−Y, the volume of HEA permeated onto the film for 15 seconds was determined.

<Retardation Value of Cellulose Acylate Film>

In the cellulose acylate films 201 to 216, the retardation value Ro in the in-plane direction and the retardation value Rth across the thickness were determined by Expressions (4) and (5), respectively:

$$Ro = (nx - ny) \times d\ [\text{nm}] \qquad \text{Expression (4):}$$

$$Rth = \{(nx + ny)/2 - nz\} \times d\ [\text{nm}] \qquad \text{Expression (5):}$$

wherein $n_x$ represents a refractive index in the in-plane slow axis direction of the cellulose acylate film; $n_y$ represents a refractive index in the in-plane fast axis direction of the cellulose acylate film; $n_z$ represents a refractive index across the thickness of the cellulose acylate film; the refractive index is measured at 23° C., 55% RH, and a wavelength of 590 nm; d represents the thickness (nm) of the cellulose acylate film.

The retardation values Ro and Rth can be determined as follows: A cut sample (35 mm×35 mm) was prepared from the cellulose acylate film, and the humidity was adjusted at 25° C. and 55% RH for two hours. The sample was measured with an automatic birefringence analyzer (KO-BRA-21ADH, available from Oji Scientific Instruments Co.) at 590 m from the vertical direction. The sample was also measured in the same manner while the surface of the cellulose acylate film was being inclined. The retardation values Ro and Rth were calculated by extrapolation of the resulting retardation values.

The results show that the cellulose acylate films 201 to 216 have the retardation values Ro and Rth within the following ranges, respectively, and the cellulose acylate film according to the present invention has a function (retardation values) as an optical compensation film.

$$10 \leq Ro \text{ (nm)} \leq 100$$

$$70 \leq Rth \text{ (nm)} \leq 300$$

TABLE 3

| Dope No. | Classification | Cellulose Acylate | | | | | Additive | | | ΔSP value [HEA-Additive] (cal/cm³)^{1/2} |
|---|---|---|---|---|---|---|---|---|---|---|
| | | Average Degree of Acetylation | Number Average Molecular Weight (Mn) | Weight Average Molecular Weight (Mw) | Ca content (ppm) | SP value (cal/cm³)^{1/2} | Classification | Addition Amount (pts. mass) | Sp value (cal/cm³)^{1/2} | |
| 101 | Example 1 | 2.45 | 47500 | 166000 | 12 | 12.1 | ar-14 | 5 | 11.3 | 1.2 |
| 102 | Example 1 | 2.45 | 47500 | 166000 | 12 | 12.1 | ar-14 | 10 | 11.3 | 1.2 |
| 103 | Example 1 | 2.45 | 47500 | 166000 | 12 | 12.1 | ar-18 | 5 | 12.4 | 0.1 |
| 104 | Example 1 | 2.45 | 47500 | 166000 | 12 | 12.1 | ar-18 | 10 | 12.4 | 0.1 |
| 105 | Example 2 | 2.41 | 54000 | 200000 | 2 | 12.2 | ar-9 | 8 | 10.6 | 1.9 |
| 106 | Example 3 | 2.47 | 45500 | 115000 | 55 | 12.1 | ar-14 | 8 | 11.3 | 1.2 |
| 107 | Example 3 | 2.47 | 45500 | 115000 | 55 | 12.1 | ar-6 | 8 | 11.8 | 0.7 |
| 108 | Example 4 | 2.27 | 50000 | 190000 | 3 | 12.5 | ar-18 | 10 | 12.4 | 0.1 |
| 109 | Example 5 | 2.14 | 45000 | 120000 | 8 | 12.7 | ar-14 | 10 | 11.3 | 1.2 |
| 110 | Example 5 | 2.14 | 45000 | 120000 | 8 | 12.7 | ar-9 | 10 | 10.6 | 1.9 |
| 111 | Product 1 | 2.46 | 35500 | 95500 | 10 | 12.1 | ar-9 | 10 | 10.6 | 1.9 |
| 112 | Product 1 | 2.46 | 35500 | 95500 | 10 | 12.1 | ar-14 | 10 | 11.3 | 1.2 |
| 113 | Product 2 | 2.42 | 42500 | 116000 | 9 | 12.2 | ar-16 | 10 | 11.5 | 1.0 |
| 114 | Product 2 | 2.42 | 42500 | 116000 | 9 | 12.2 | ar-18 | 8 | 12.4 | 0.1 |
| 115 | Product 2 | 2.42 | 42500 | 116000 | 9 | 12.2 | ar-9 | 8 | 10.6 | 1.9 |

TABLE 4

| Cellulose Acylate Film No. | Dope No. | Residual Solvent after Detachment (mass %) | Film Thickness (μm) | ΔSP value [HEA-Additive] (cal/cm³)^{1/2} | Additive Distribution of Surfaces A, B: r value (Surface B > Suface A) | Surface Adhered to Polarizer | HEA Permeation Rate (pl) (Contact Angle Meter/15 sec) |
|---|---|---|---|---|---|---|---|
| 201 | 102 | 89 | 35 | 1.2 | 1.26 | A | 19 |
| | | | | | | B | 17 |
| 202 | 102 | 105 | 35 | 1.2 | 1.06 | A | 23 |
| | | | | | | B | 22 |
| 203 | 104 | 85 | 18 | 0.1 | 1.27 | A | 24 |
| | | | | | | B | 23 |
| 204 | 104 | 70 | 40 | 0.1 | 1.31 | A | 24 |
| | | | | | | B | 21 |
| 205 | 105 | 78 | 32 | 1.9 | 1.29 | A | 10 |
| | | | | | | B | 10 |
| 206 | 105 | 98 | 10 | 1.9 | 1.21 | A | 17 |
| | | | | | | B | 17 |
| 207 | 106 | 95 | 28 | 1.2 | 1.17 | A | 25 |
| | | | | | | B | 22 |
| 208 | 107 | 101 | 33 | 0.7 | 1.07 | A | 25 |
| | | | | | | B | 25 |
| 209 | 108 | 86 | 24 | 0.1 | 1.25 | A | 23 |
| | | | | | | B | 20 |
| 210 | 109 | 75 | 36 | 1.2 | 1.38 | A | 24 |
| | | | | | | B | 23 |
| 211 | 110 | 81 | 34 | 1.9 | 1.32 | A | 24 |
| | | | | | | B | 21 |
| 212 | 111 | 79 | 36 | 1.9 | 1.26 | A | 32 |
| | | | | | | B | 27 |
| 213 | 111 | 83 | 45 | 1.9 | 1.26 | A | 33 |
| | | | | | | B | 29 |
| 214 | 113 | 105 | 34 | 1.0 | 1.03 | A | 28 |
| | | | | | | B | 26 |
| 215 | 114 | 50 | 36 | 0.1 | 1.45 | A | 28 |
| | | | | | | B | 26 |
| 216 | 115 | 58 | 36 | 1.9 | 1.45 | A | 24 |
| | | | | | | B | 21 |

<Preparation of Polarizing Plates 301 and 316>
<Preparation of Adhesive 301>

The components listed in Table 5 were mixed, and the mixture was defoamed to prepare a photocurable adhesive solution.

(Composition of Adhesive Solution)

| | |
|---|---|
| Hydroxyethylacrylamide (HEAA) | 50 parts by mass |
| Hydroxyethyl acrylate (HEA) | 50 parts by mass |
| IRGACURE 907 (available from BASF Japan Ltd.) | 1.5 parts by mass |

<Preparation of adhesives 302 to 305>

The components listed in Table 5 were mixed, and the respective mixtures were defoamed to prepare photocurable adhesive solutions 302 to 305. The abbreviations of the compounds listed in Table 5 correspond to the compounds listed in Table 6. The numerals in Table 5 indicate the amounts of the respective compounds (parts by mass).

In Table 3, the difference in the SP value between diacetyl cellulose (DAC) and the adhesive (ASP value |DAC−adhesive|) is shown.

(Preparation of Polarizer)

A poly(vinyl alcohol) film having a thickness of 70 μm was swollen in water at 35° C. The swollen film was immersed in an aqueous solution composed of iodine (0.075 g), potassium iodide (5 g), and water (100 g) for 60 seconds, and was further immersed in an aqueous solution composed of potassium iodide (3 g), boric acid (7.5 g), and water (100 g) at 45° C. The film was monoaxially stretched at a temperature of 55° C. and a draw ratio of 5. The monoaxially stretched film was washed with water, and was dried to prepare a polarizer having a thickness of 20 μm.

(Preparation of Polarizing Plate)

Polarizing plates including the cellulose acylate films 201 to 216 were prepared by the following procedure.

A KC4UA (available from KONICA MINOLTA, INC.) film was prepared, and a surface of the film was subjected to a corona discharge treatment at an intensity of corona output of 2.0 kW and a line rate of 18 m/min. The adhesive solution prepared as above was then applied onto the

TABLE 5

| Adhesive No. | Radical Polymerizable Compound | | | | | | Cationic Polymerizable Compound | | Photopolymerization Initiator | | Photosensitizer |
|---|---|---|---|---|---|---|---|---|---|---|---|
| | HEAA | ACMO | 4HBA | HEA | TPGDA | N-Methylolacrylamide | Celloxide 2021P | 1,4-Butanediol Diglycidyl Ether | Irgacure 907 | CPI-100P | 9,10-Dibutoxyanthracene |
| 301 | 50 | — | — | 50 | — | — | — | — | 1.5 | — | — |
| 302 | 30 | 50 | — | — | 20 | — | — | — | 1.5 | — | — |
| 303 | — | 50 | — | — | 20 | 30 | — | — | 1.5 | — | — |
| 304 | 20 | 50 | 10 | 20 | — | — | — | — | 1.5 | — | — |
| 305 | — | — | — | — | — | — | 70 | 30 | — | 2 | 2 |

TABLE 6

| Abbreviation | Name/Structural Formula | SP value (cal/cm$^3$)$^{1/2}$ | ΔSP value \|DAC-Adhesive\| (cal/cm$^3$)$^{1/2}$ |
|---|---|---|---|
| HEAA | Hydroxyethyl Acrylamide | 14.4 | 1.4-2.4 |
| ACMO | Acryloylmorpholine | 11.2 | 0.8-1.8 |
| 4HBA | 4-Hydroxybutyl Acrylate | 11.6 | 0.4-1.4 |
| HEA | Hydroxyethyl Acrylate | 12.5 | 0.0-0.5 |
| TPGDA | Tripropylene glycol diacrylate | 9.4 | 2.6-3.6 |
| N-Methylolacrylamide | | 15.4 | 2.4-3.4 |
| Celloxide 2021P | | 10.3 | 1.7-2.7 |
| 1,4-Butanediol Diglycidyl Ether | | 9.4 | 2.6-3.6 | corona-treated surface of the film with a bar coater such that the cured adhesive had a thickness of about 3 μm. An adhesive layer was formed. The poly(vinyl alcohol)-iodine polarizer prepared above was bonded to the adhesive layer.

The surfaces A of the cellulose acylate films 201 to 216 were subjected to the corona discharge treatment in the same manner at an intensity of corona output of 2.0 kW and a line rate of 18 m/min. The adhesive solution prepared as above was then applied onto the corona-treated surfaces of the cellulose acylate films 201 to 216 with a bar coater such that the cured adhesives each had a thickness of about 0.8 μm. Adhesive layers were formed.

A polarizer having a surface bonded to a KC4UA (available from KONICA MINOLTA, INC.) film was bonded to each of the adhesive layers to prepare laminates each including one of the cellulose acylate films 201 to 216 (surface A), a polarizer, and KC4UA (available from KONICA MINOLTA, INC.). Each of the cellulose acylate films 201 to 216 was bonded to the polarizer such that the slow axis of the film was orthogonal to the absorption axis of the polarizer.

The cellulose acylate films 201 to 216 in these laminates were irradiated with ultraviolet light from an ultraviolet light irradiating apparatus with a belt conveyor (lamp: D valve available from Fusion UV Systems, Inc. was used) at an accumulated light energy of 750 mJ/cm$^2$ to cure the adhesive layers.

The surfaces B of the cellulose acylate films 201 to 216 were subjected to the corona discharge treatment in the same manner to prepare laminates each including one of the cellulose acylate films 201 to 216 (surface B), a polarizer, and KC4UA (available from KONICA MINOLTA, INC.).

Each of the cellulose acylate films 201 to 216 was similarly bonded to the polarizer, which was interposed between one of the cellulose acylate films 201 to 216 and KC4UA. Polarizing plates 301 to 316 including such polarizers were prepared.

The cellulose acylate film 205 was saponified under the following conditions with no corona discharge treatment to prepare a cellulose acylate film 217. The observed permeation rate of HEA of the cellulose acylate film 217 was 7 pL/15 sec for both the surfaces A and B.

The adhesive 301 was applied onto the cellulose acylate film 217. The laminate of cellulose acylate film 217/polarizer/KC4UA, however, was not able to be bonded, and the polarizing plate was not prepared. The result shows that a significantly low permeation rate of HEA cannot form a mixed layer of the film and the adhesive.

<Saponification>

Saponification: 1.5 mol/L KOH aqueous solution at 50° C. for 20 seconds

Washing with water: water at 30° C. for 60 seconds

A polarizing plate 314 was prepared in the same manner except that the thickness of the applied adhesive 301 was 3 μm.

The cellulose acylate films 201 to 216 used in the preparation of the polarizing plates 301 to 316 and the surface of each film bonded to the polarizer (surface A or B) are shown in Table 7.

<Characterization of Polarizing Plate>

In the polarizing plates 301 to 316, the adhesion between the polarizer and the cellulose acylate film and the polarization of the polarizing plate were evaluated in accordance with the following procedures. The results of the evaluation are shown in Table 2 below.

(Evaluation of Adhesion Between Polarizer and Cellulose Acylate Film)

In each of the polarizing plates 301 to 316, ten polarizing plates were left to stand under a hot and humid condition at 60° C. and 90% RH for 500 hours. In each of the polarizing plates 301 to 316, the adhesion was evaluated based on the separation of the cellulose acylate film from the polarizer by hands.

The results were ranked according to the following criteria:

A: None of ten cellulose acylate films detached

B: One or two cellulose acylate films detached

F: Three or more cellulose acylate films detached (Characterization of Curling of Polarizing Plate)

A cut sample for the measurement of curling (35 mm in the width direction, and 1 mm in the longitudinal direction) was prepared from the polarizing plate. After the sample was left to stand under a 25° C. and 55% RH atmosphere for three days, the degree of curling was measured. The degree of curling is represented by the reciprocal of a curvature radius. Specifically, the degree of curling was determined by Method A in accordance with JIS-K7619-1988. The degree of curling was evaluated according to the following criteria:

○: 0 to 5%

Δ: 5 to 30% x: 30 to 100%

(Characterization of Polarization of Polarizing Plate)

In the polarizing plates 301 to 316, the polarization was measured with "V-7100" available from JASCO Corporation.

Specifically, the parallel transmittance (H0) and the orthogonal transmittance (H90) of the polarizing plate were measured, and the polarization was calculated by Expression: polarization (%)=$\{(H0-H90)/(H0+H90)\}^{1/2} \times 100$. The parallel transmittance (H0) indicates the transmittance of a parallel laminate of two identical polarizing plates laminated such that the absorption axes of the polarizing plates are disposed in parallel. The orthogonal transmittance (H90) indicates the transmittance of an orthogonal laminate of two identical polarizing plates laminated such that the absorption axes of the polarizing plates are orthogonally disposed. These transmittances correspond to a Y value subjected to luminosity factor correction under a visual field of 2 degrees (Illuminant C) in accordance with JIS Z 8701 (1982).

The polarization was ranked according to the following criteria:

○: Polarization of 99.990 or more

Δ: Polarization of 99.980 or more and less than 99.990 x: Polarization of less than 99.980

TABLE 7

| Polarizing Plate No. | Cellulose Acylate Film No. | Dope No. | Film Thickness (μm) | Weight Average Molecular Weight (Mw) | Ca content (ppm) | Additive SP value (cal/cm³)^(1/2) | r value | Adhered Surface | HEA Permeation Rate (pl) (Contact Angle Meter/15 s) | Adhesive No. | Application Thickness (μm) | Adhesion | Curling of Polarizing Plate | Reduction in Polarization | Note |
|---|---|---|---|---|---|---|---|---|---|---|---|---|---|---|---|
| 301 | 201 | 102 | 35 | 166000 | 12 | 11.3 | 1.26 | A | 19 | 301 | 0.8 | ○ | ○ | ○ | Example |
|  |  |  |  |  |  |  |  | B | 17 | 301 | 0.8 | ○ | ○ | ○ | Example |
| 302 | 202 | 102 | 35 | 166000 | 12 | 11.3 | 1.06 | A | 23 | 301 | 0.8 | Δ | ○ | Δ | Example |
|  |  |  |  |  |  |  |  | B | 22 | 301 | 0.8 | Δ | ○ | Δ | Example |
| 303 | 203 | 104 | 15 | 166000 | 12 | 12.4 | 1.27 | A | 24 | 301 | 0.8 | Δ | Δ | Δ | Example |
|  |  |  |  |  |  |  |  | B | 23 | 301 | 0.8 | Δ | Δ | Δ | Example |
| 304 | 204 | 104 | 40 | 166000 | 12 | 12.4 | 1.31 | A | 24 | 301 | 0.8 | Δ | Δ | Δ | Example |
|  |  |  |  |  |  |  |  | B | 21 | 301 | 0.8 | Δ | Δ | Δ | Example |
| 305 | 205 | 105 | 32 | 200000 | 2 | 10.6 | 1.29 | A | 16 | 301 | 0.8 | ○ | ○ | ○ | Example |
|  |  |  |  |  |  |  |  | B | 10 | 301 | 0.8 | Δ | ○ | ○ | Example |
| 306 | 206 | 105 | 10 | 200000 | 2 | 10.6 | 1.21 | A | 17 | 301 | 0.8 | ○ | x | Δ | Comparison |
|  |  |  |  |  |  |  |  | B | 17 | 301 | 0.8 | ○ | x | Δ | Comparison |
| 307 | 207 | 106 | 28 | 115000 | 55 | 11.3 | 1.17 | A | 25 | 301 | 0.8 | Δ | ○ | Δ | Example |
|  |  |  |  |  |  |  |  | B | 22 | 301 | 0.8 | Δ | ○ | Δ | Example |
| 308 | 208 | 107 | 33 | 115000 | 55 | 11.8 | 1.07 | A | 25 | 301 | 0.8 | Δ | Δ | Δ | Example |
|  |  |  |  |  |  |  |  | B | 25 | 301 | 0.8 | Δ | Δ | Δ | Example |
| 309 | 209 | 108 | 24 | 190000 | 3 | 12.4 | 1.25 | A | 23 | 301 | 0.8 | Δ | Δ | Δ | Example |
|  |  |  |  |  |  |  |  | B | 20 | 301 | 0.8 | ○ | Δ | Δ | Example |
| 310 | 210 | 109 | 36 | 120000 | 8 | 11.3 | 1.38 | A | 24 | 301 | 0.8 | Δ | Δ | Δ | Example |
|  |  |  |  |  |  |  |  | B | 23 | 301 | 0.8 | Δ | ○ | Δ | Example |
| 311 | 211 | 110 | 34 | 120000 | 8 | 10.6 | 1.32 | A | 24 | 301 | 0.8 | Δ | ○ | Δ | Example |
|  |  |  |  |  |  |  |  | B | 21 | 301 | 0.8 | ○ | ○ | Δ | Example |
| 312 | 212 | 111 | 36 | 95500 | 10 | 10.6 | 1.26 | A | 32 | 301 | 0.8 | x | x | x | Comparison |
|  |  |  |  |  |  |  |  | B | 27 | 301 | 0.8 | x | Δ | x | Comparison |
| 313 | 213 | 111 | 45 | 95500 | 10 | 10.6 | 1.26 | A | 33 | 301 | 3.0 | ○ | Δ | x | Comparison |
|  |  |  |  |  |  |  |  | B | 29 | 301 | 3.0 | ○ | Δ | x | Comparison |
| 314 | 214 | 113 | 34 | 116000 | 9 | 11.5 | 1.03 | A | 28 | 301 | 0.8 | Δ | Δ | x | Comparison |
|  |  |  |  |  |  |  |  | B | 26 | 301 | 0.8 | Δ | Δ | x | Comparison |
| 315 | 215 | 114 | 36 | 116000 | 9 | 12.4 | 1.45 | A | 28 | 301 | 0.8 | Δ | Δ | x | Comparison |
|  |  |  |  |  |  |  |  | B | 25 | 301 | 0.8 | Δ | Δ | x | Comparison |
| 316 | 216 | 115 | 36 | 116000 | 9 | 10.6 | 1.45 | A | 24 | 301 | 0.8 | Δ | Δ | Δ | Example |
|  |  |  |  |  |  |  |  | B | 21 | 301 | 0.8 | Δ | Δ | Δ | Example |

The results of evaluation show that the polarizing plates according to the present invention have high adhesion between the film and the polarizer, high curling resistance, and a polarization barely reduced by a deviation of the axis of the film bonded to the polarizer.

In conclusion, the permeation rate of HEA can be effectively controlled within the range specified in the present invention to attain the advantageous effects of the present invention by an increased weight average molecular weight Mw of cellulose acylate, an increased Ca content, the SP value of the additive within a specific range, controlled distribution of the additive across the thickness such that a larger content of additive is presented on the surface, in contact with the adhesive, of the optical compensation film, and a combination thereof.

In contrast, all the polarizing plates including the cellulose acylate films according to Comparative Examples have inferior adhesion between the film and the polarizer, low curling resistance, and reduced polarizations at an unsatisfactory level.

Example 2

Preparation of Cellulose Acylate Film 218

A cellulose acylate film 218 was prepared with a casting apparatus equipped with an endless metal support for casting illustrated in FIG. 2 by a three-layer simultaneous casting process (co-casting process) according to the following procedure.

The cellulose acylate dope prepared in Example 1 was used as a cast dope.

A cellulose acylate dope 102 for a skin layer (surface B), a cellulose acylate dope 105 for a core layer, and a cellulose acylate dope 101 for a skin layer (surface A) were simultaneously fed from a casting die 10 onto the endless metal support 16 for casting. Through such a single casting operation, a cast film 20, i.e., a laminate of skin layer (surface B)/core layer/skin layer (surface A) was formed onto the endless metal support 16. These dopes were fed such that a completely dried final film was composed of a 3 μm skin layer (surface B), a 30 μm core layer, and a 3 μm skin layer (surface A).

The dope laminate fed onto the endless metal support 16 was dried with dry air at 40° C. to form a cellulose acylate film. The film was detached from the endless metal support 16. The detached cellulose acylate film was stretched at a draw ratio of 1.15 in the transverse direction with a tenter while being heated at 160° C. The residual solvent content was 10% at the start of the stretching.

The cellulose acylate film was then conveyed on several rollers in a drying zone to completely dry the film. The drying temperature was 130° C., and the conveying tension was 100 N/m.

A cellulose acylate film 218 having a dry thickness of 36 μm and a length of 2000 m was prepared.

<Preparation of Cellulose Acylate Films 219 to 222>

Cellulose acylate films 219 to 222 were prepared as in the cellulose acylate film 218 by the three-layer simultaneous casting process except that the cellulose acylate dopes prepared in Example 1 were used as shown in Table 8 in the preparation of the laminate of skin layer (surface A)/core layer/skin layer (surface B).

TABLE 8

| Cellulose Acylate Film No. | Skin layer (Surface A) | | Core Layer | | Skin Layer (Surface B) | |
|---|---|---|---|---|---|---|
| | Dope No. | Film Thickness (μm) | Dope No. | Film Thickness (μm) | Dope No. | Film Thickness (μm) |
| 218 | 101 | 3 | 105 | 30 | 102 | 3 |
| 219 | 102 | 2 | 105 | 30 | 104 | 4 |
| 220 | 107 | 3 | 105 | 31 | 114 | 3 |
| 221 | 101 | 4 | 105 | 30 | 103 | 3 |
| 222 | 109 | 3 | 105 | 30 | 112 | 4 |

<Preparation of Polarizing Plates 317-1 to 317-3>

The surfaces A and B of the cellulose acylate film 218 were subjected to a corona discharge treatment. A laminate of cellulose acylate film 218/polarizer/KC4UA (available from KONICA MINOLTA, INC.) was prepared as in Example 1 while the adhesive 301 was applied into a thickness of 0.8 μm. The cellulose acylate film 218 in the laminate was irradiated with ultraviolet light in an ultraviolet light irradiation apparatus with a belt conveyor (lamp: D valve available from Fusion UV Systems, Inc. was used) at an accumulated light energy of 750 mJ/cm$^2$ to cure the adhesive layer.

Thus the surfaces A and B of the cellulose acylate film 218 were used to prepare a polarizing plate 317-1 including the polarizer interposed between the two films.

Polarizing plates 317-2 and 317-3 were prepared in the same manner except that adhesives 302 and 305 were used, respectively, as shown in Table 9.

<Preparation Op Polarizing Plates 318-1 to 318-3, 319-1 to 319-3, 320-1 to 320-3, and 321-1 to 321-3>

Polarizing plates 318-1 to 318-3, 319-1 to 319-3, 320-1 to 320-3, and 321-1 to 321-3 were prepared as in the polarizing plates 317-1 to 317-3 except that the cellulose acylate films 219 to 222 and the adhesives 301 to 305 were used as shown in Table 9.

The polarizing plates were evaluated as in Example 1 for the adhesion between the polarizer and the cellulose acylate film, the curling of the polarizing plate, and the polarization of the polarizing plate. The results are shown in Table 9.

TABLE 9

| Polarizing Plate No. | Cellulose Acylate Film No. | Adhered Surface | HEA Permeation Rate (pl) (Contact Angle Meter/15 sec) | Adhesive No. | Adhesion | Curling of Polarizing Plate | Reduction in Polarization | Note |
|---|---|---|---|---|---|---|---|---|
| 317-1 | 218 | A | 23 | 301 | Δ | Δ | Δ | Example |
| | | B | 16 | | ○ | ○ | ○ | Example |
| 317-2 | | A | 23 | 302 | Δ | Δ | Δ | Example |
| | | B | 16 | | ○ | ○ | ○ | Example |
| 317-3 | | A | 23 | 305 | Δ | ○ | Δ | Example |
| | | B | 16 | | ○ | ○ | ○ | Example |
| 318-1 | 219 | A | 18 | 303 | ○ | ○ | ○ | Example |
| | | B | 22 | | Δ | Δ | Δ | Example |
| 318-2 | | A | 18 | 304 | ○ | ○ | ○ | Example |
| | | B | 22 | | Δ | Δ | Δ | Example |
| 318-3 | | A | 18 | 305 | ○ | ○ | ○ | Example |
| | | B | 22 | | Δ | ○ | Δ | Example |
| 319-1 | 220 | A | 17 | 301 | ○ | ○ | ○ | Example |
| | | B | 26 | | x | Δ | x | Comparison |
| 319-2 | | A | 17 | 303 | ○ | ○ | ○ | Example |
| | | B | 27 | | x | Δ | x | Comparison |
| 319-3 | | A | 17 | 305 | ○ | ○ | ○ | Example |
| | | B | 26 | | x | Δ | x | Comparison |
| 320-1 | 221 | A | 22 | 302 | Δ | Δ | Δ | Example |
| | | B | 25 | | Δ | Δ | Δ | Example |
| 320-1 | | A | 22 | 304 | Δ | Δ | Δ | Example |
| | | B | 25 | | Δ | Δ | Δ | Example |
| 320-1 | | A | 22 | 305 | Δ | Δ | Δ | Example |
| | | B | 25 | | Δ | Δ | Δ | Example |
| 321-1 | 222 | A | 23 | 301 | Δ | Δ | Δ | Example |
| | | B | 31 | | x | x | x | Comparison |
| 321-2 | | A | 23 | 303 | Δ | Δ | Δ | Example |
| | | B | 32 | | x | x | x | Comparison |
| 321-3 | | A | 23 | 305 | Δ | Δ | Δ | Example |
| | | B | 32 | | x | x | x | Comparison |

Table 9 evidently shows that the polarizing plates according to the present invention all have high adhesion between the film and the polarizer, high curling resistance, and polarizations barely reduced by a deviation of the axis of the film bonded to the polarizer.

The co-casting process can effectively control the permeation rate of HEA within the range specified in the present invention to attain the advantageous effects of the present invention by an increased weight average molecular weight Mw of cellulose acylate and an increased Ca content on the surface A or B of the film, and the SP value of the additive controlled within a specific range such that a larger additive is present on the surface A or B of the film.

In contrast, the polarizing plates including the cellulose acylate films according to Comparative Examples all have inferior adhesion between the film and the polarizer, low curling resistance, and have reduced polarizations at an unsatisfactory level.

INDUSTRIAL APPLICABILITY

The thin optical compensation film according to the present invention comprises cellulose acylate and an additive photocurable adhesive, the optical compensation film having high adhesiveness to the polarizer, and does not cause the curling of a polarizing plate and a reduction in the polarization thereof. The optical compensation film according to the present invention can be suitably used in polarizing plates in the form of a thin film and liquid crystal display devices.

DESCRIPTION OF REFERENCE NUMERALS

F Cellulose acylate film
X Volume of HEA immediately after dropwise addition of HEA
Y Volume of HEA after 15 seconds from dropwise addition of HEA
10 Co-casting die
11 Die lip
13, 15 Slit for skin layer
14 Slit for core layer
16 Metal support
17, 19 Dope for skin layer
18 Dope for core layer
20 Multi-layer web
21 Skin layer
22 Core layer
23 Skin layer

The invention claimed is:

1. An optical compensation film comprising:
a cellulose acylate having a degree of acylation in a range of 2.0 to 2.5, and
an additive,
the optical compensation film having a thickness in a range of 15 to 40 μm,
wherein at least one surface of the optical compensation film has a permeation rate of hydroxyethyl acrylate in a range of 10 to 25 pl/15 sec when 50 pl of hydroxyethyl acrylate is dropwise placed onto the film at 23° C. and 55% RH, and
wherein the cellulose acylate has a weight average molecular weight Mw in a range of 120000 to 200000.

2. The optical compensation film according to claim 1, wherein the cellulose acylate has a Ca ion content in a range of 10 to 60 ppm.

3. The optical compensation film according to claim 1, wherein the additive has an SP value in a range of 10.0 to 11.5 $(cal/cm^3)^{1/2}$ determined at 25° C. by Fedors method.

4. The optical compensation film according to claim 1, wherein the film has an r value in a range of 1.1 to 1.5 where the r value is represented by Expression (1):

$$r = d1/d2 \qquad \text{Expression (1)}$$

where d1 represents an additive content on one surface of the optical compensation film, and d2 is an additive content on the other surface of the optical compensation film.

5. A polarizing plate comprising:
the optical compensation film according to claim 1; and
a polarizer,
wherein a surface of the optical compensation film is bonded to one surface of the polarizer with a photocurable adhesive, the surface of the optical compensation film satisfying a permeation rate of hydroxyethyl acrylate within the range specified in claim 1.

6. A liquid crystal display device, comprising the polarizing plate according to claim 5.

* * * * *